United States Patent
Fukuda et al.

(10) Patent No.: US 7,246,041 B2
(45) Date of Patent: Jul. 17, 2007

(54) COMPUTER EVALUATION OF CONTENTS OF INTEREST

(75) Inventors: Kentaro Fukuda, Sagamihara (JP); Hironobu Takagi, Yokohama (JP); Junji Maeda, Tokyo-to (JP); Chieko Asakawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 11/173,062

(22) Filed: Jul. 1, 2005

(65) Prior Publication Data

US 2006/0015571 A1    Jan. 19, 2006

(30) Foreign Application Priority Data

Jul. 5, 2004    (JP) ............................. 2004-198702
Mar. 30, 2005  (JP) ............................. 2005-098613

(51) Int. Cl.
*G06F 15/00* (2006.01)
(52) U.S. Cl. ........................ 702/189; 702/182; 702/184
(58) Field of Classification Search ................ 702/189, 702/182, 186, 184; 709/217; 707/200, 186, 707/5, 7

See application file for complete search history.

(56) References Cited

U.S. PATENT DOCUMENTS 6,778,986 B1 *    8/2004   Stern et al. ................... 707/10

FOREIGN PATENT DOCUMENTS

| JP | 2001-92742  | 4/2001  |
|----|-------------|---------|
| JP | 2003-271779 | 3/2002  |
| JP | 2003-330948 | 10/2002 |
| JP | 2004-21863  | 1/2004  |
| JP | 2004-185647 | 3/2004  |

OTHER PUBLICATIONS

Bobby: http://bobby.watchfire.com/, 1 page.

* cited by examiner

*Primary Examiner*—Bryan Bui
(74) *Attorney, Agent, or Firm*—Louis P. Herzberg

(57) ABSTRACT

Provides evaluating programs that enable problems to be identified in a manner that reflects actual conditions for an evaluation of contents of interest. In an example embodiment, there is provided a program for evaluating contents of interest that causes a computer to implement the functions of: performing a primary evaluation of contents of interest on the basis of one evaluation criterion; performing a primary evaluation of the contents of interest on the basis of another evaluation criterion; and performing a secondary evaluation of the contents of interest on the basis of a plurality of the first evaluations.

30 Claims, 42 Drawing Sheets

[Figure 1]
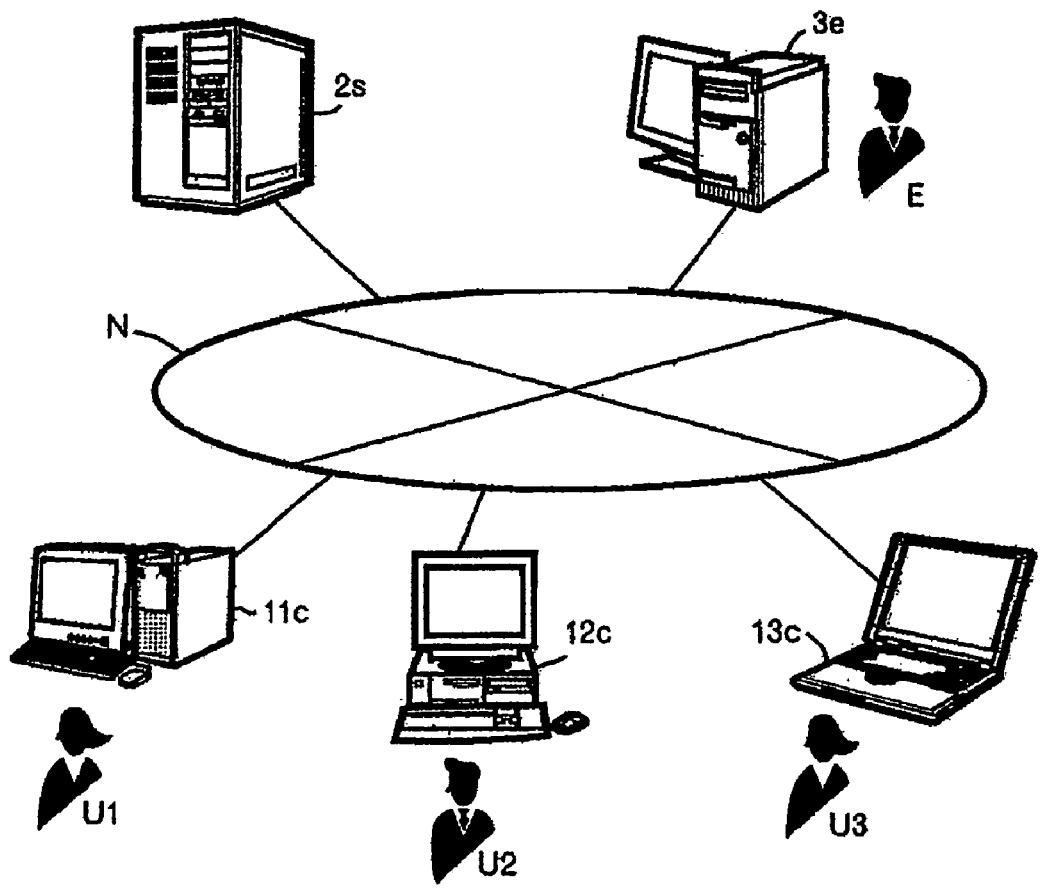
[Figure 3]
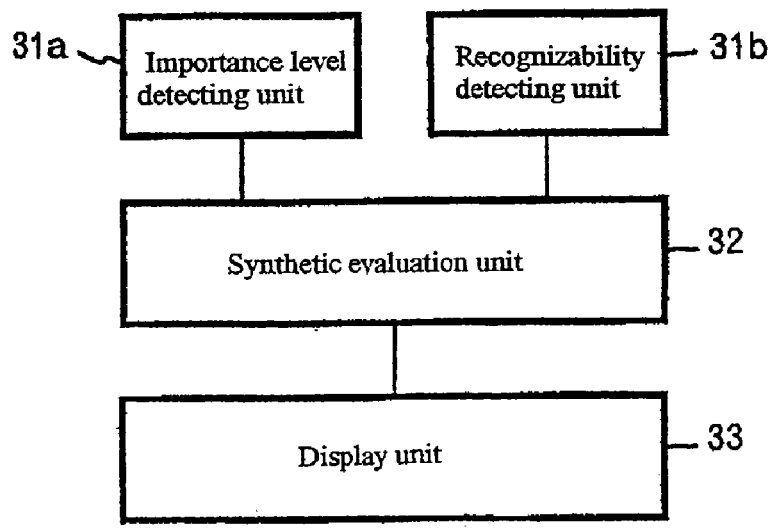

[Figure 2]
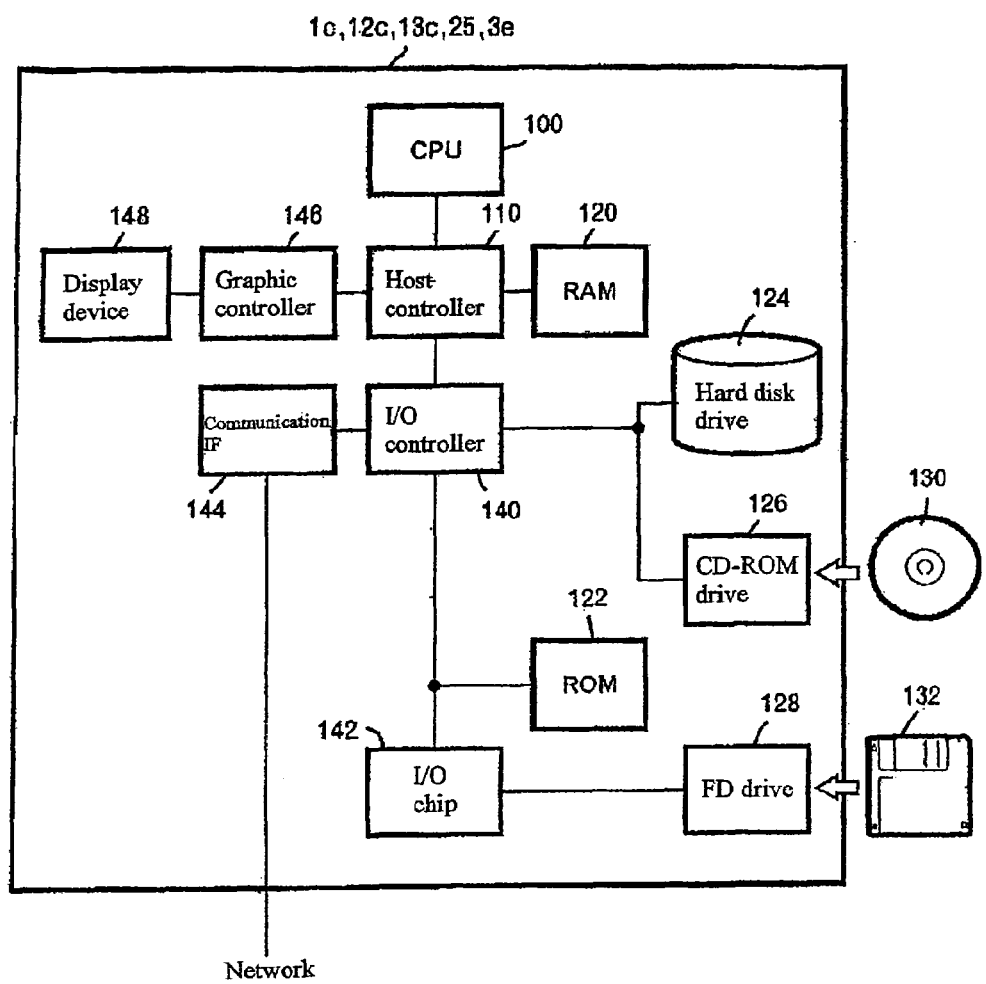

[Figure 4]
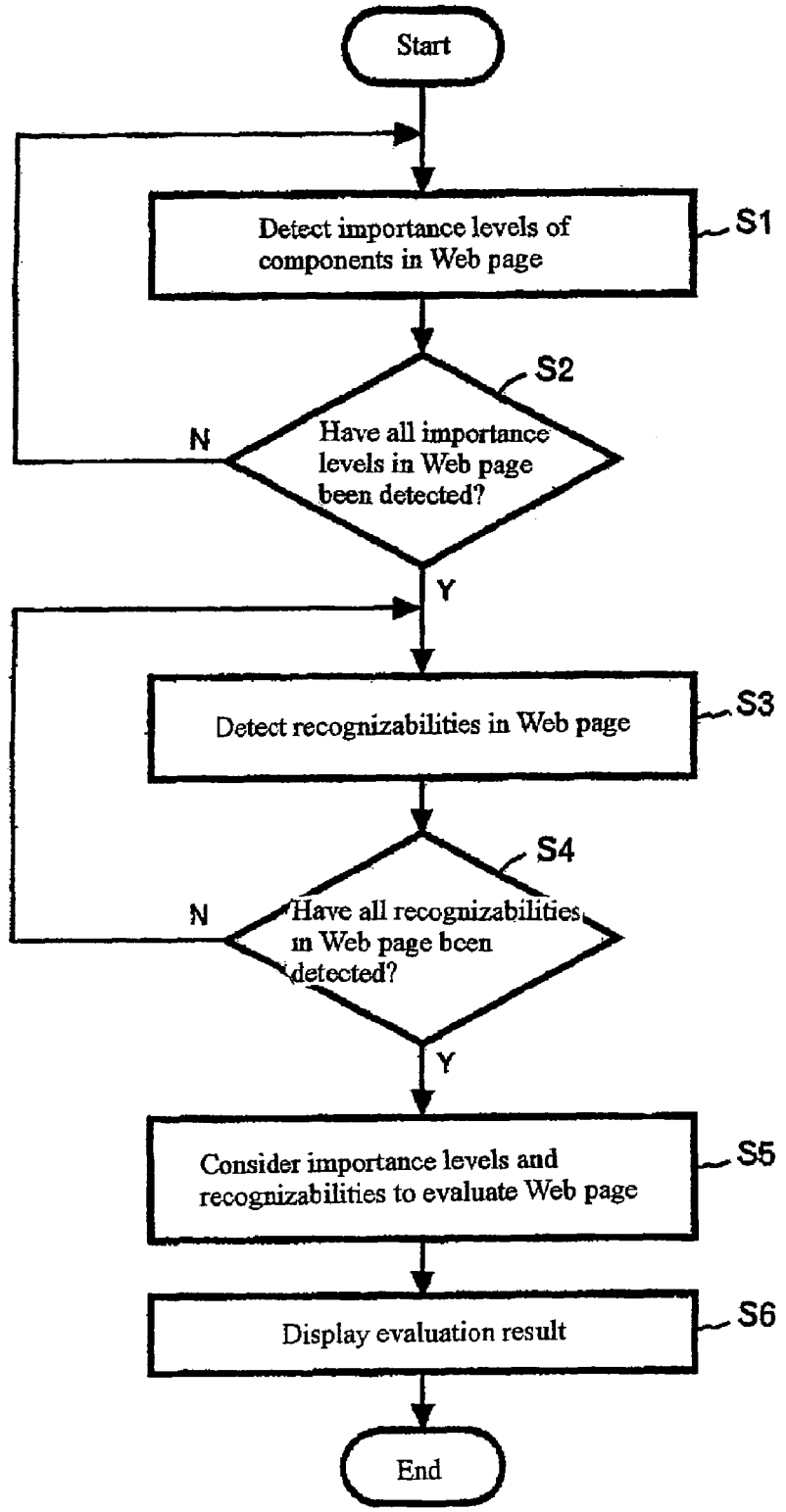

[Figure 5]
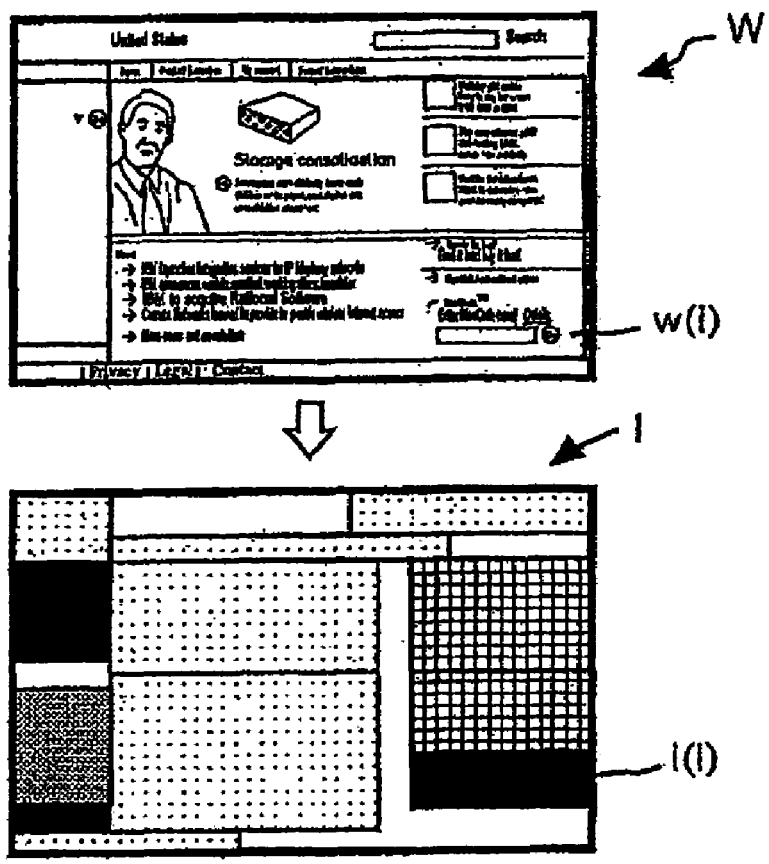

[Figure 6]
Method for determining importance level by
importance level analysis on link forms
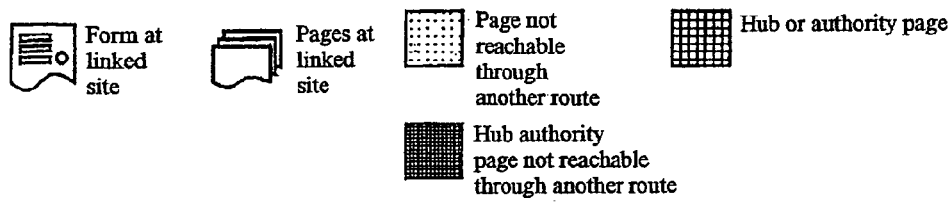
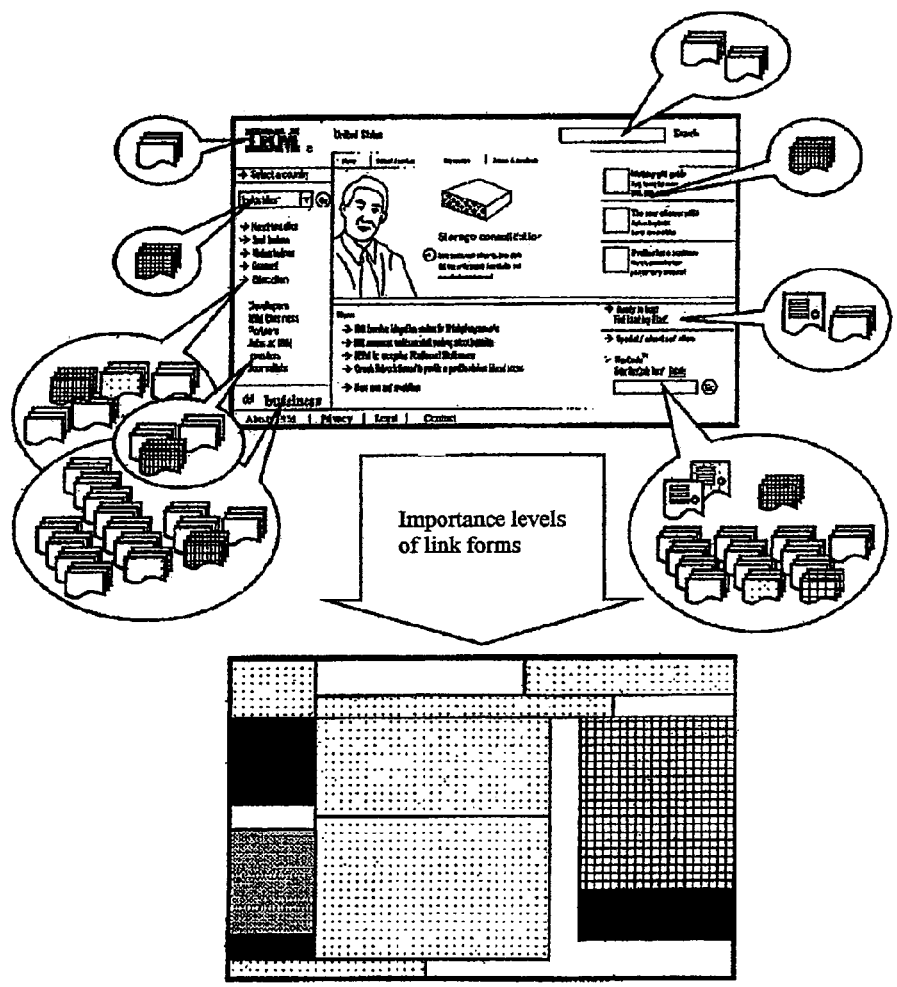
Importance levels of link forms

[Figure 7]
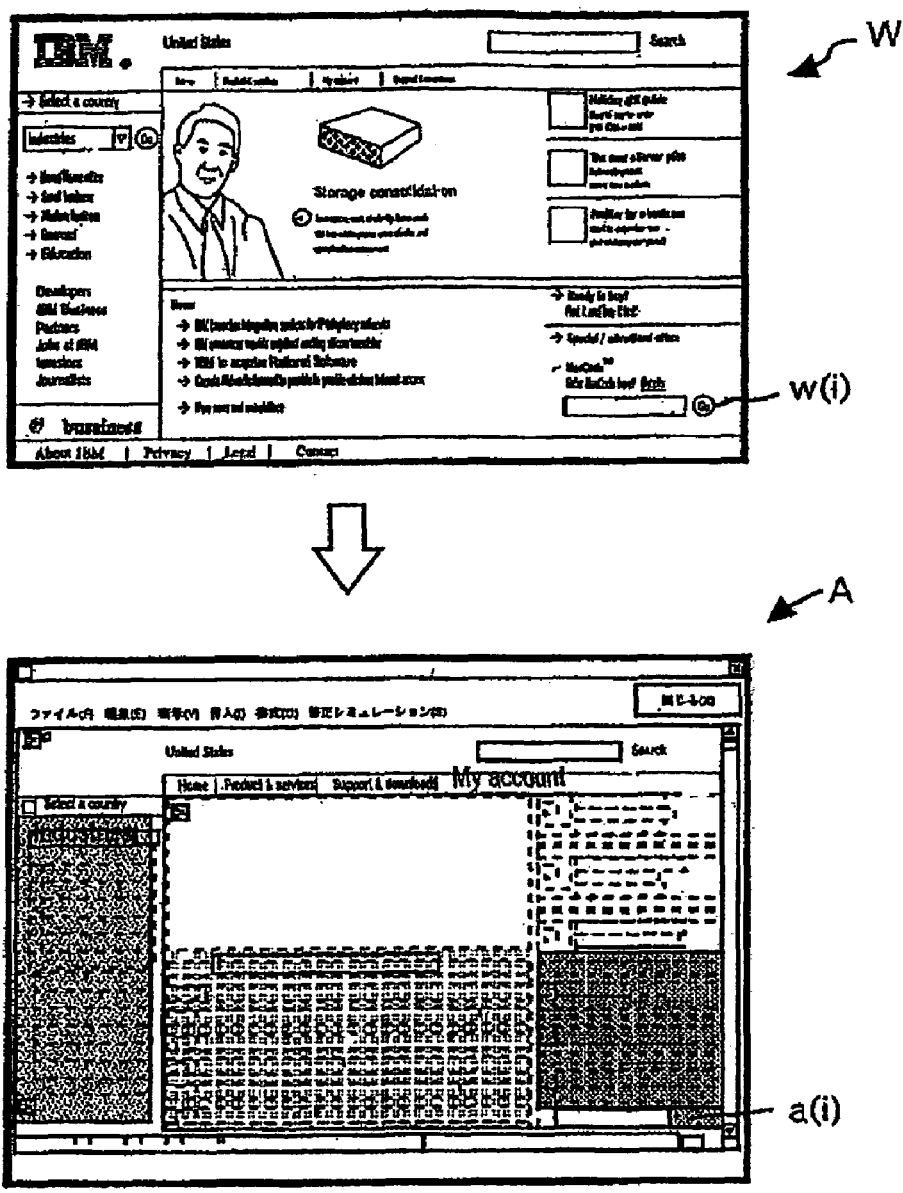

[Figure 8]
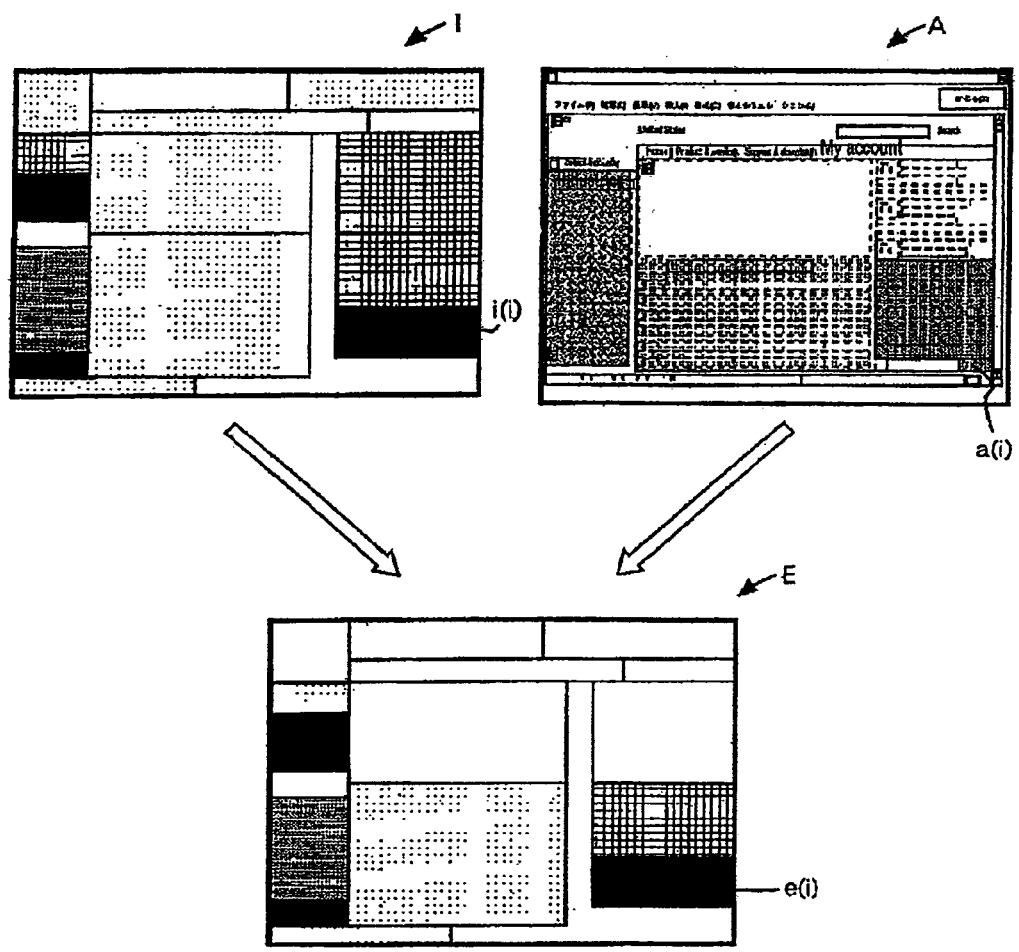

[Figure 9]
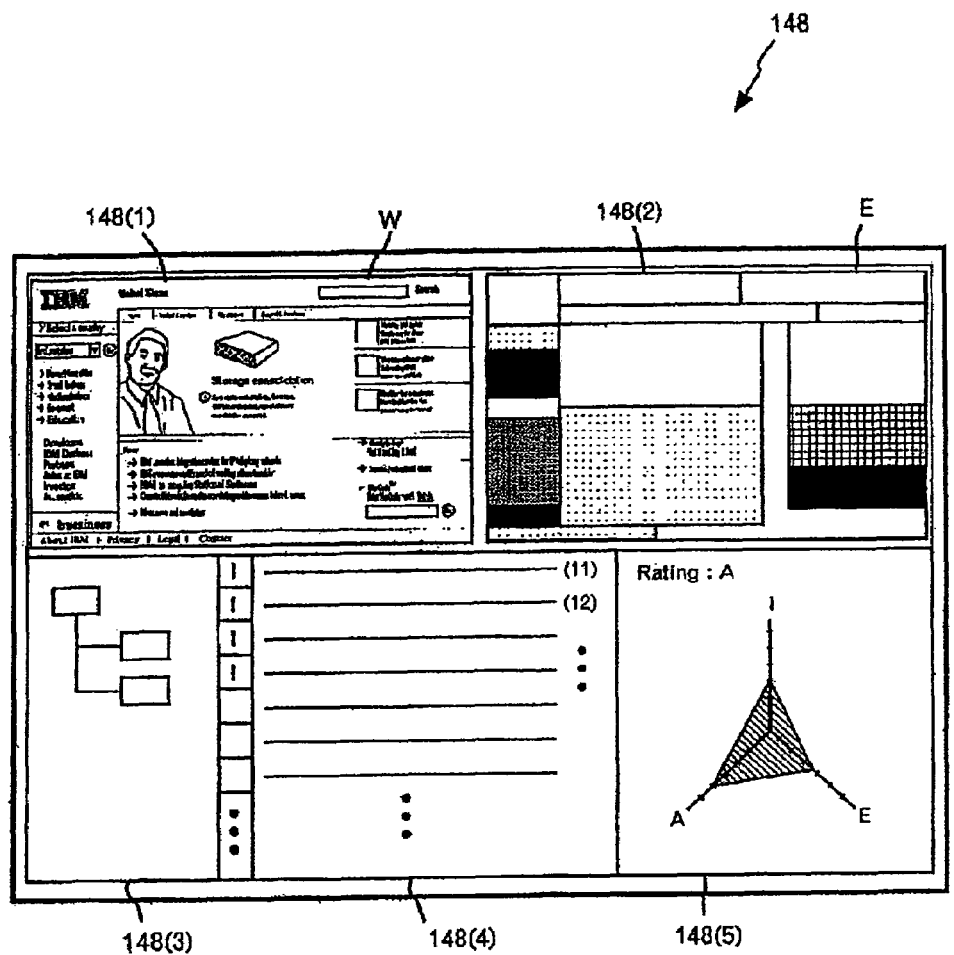

[Figure 10]
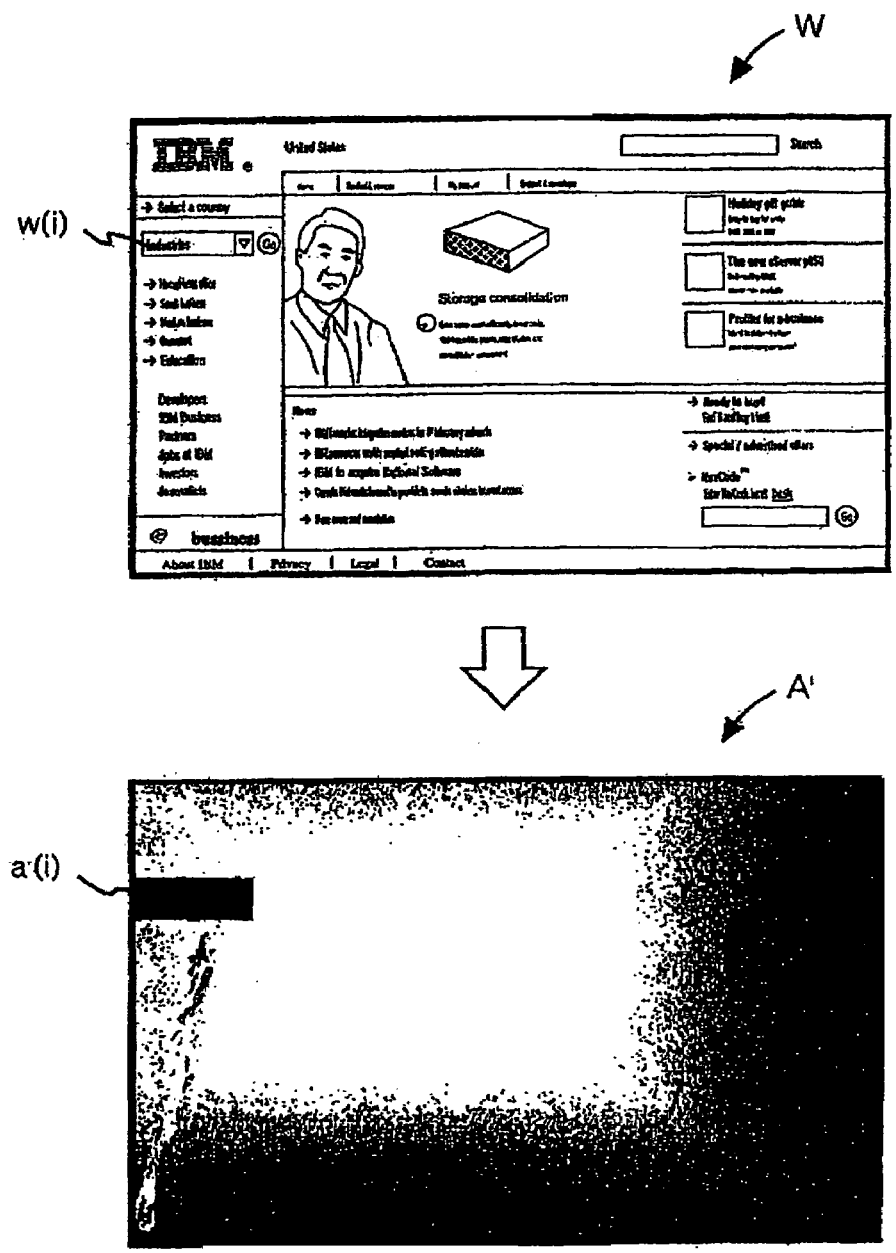

[Figure 11]
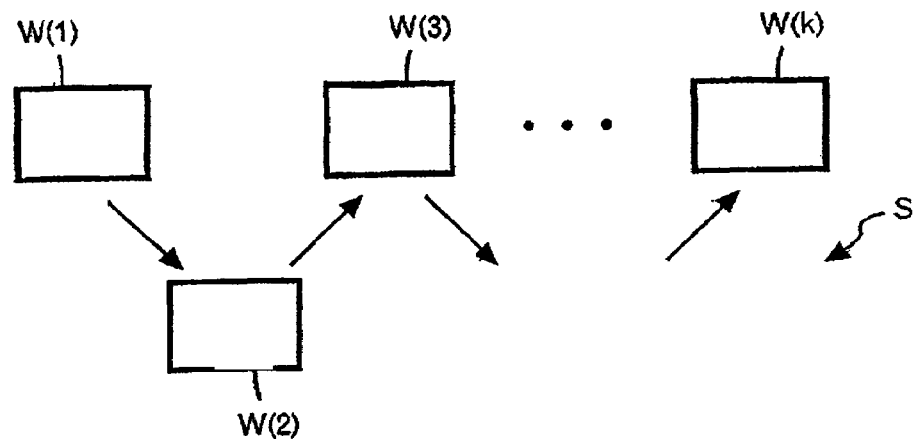
[Figure 12]
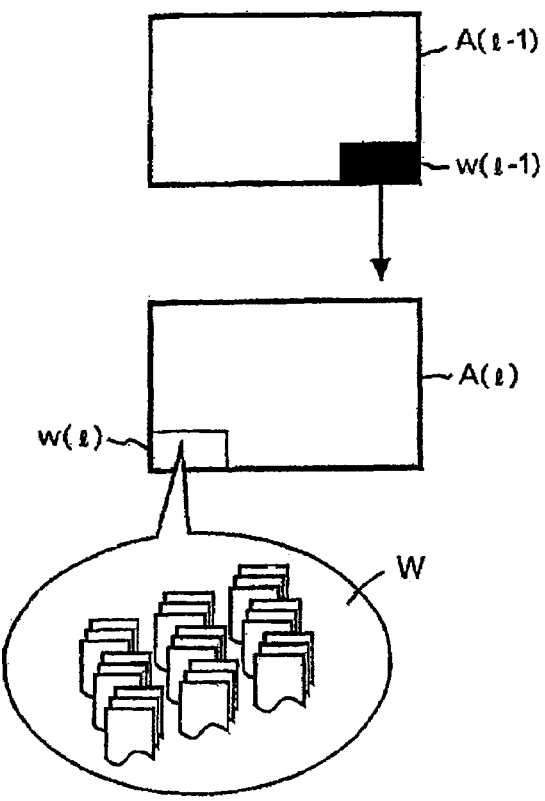

[Figure 13]
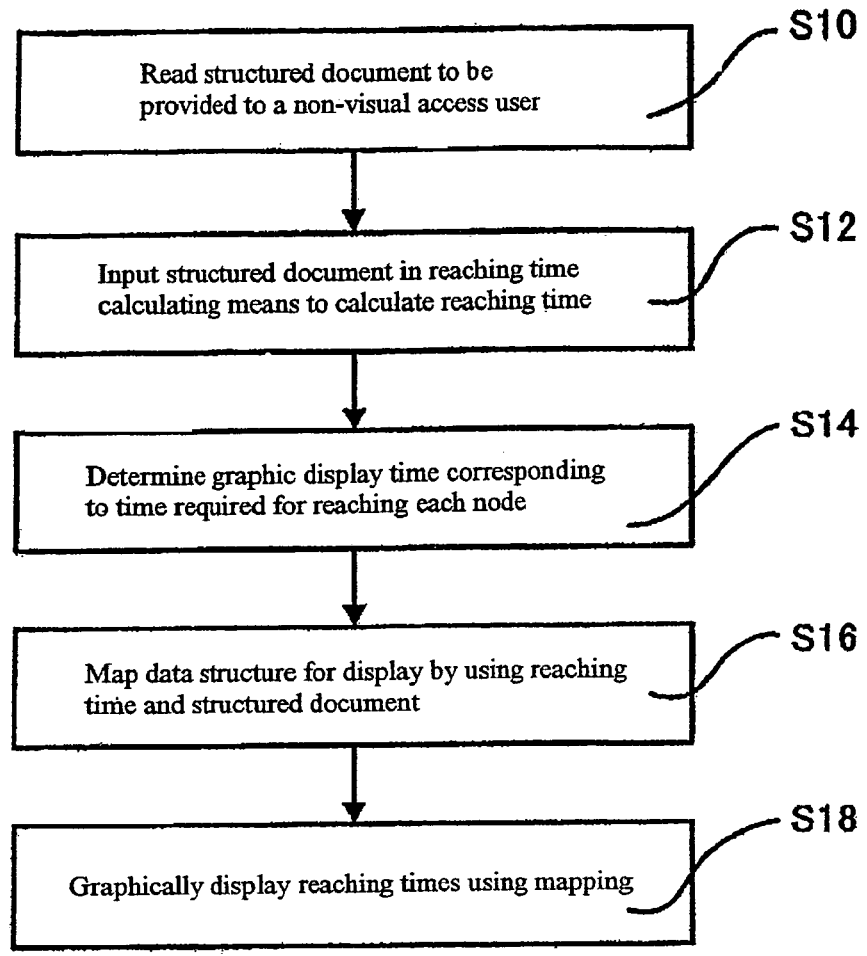

[Figure 14]
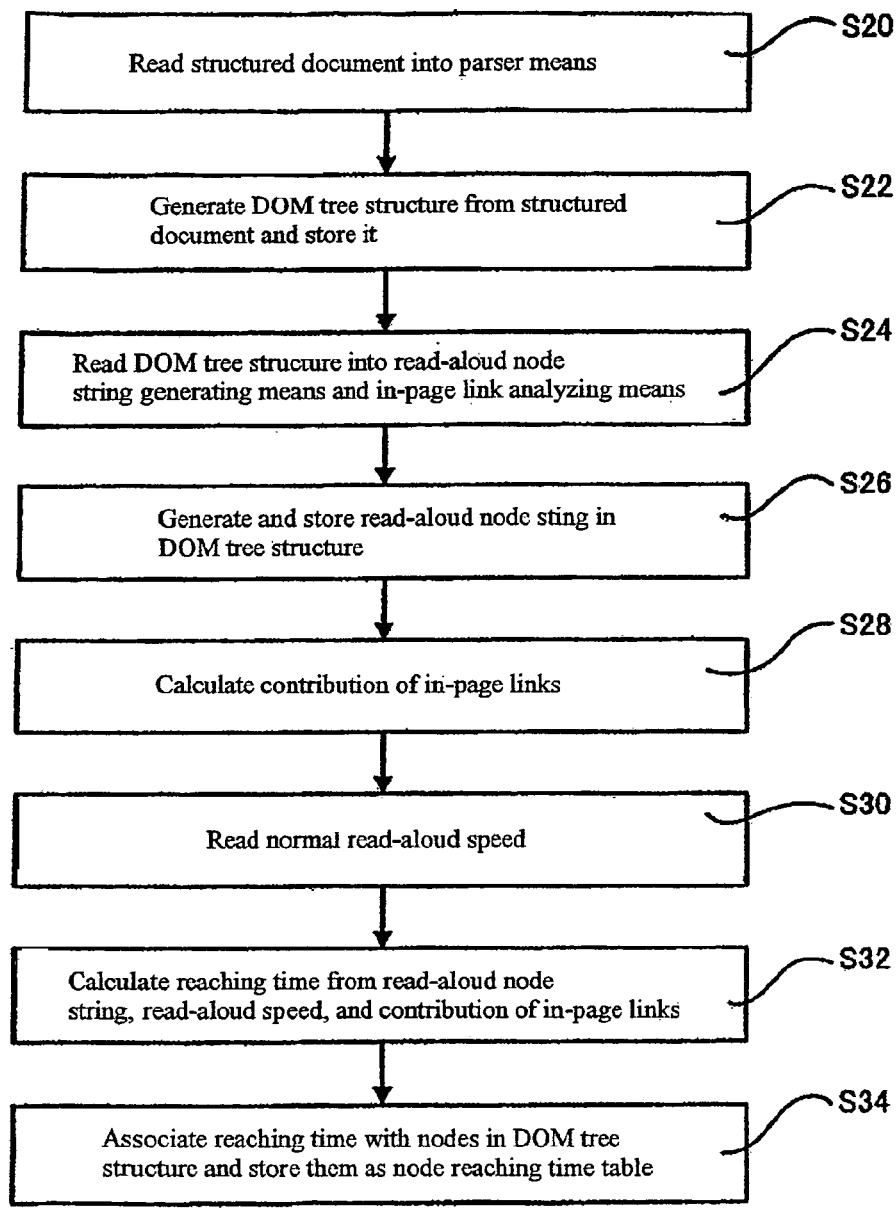

[Figure 15]
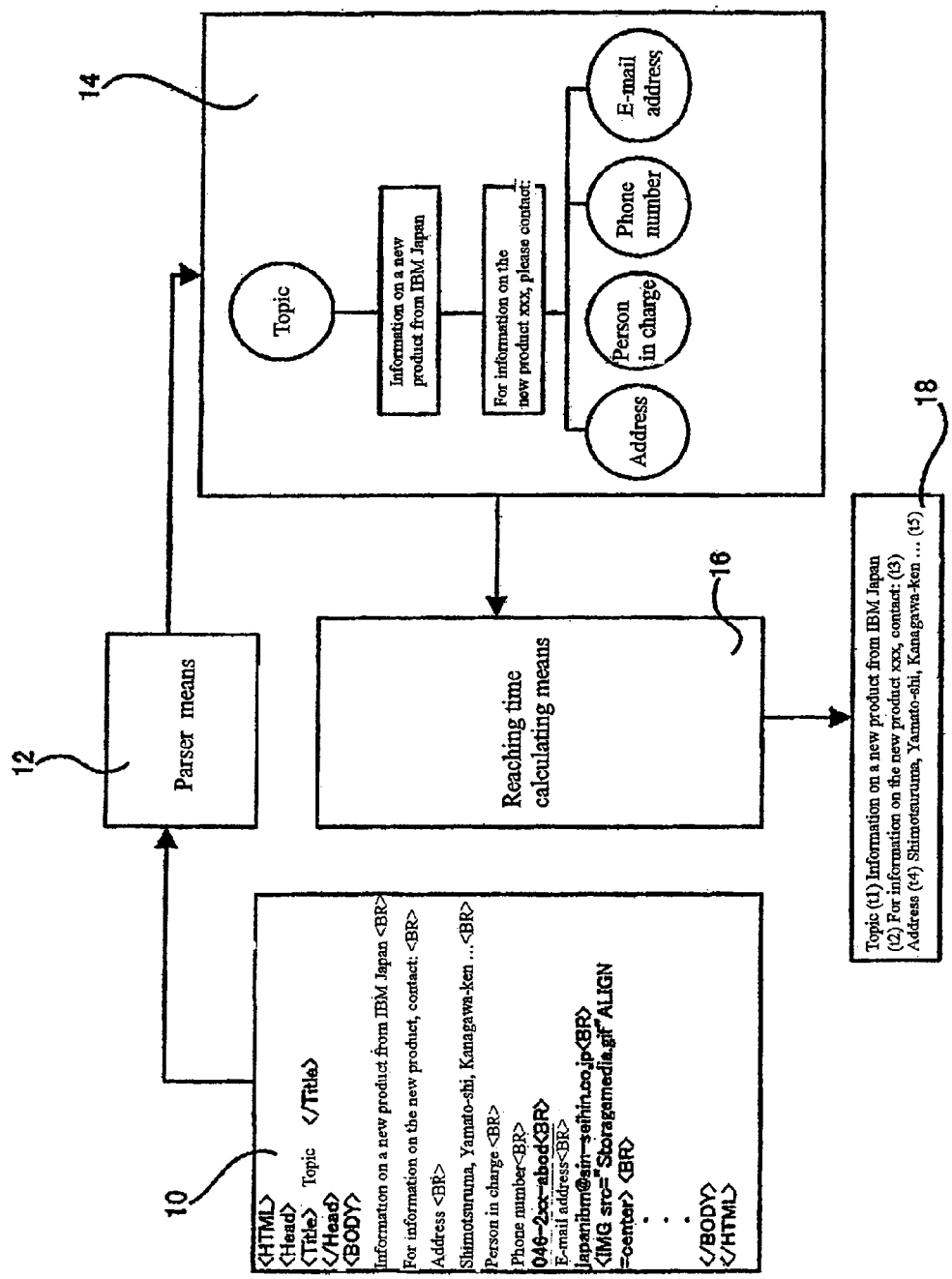

[Figure 16]
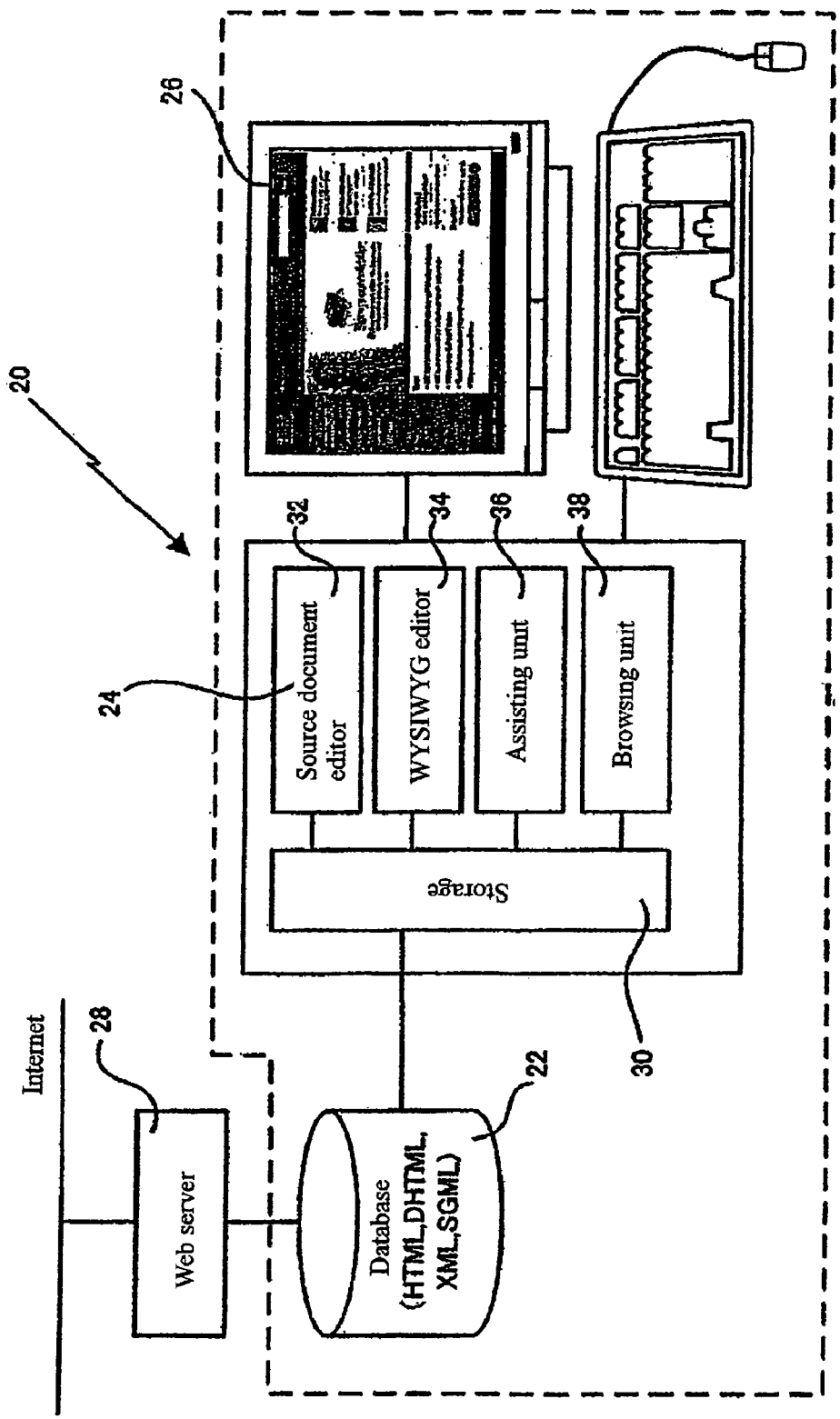

[Figure 17]
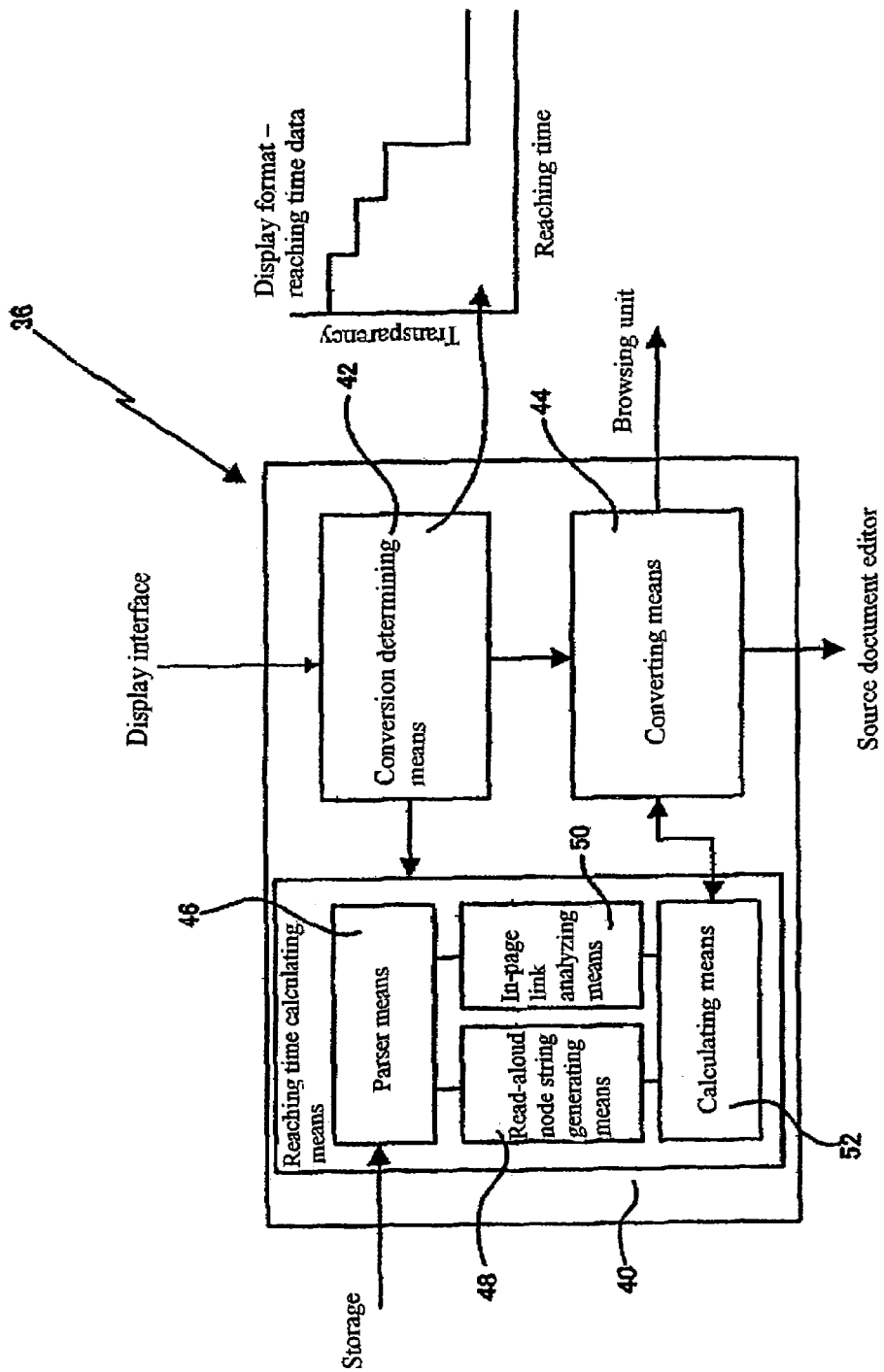

[Figure 18]
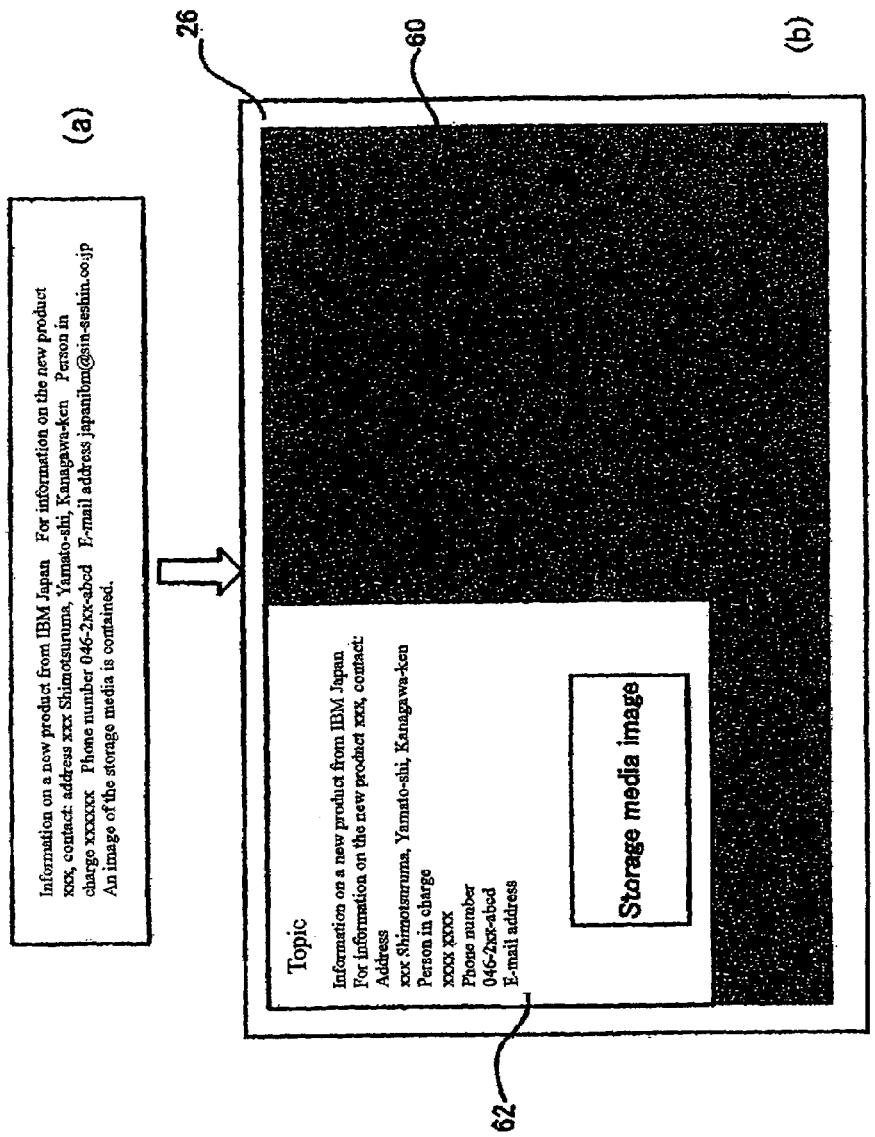

[Figure 19]
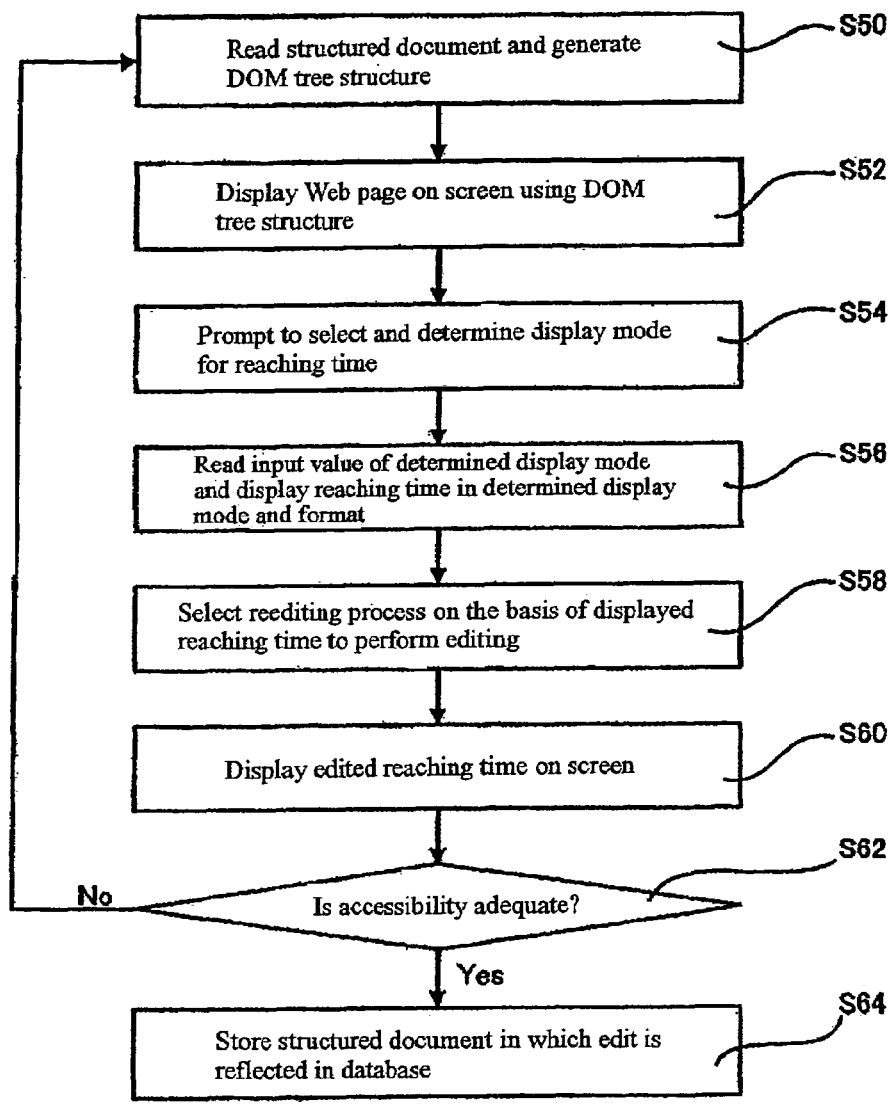

[Figure 20]
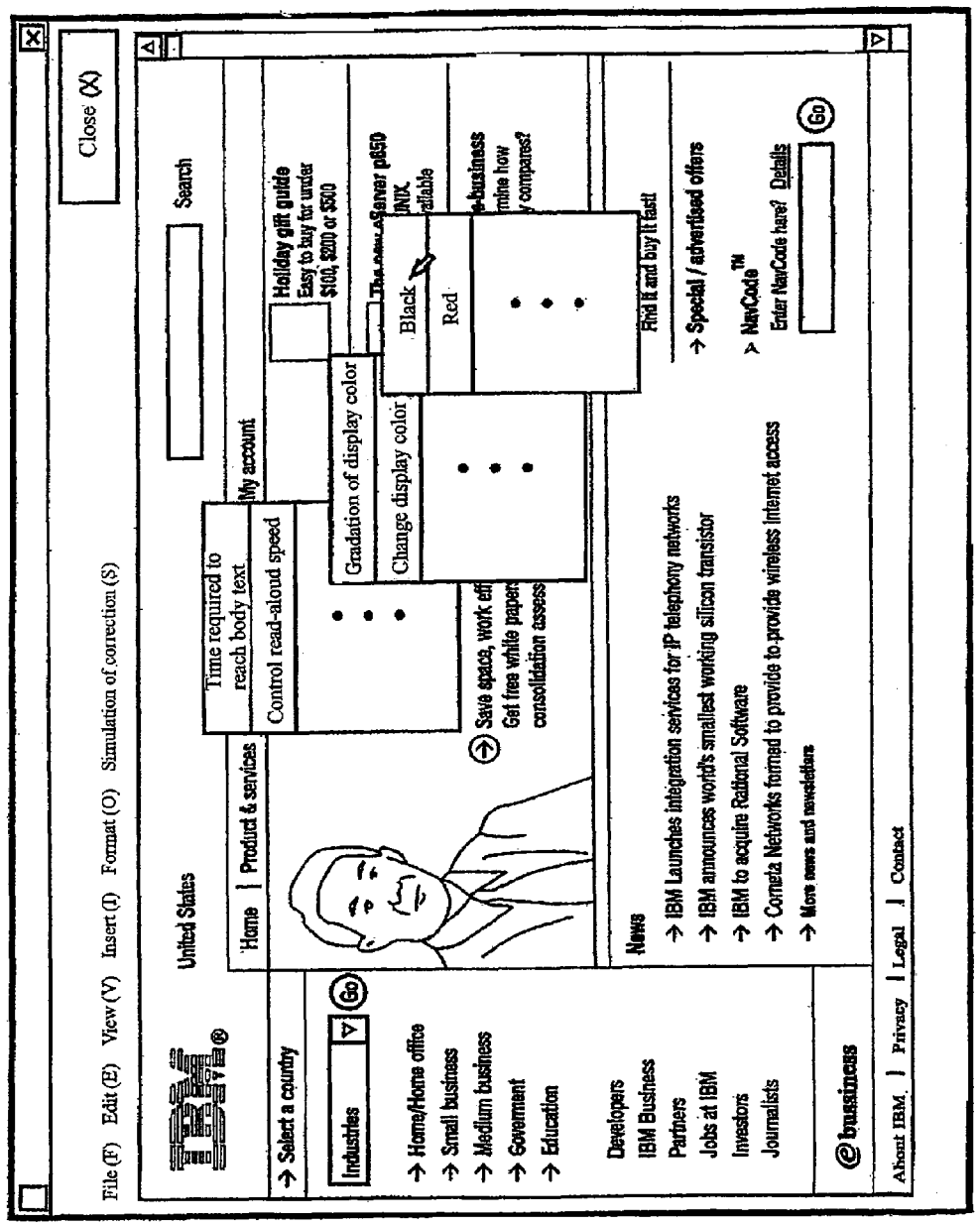

[Figure 21]
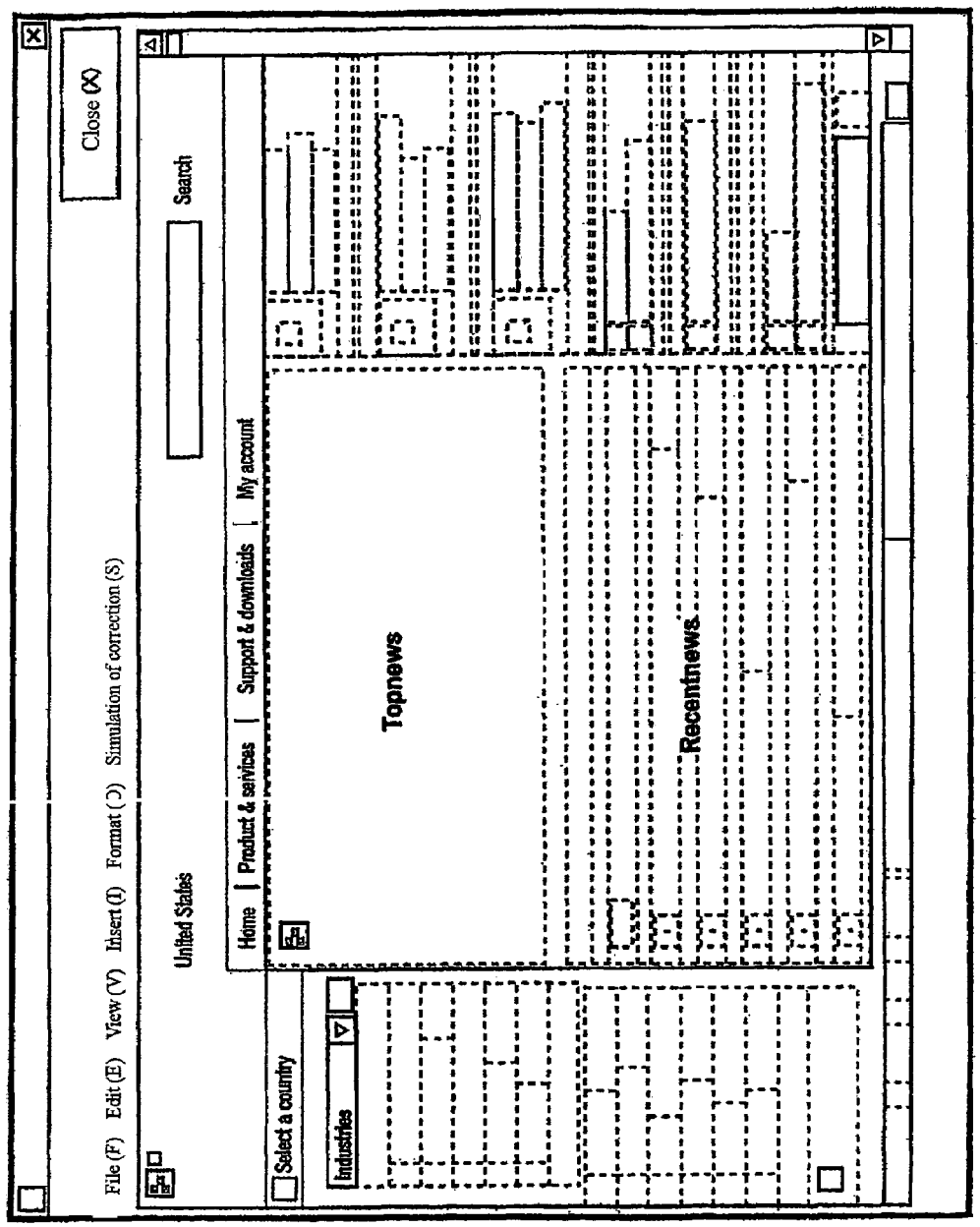

[Figure 22]
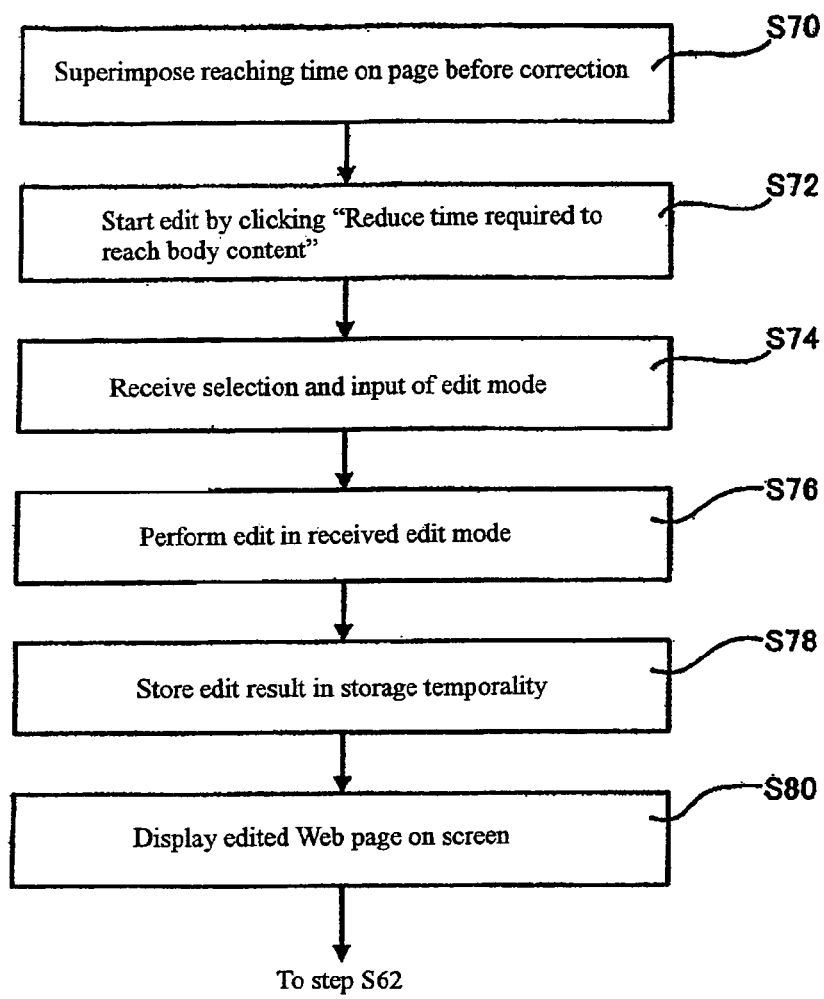

[Figure 23]
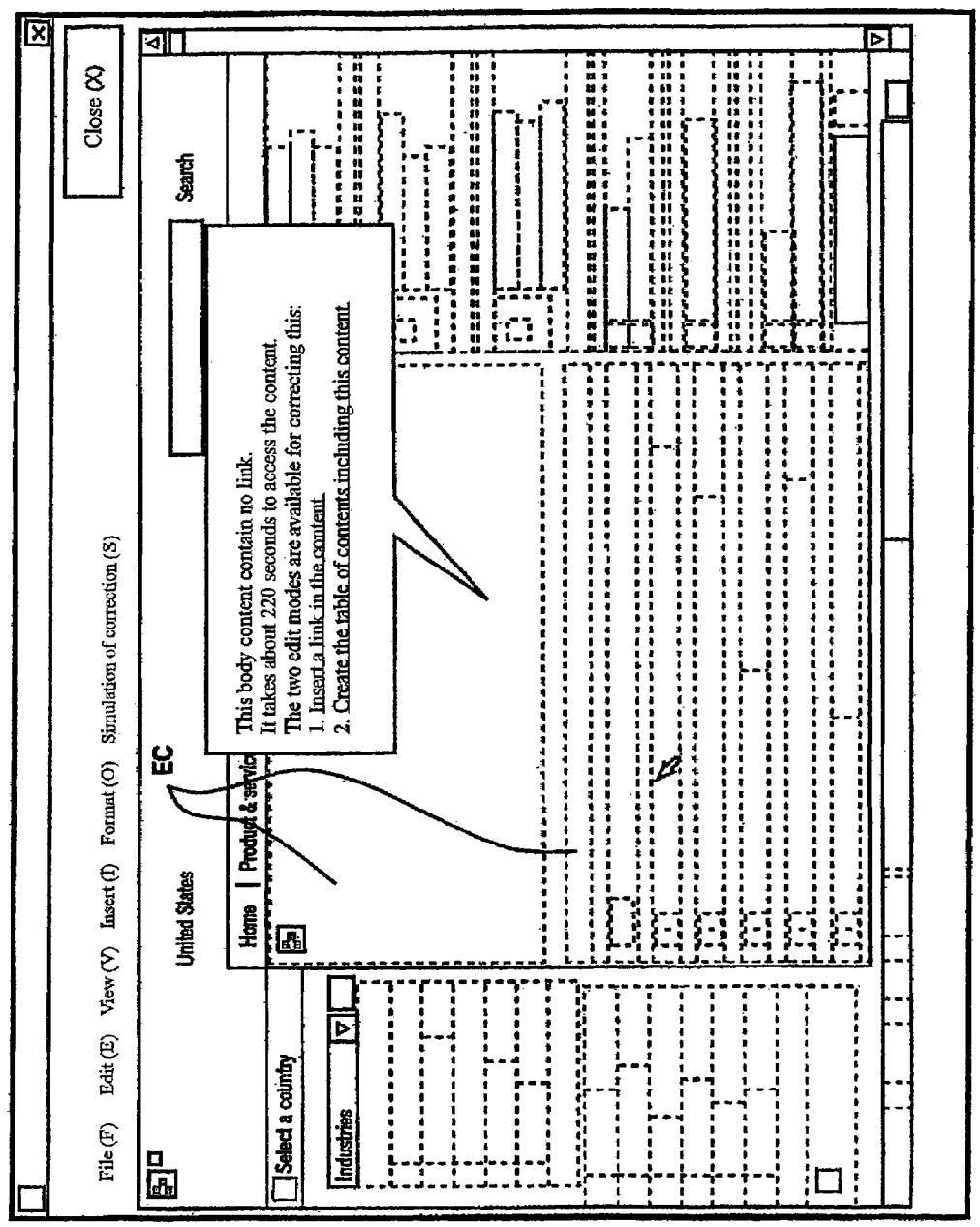

[Figure 24]
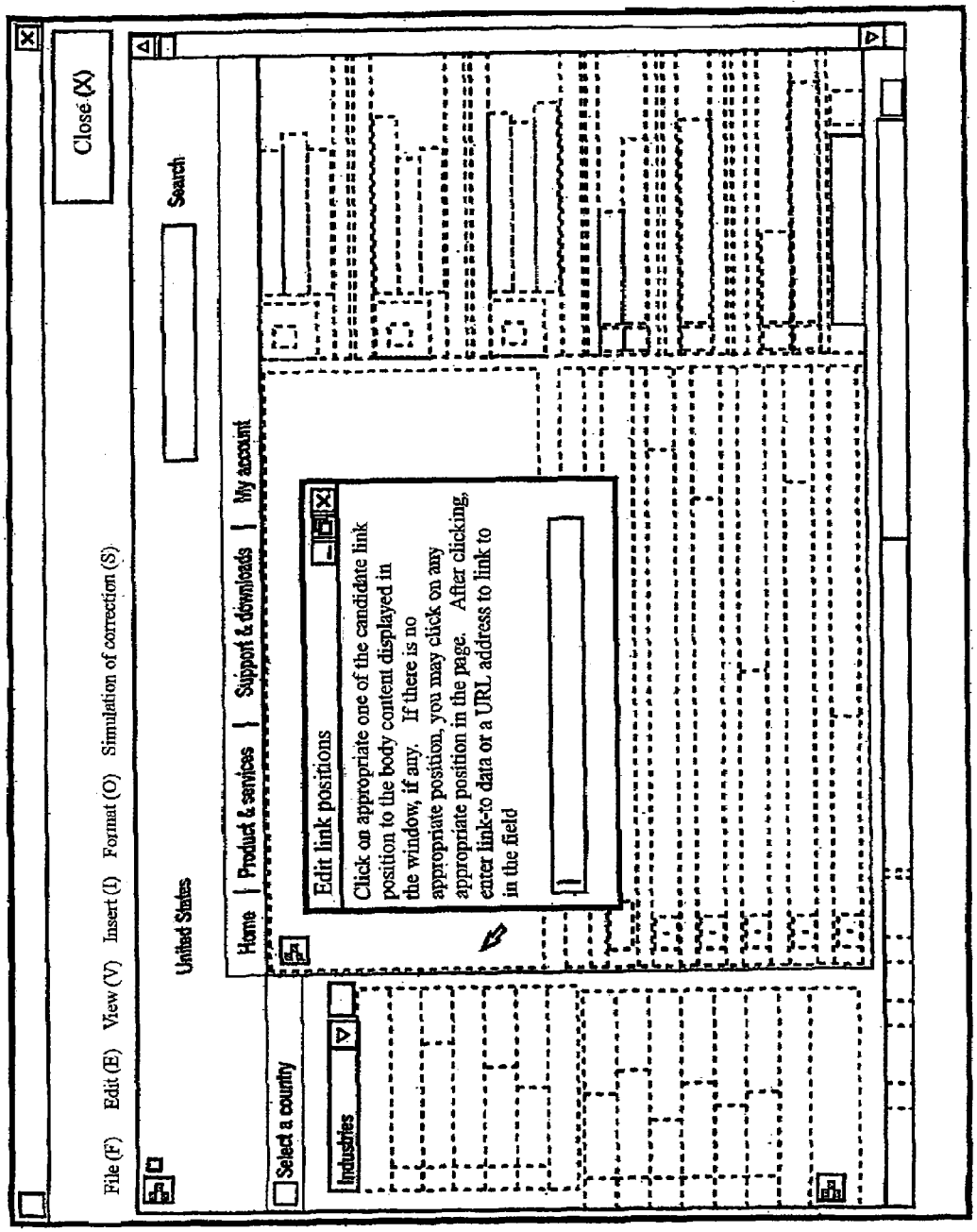

[Figure 25]
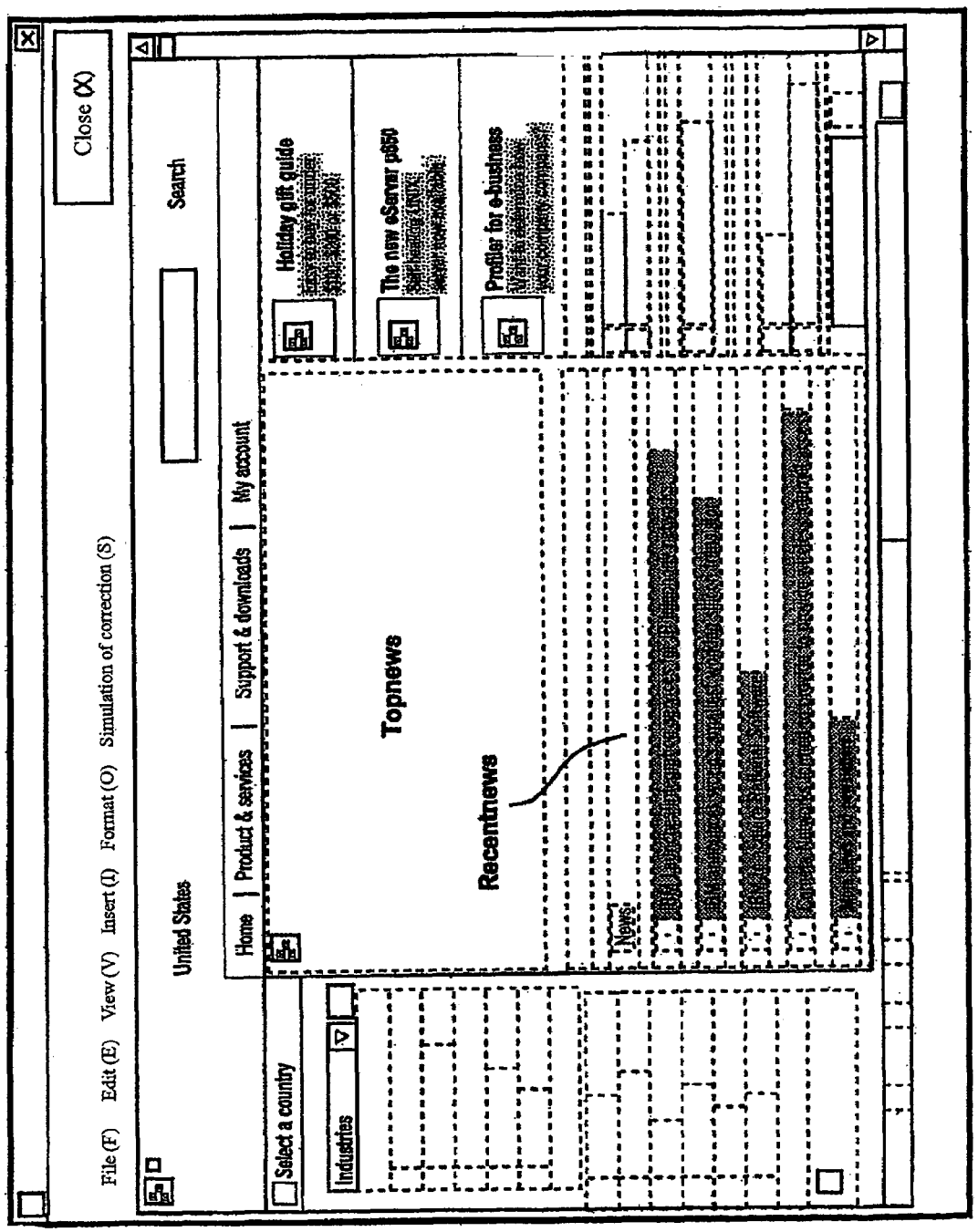

[Figure 26]
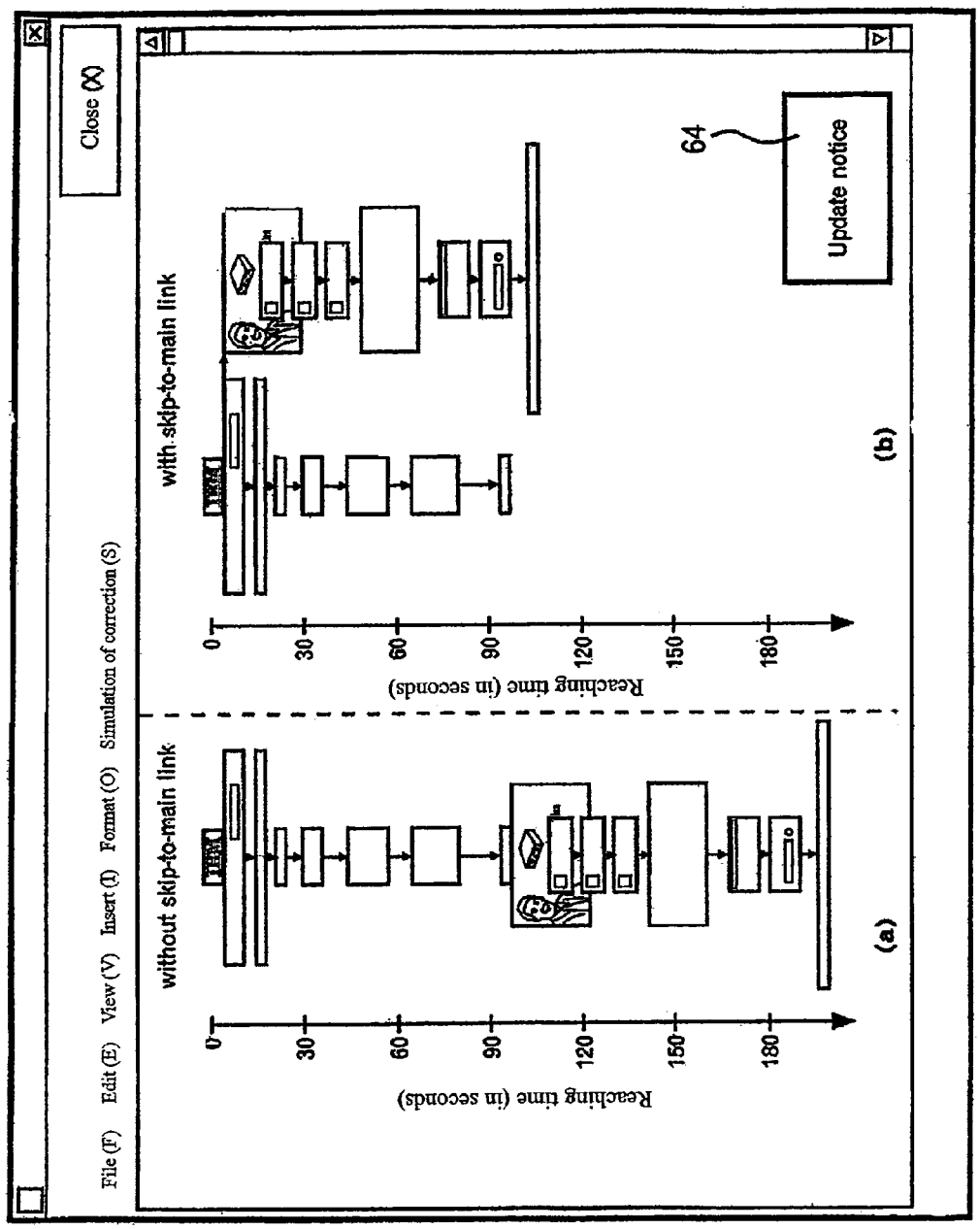

[Figure 27]
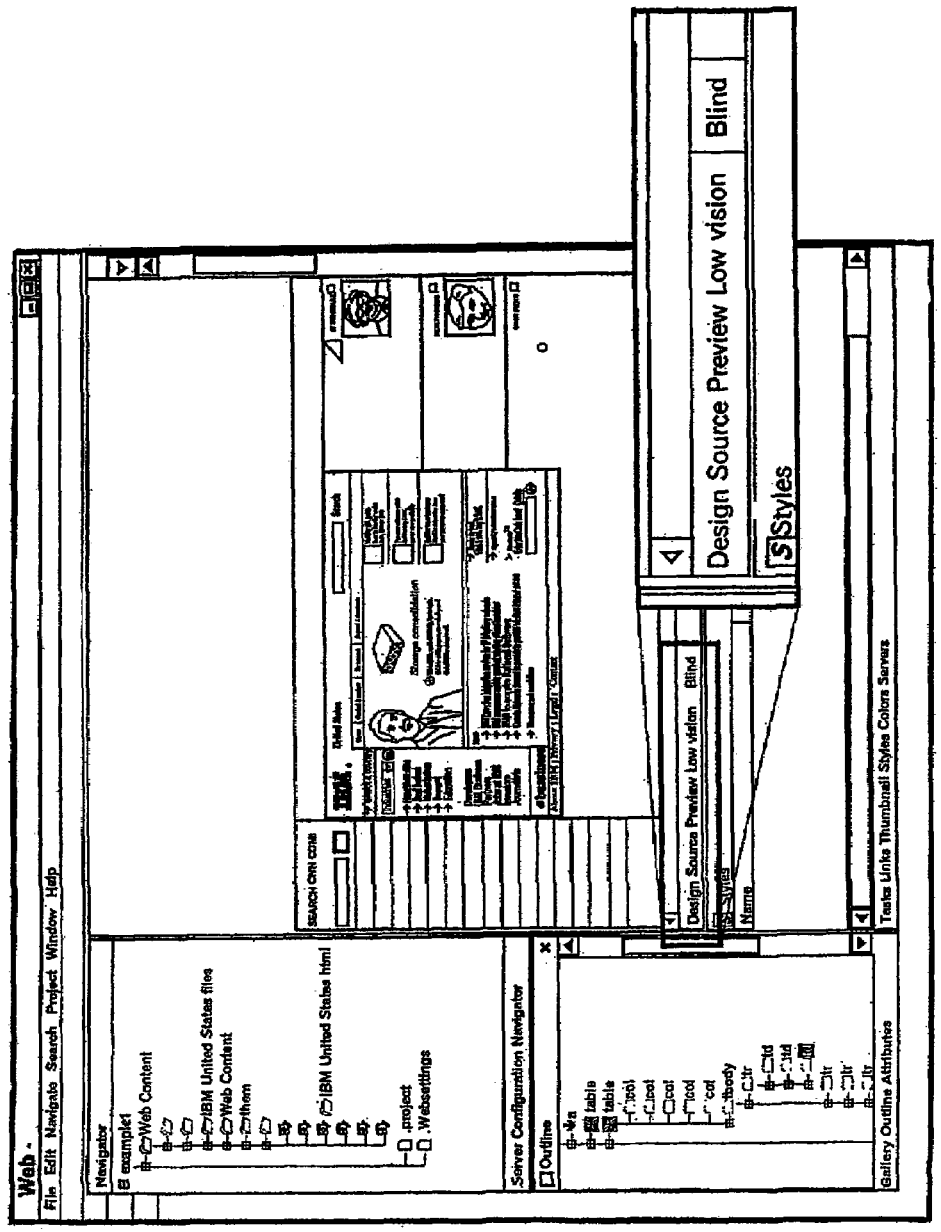

[Figure 28]
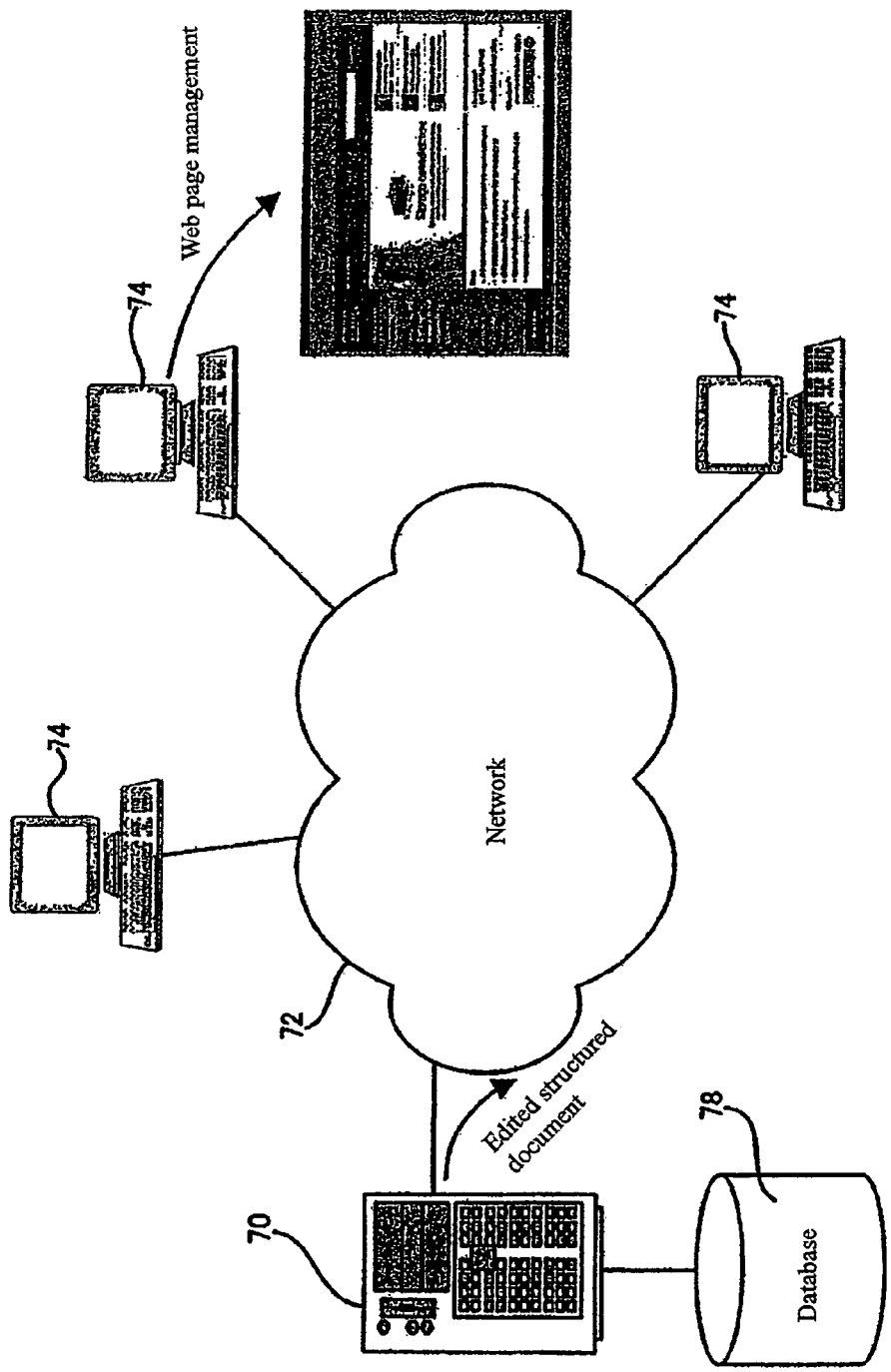

[Figure 29]
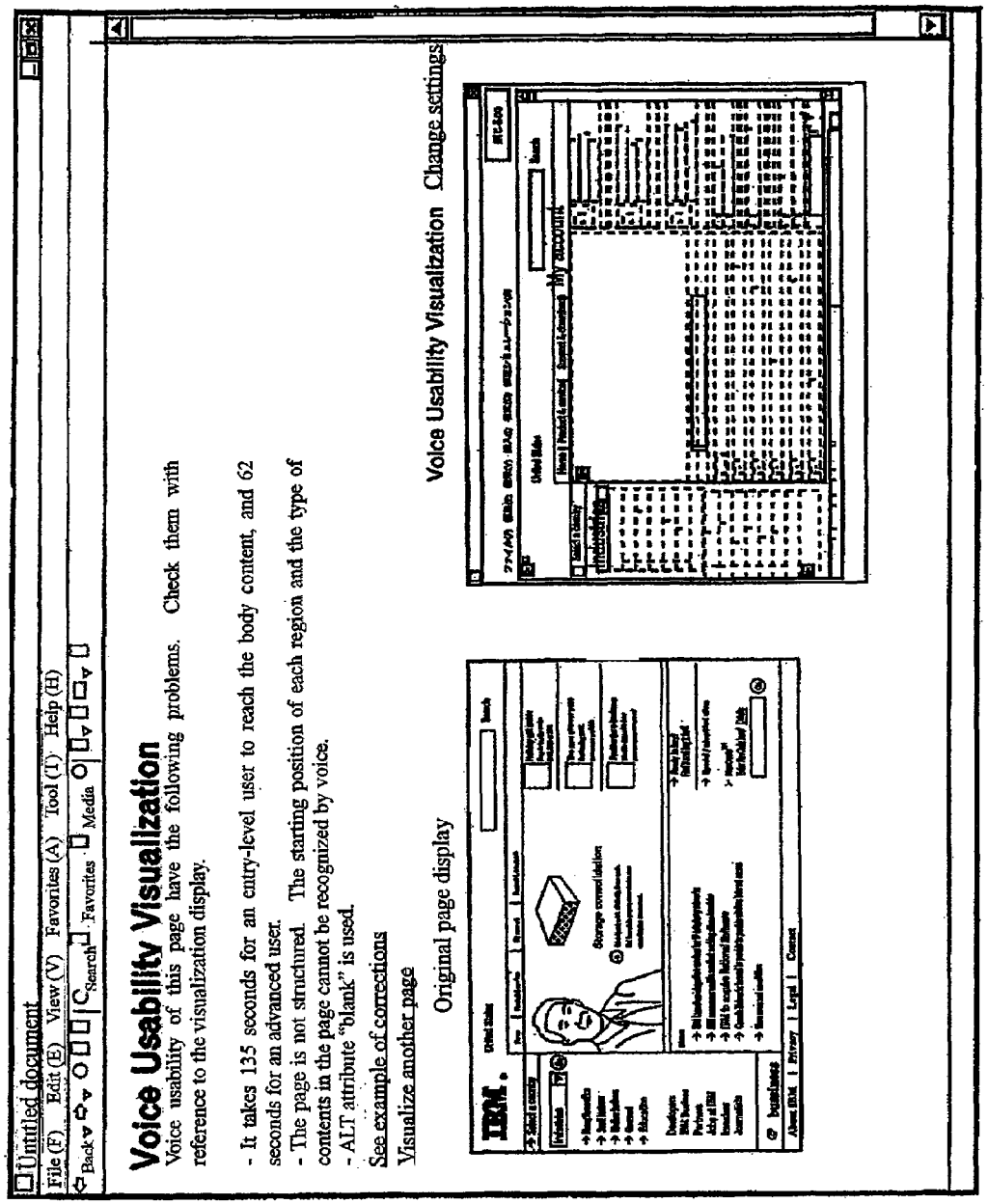

[Figure 30]
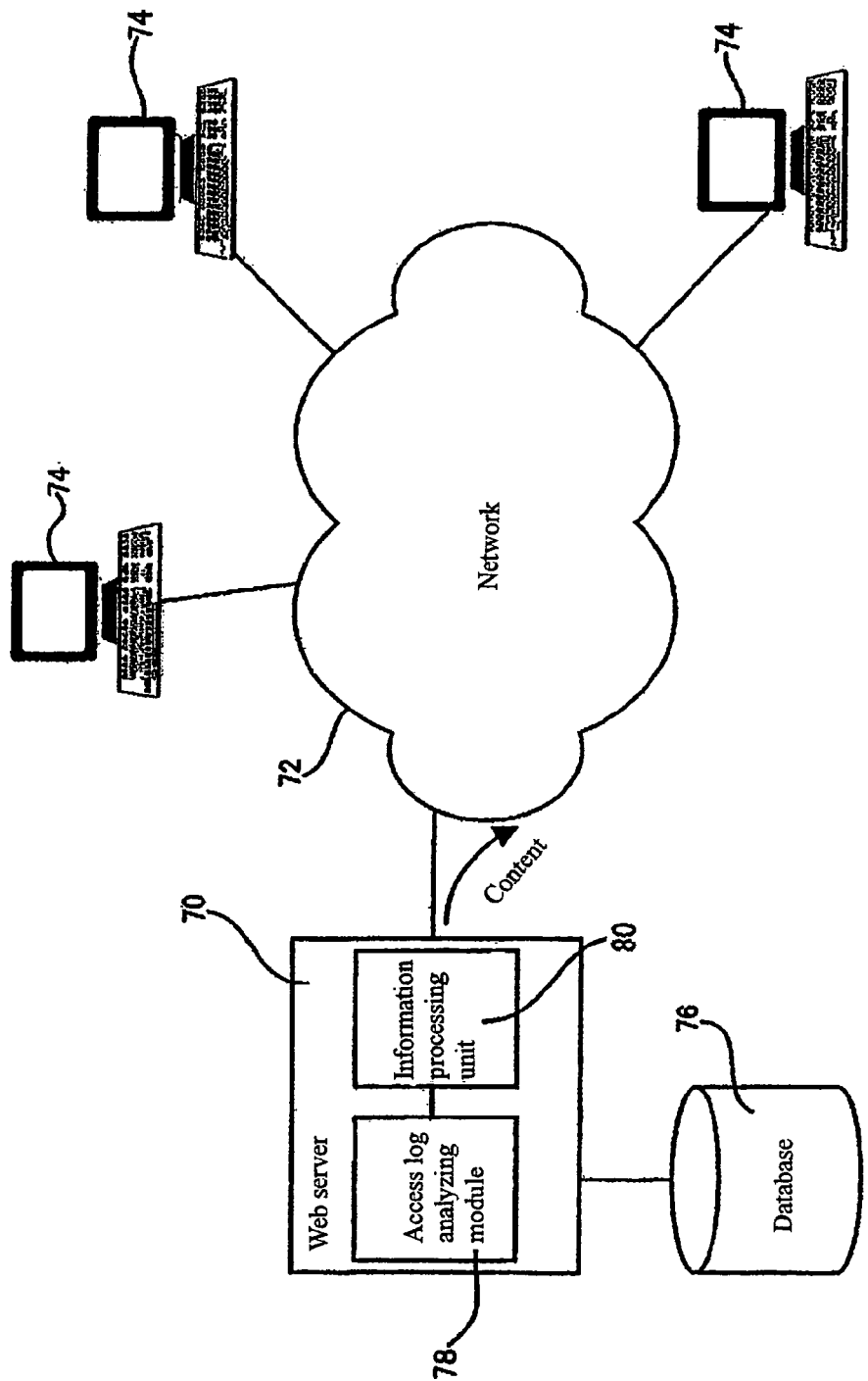

[Figure 31]
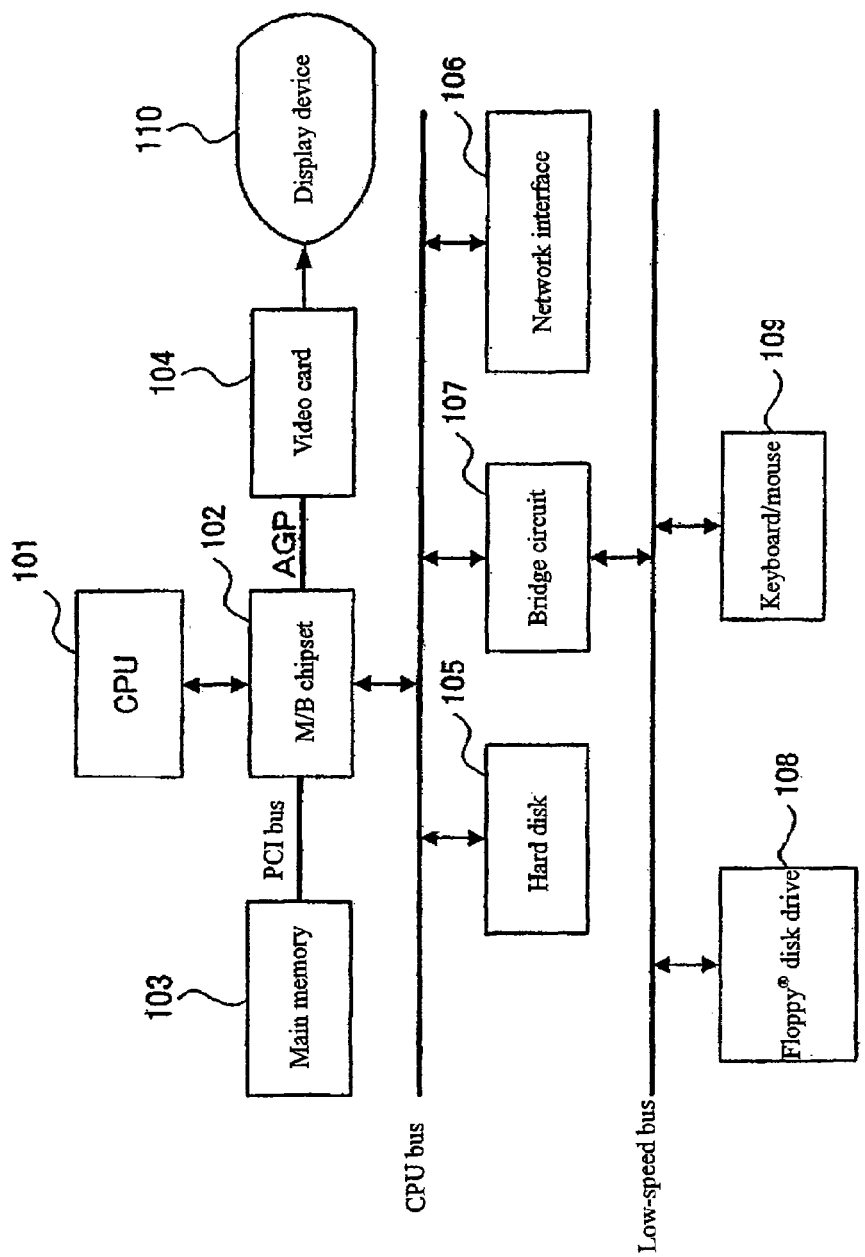

[Figure 32]
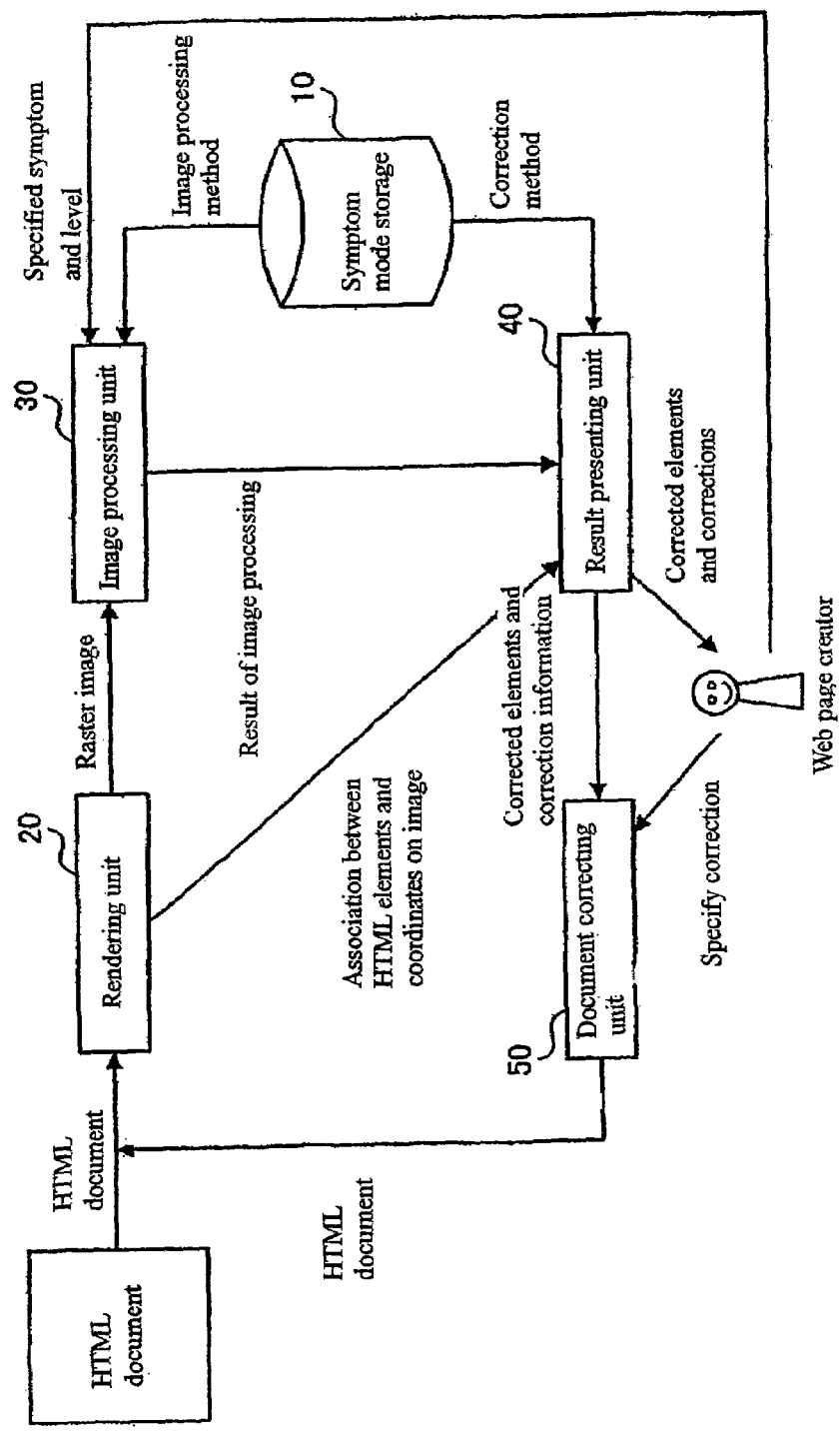

[Figure 33]

| Name | Phenomenon | Image processing method | Correction method |
|---|---|---|---|
| Degradation of focus control capability (nearsightedness/ farsightedness) | Image formed on retina is blurred | Convolute cylindrical function representing blur (parameter: radius of cylinder) | - Enlarge characters<br>- Replace ornament font with normal one<br>- Enlarge line-spacing |
| Color anomaly | Combination of certain colors cannot be discriminated | Replace colors with colors on confusion line (parameter: confusion line diagram) | - Use combination of character color and background color distant from each other on confusion line<br>- Increase difference in lightness between character color and background color |
| Old-sightedness (degradation of frequency response) | High-frequency region cannot be recognized | Use low-pass filter (parameter: frequency to be filtered out) | - Enlarge characters<br>- Change ornament font with normal one |
| Old-sightedness (yellowed lenses) | light of short wavelength (blue side) is difficult to pass especially | Darken color according to wavelength (parameter: relationship between color and degree of darkening) | Lighten color according to wavelength |
| . . . . | . . . . | . . . . | . . . . |

[Figure 34]

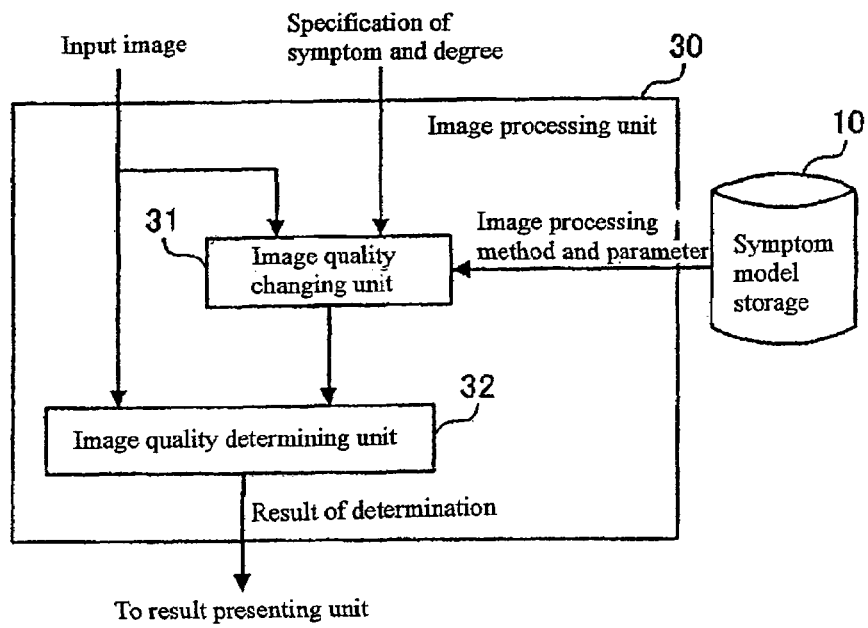

[Figure 35]
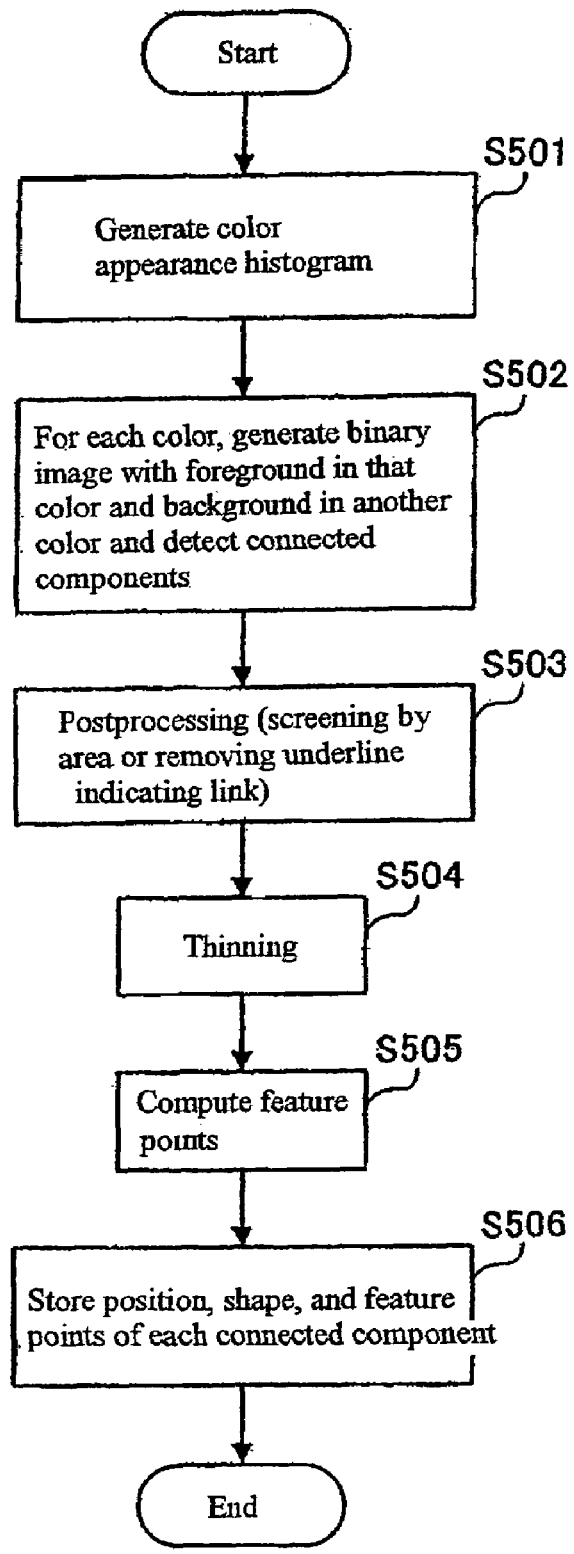

[Figure 36]
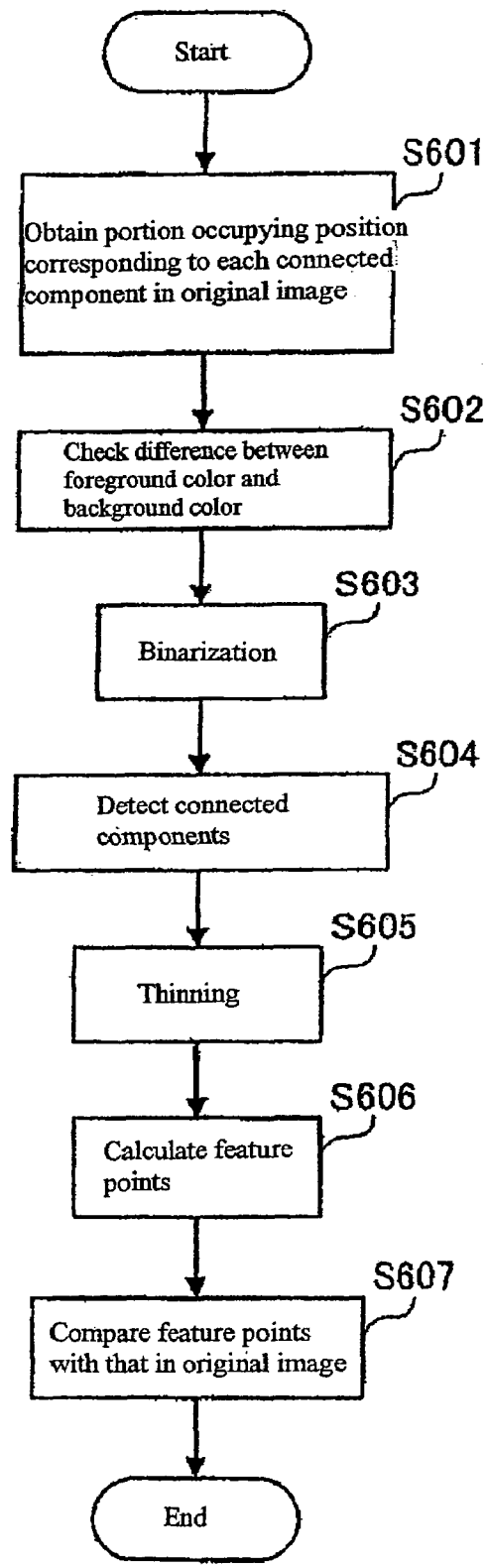

[Figure 37]
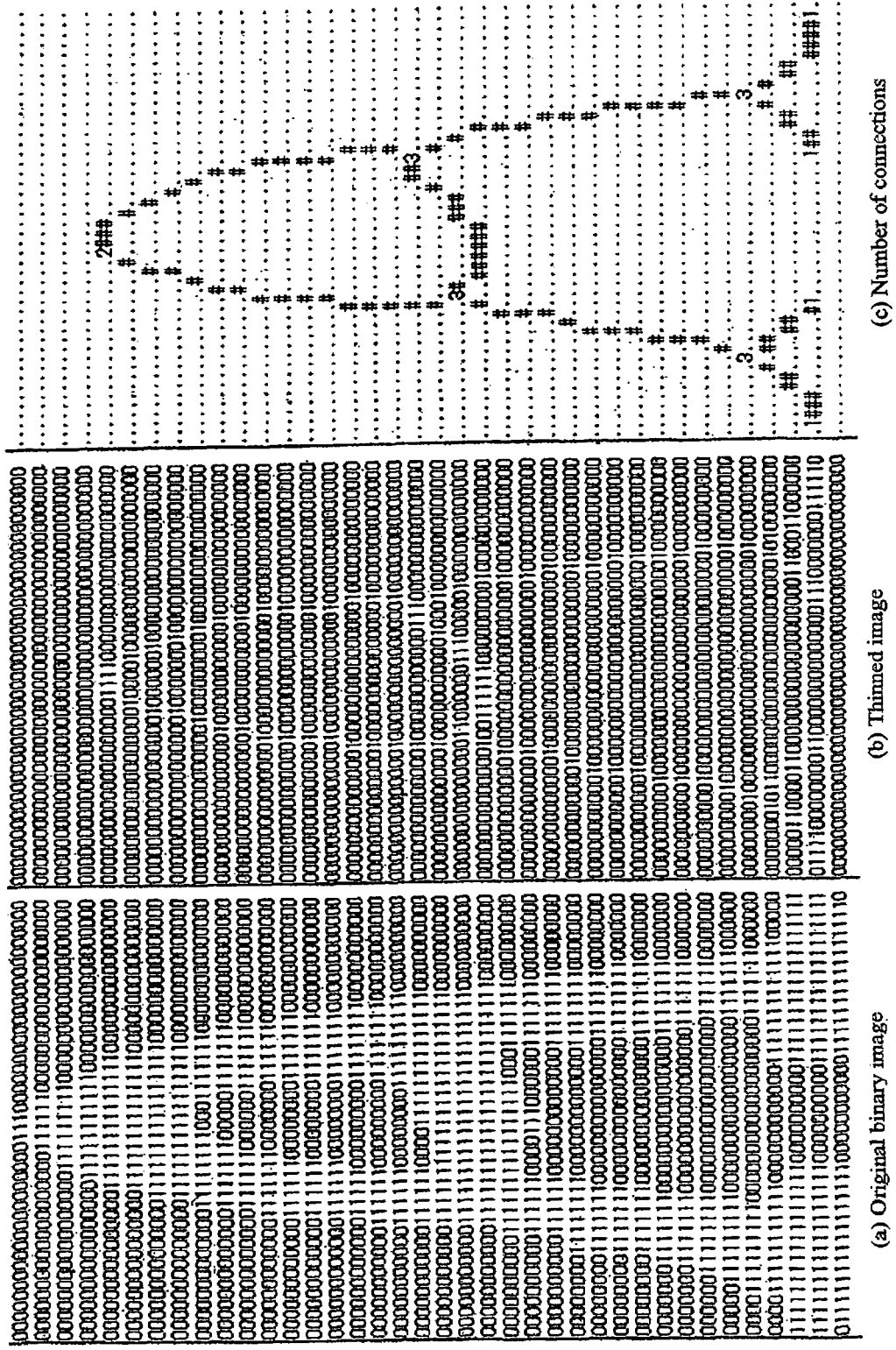
(a) Original binary image
(b) Thinned image
(c) Number of connections

[Figure 38]
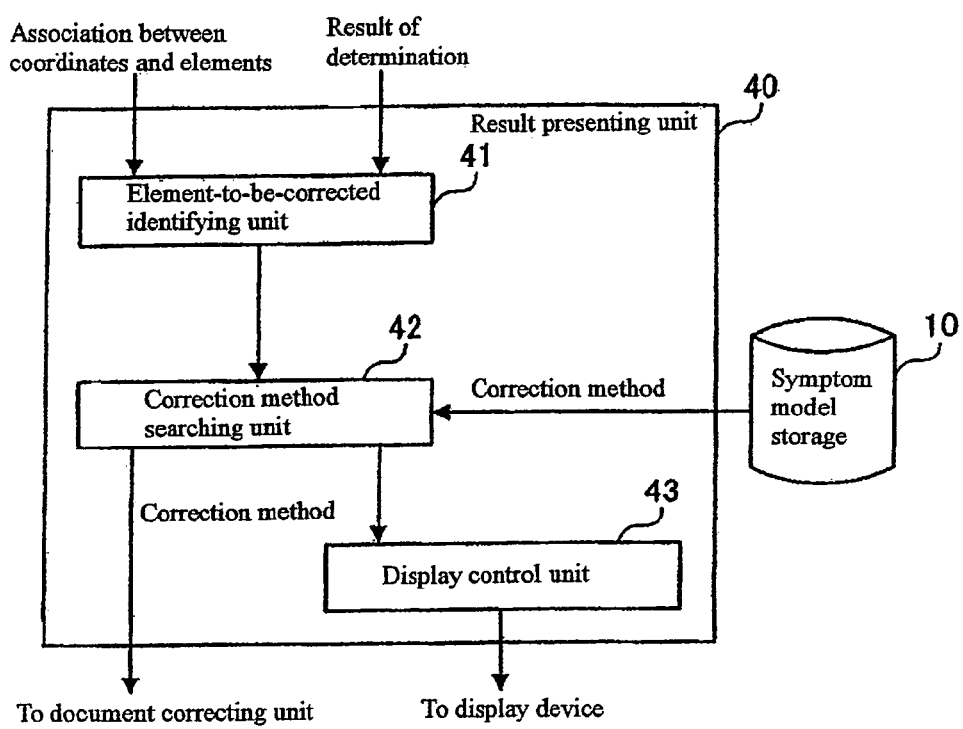

[Figure 39]
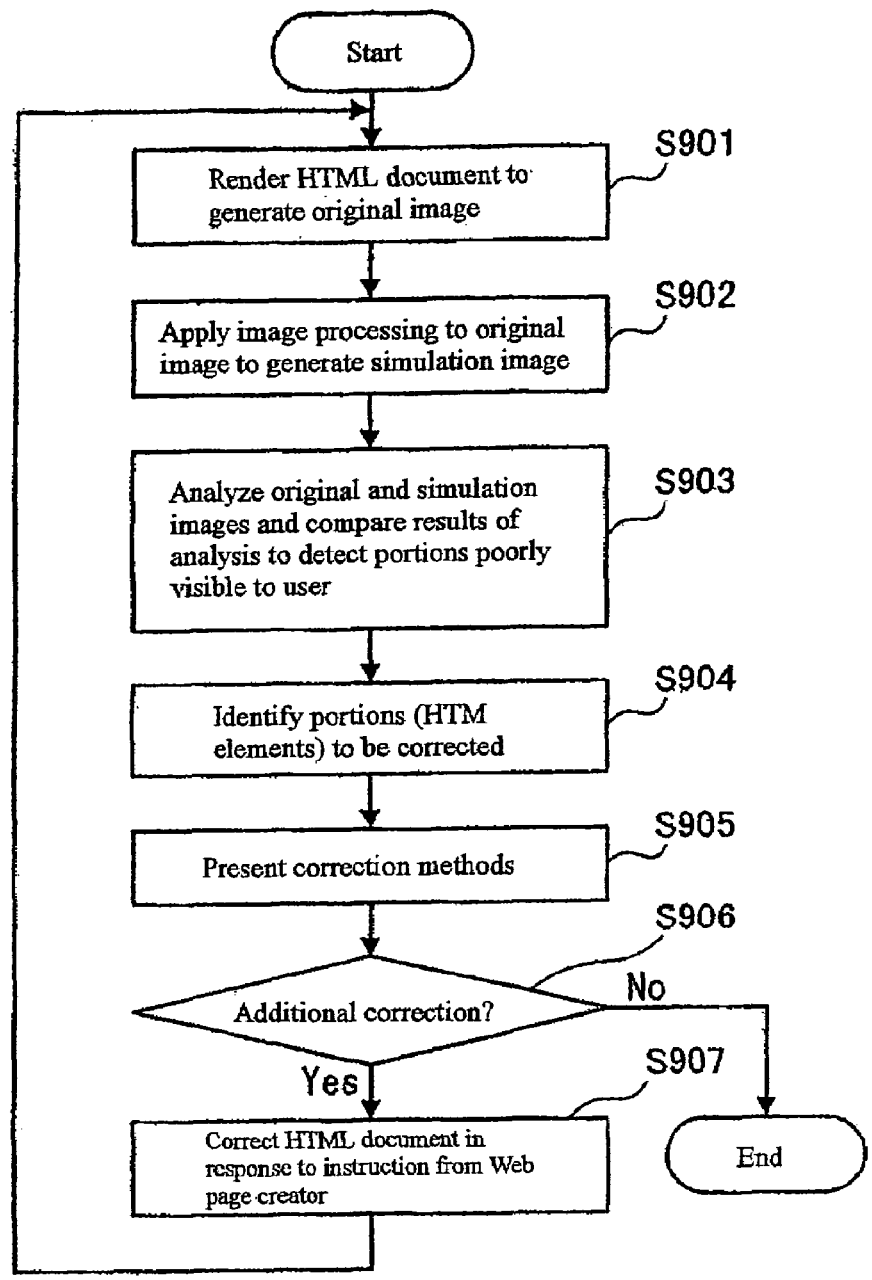

[Figure 40]
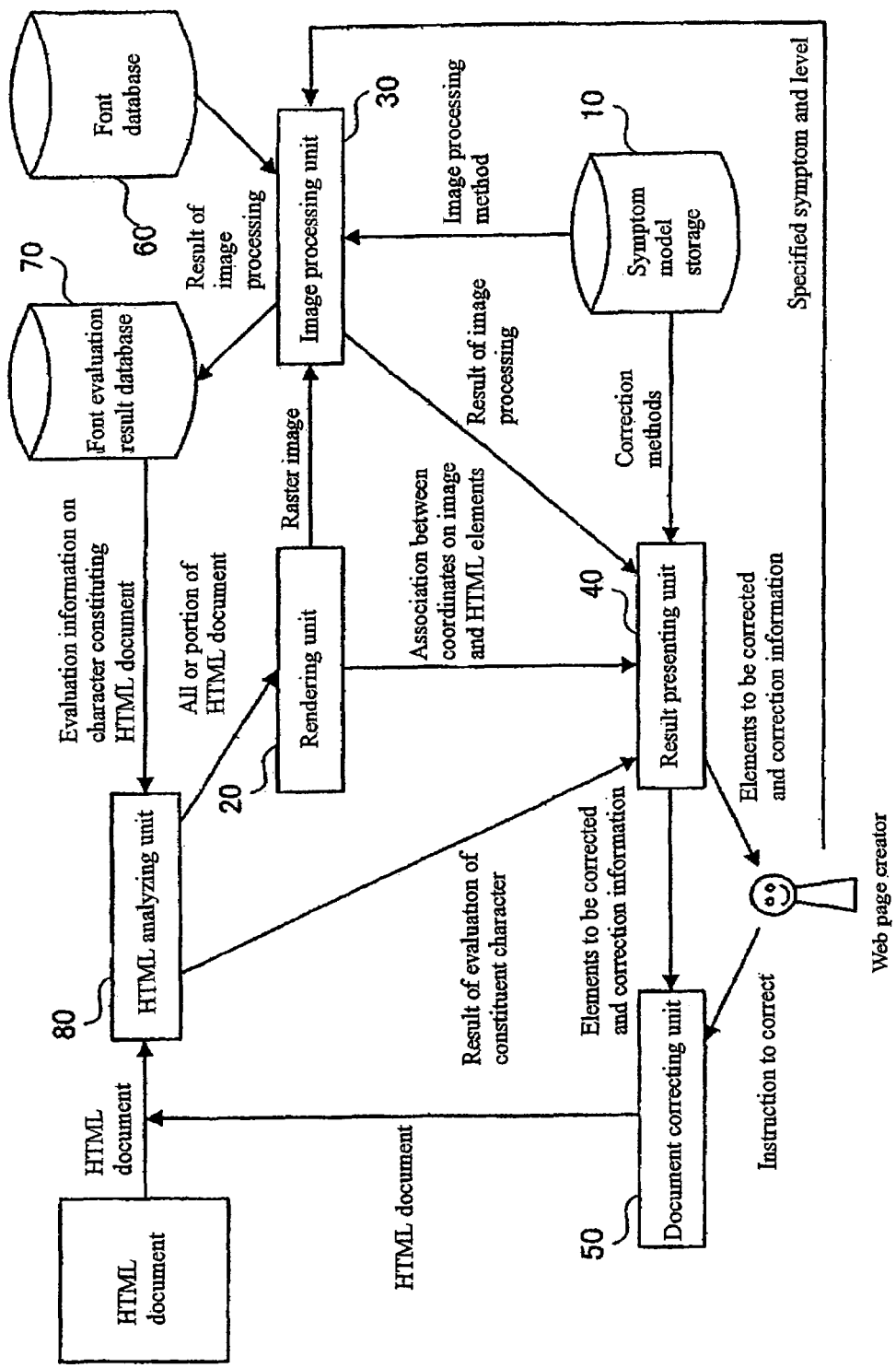

[Figure 41]
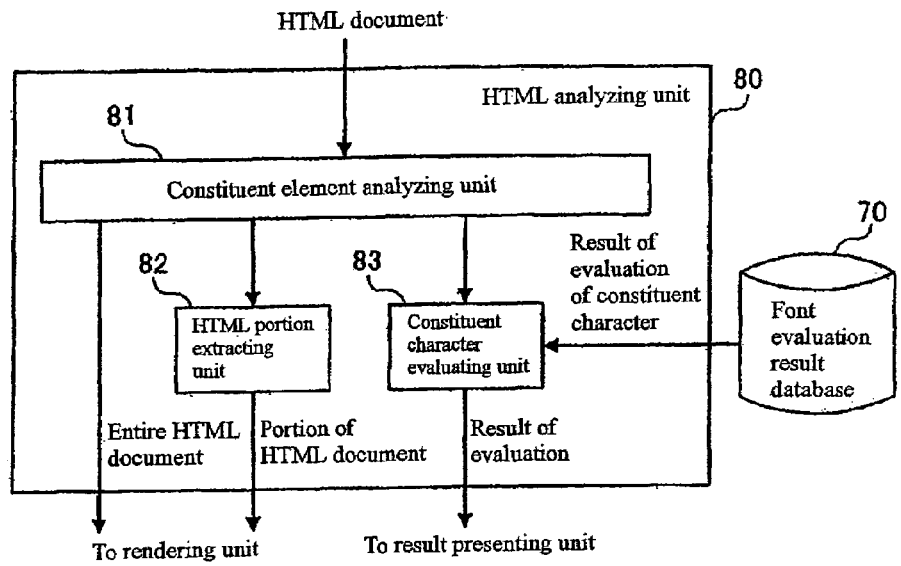
[Figure 42]
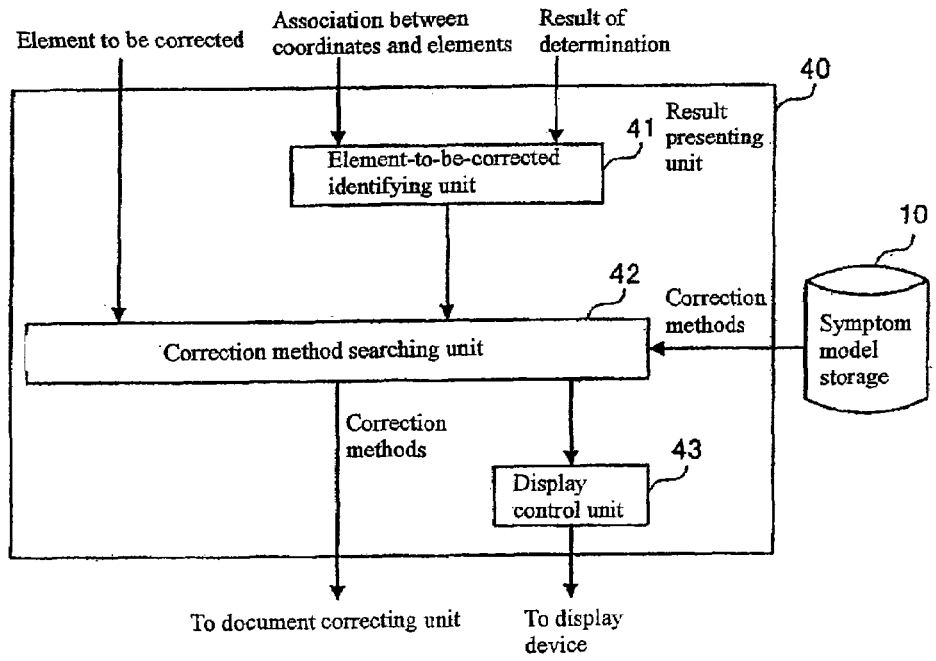

[Figure 43]
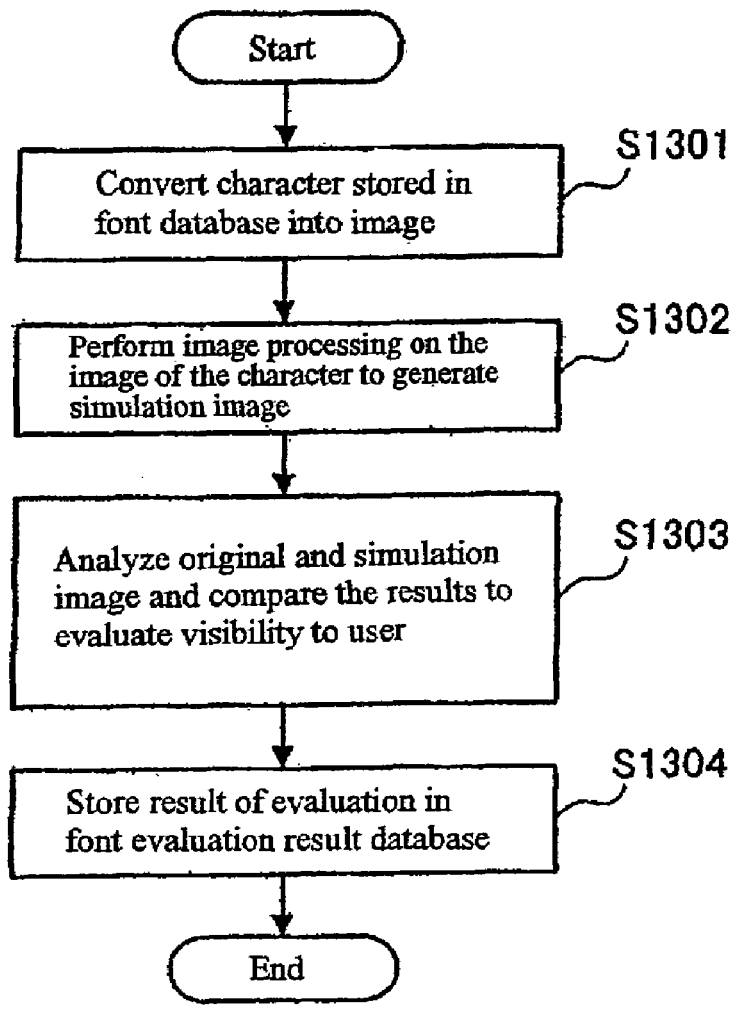

[Figure 44]
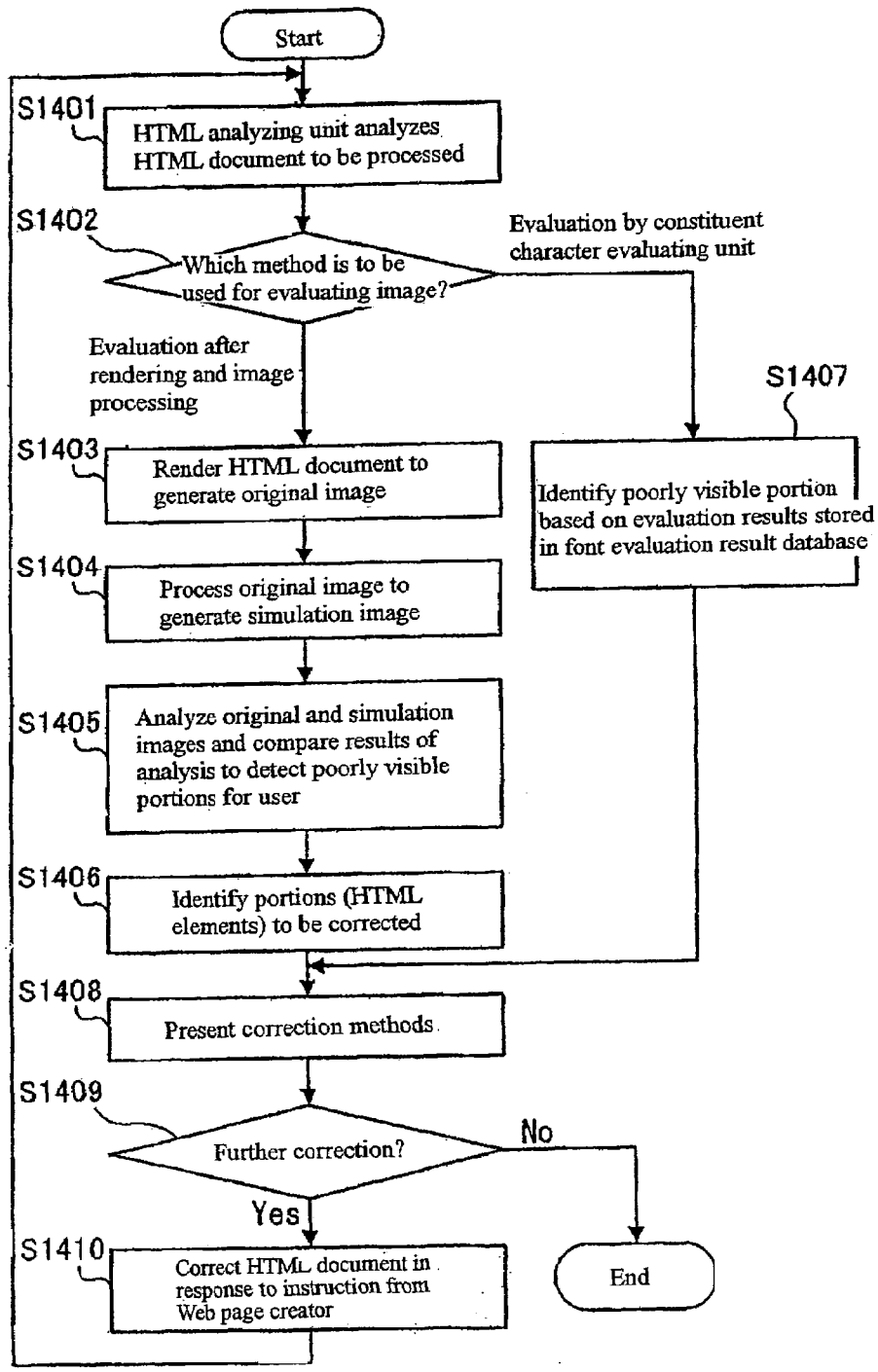

[Figure 45]
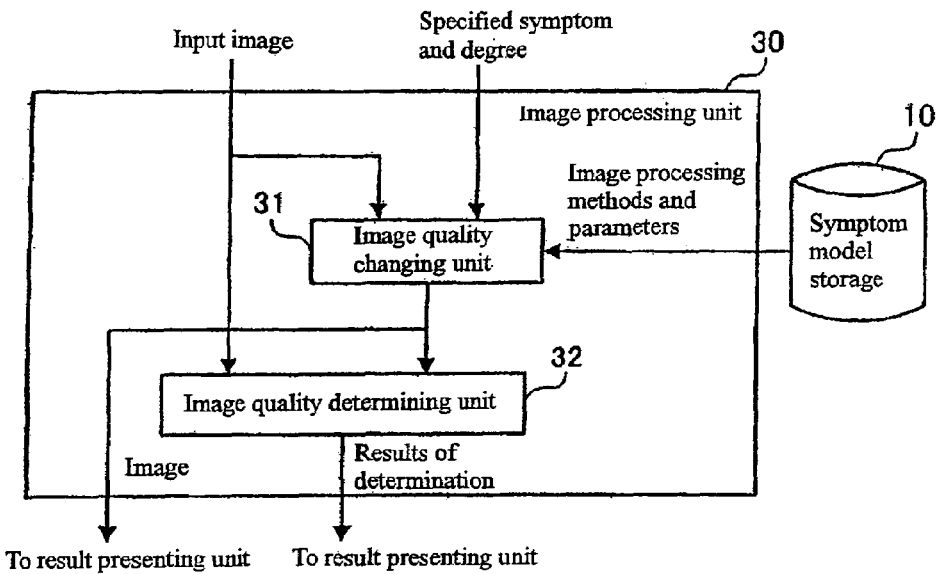
[Figure 46]
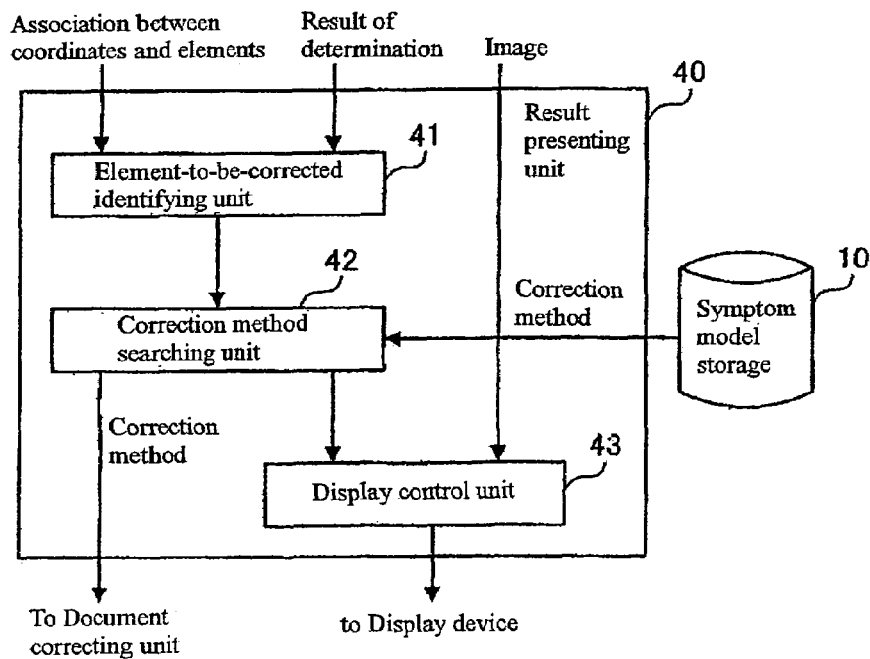

[Figure 47]
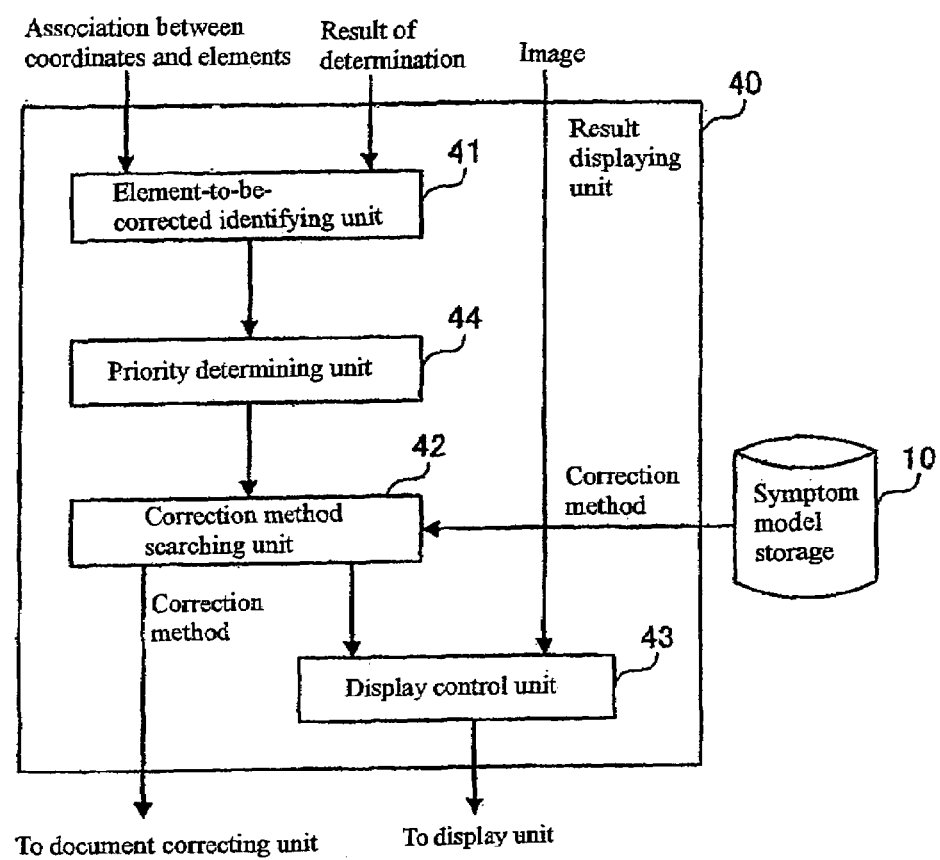

COMPUTER EVALUATION OF CONTENTS OF INTEREST

FIELD OF THE INVENTION

The present invention relates to a content evaluating program, a recording medium having the evaluating program thereon, contents evaluated by the program, a content producing program using the evaluating program, a content evaluating method, and a content evaluating system.

BACKGROUND ART

Greater importance is being placed on the accessibility to information today. For example, Japanese Industrial Standards Committee (JISC), which is the organization that establishes the JIS certification mark has developed the "Guideline for older persons and persons with disabilities—information and communications equipment, software and services (JISX8341), which is Japan's first standard that specifies detailed guideline on information accessibility. It also has announced detailed guideline on web accessibility. JIS standards are said to have a great influence, close to legal power, over the government and municipal offices in Japan, and the standard is likely to be included in requirements for procurement in building systems such as Web sites. Japan's amended Basic Law for Persons with Disabilities specifies that information service providers and information and telecommunications equipment manufacturers, in addition to national and local public entities, and telecommunications and broadcasting service providers, must cater for disabled people. Globally, there are W3C (World Wide Web Consortium) guidelines on Web accessibility.

Examples of systems that use a computer to automatically evaluate Web accessibility without human operations include an accessibility checker described in Non-patent Document 1, "Bobby TM (online)" (Internet URL: http://bobby.watchfire.com/) searched on Jul. 1, 2004. The accessibility checker allows violations of standards and problems in a Web site to be detected easily.

PROBLEMS TO BE SOLVED BY THE INVENTION

However, such an accessibility checker only points out problem portions in a Web site and thus displays practically not so serious violations and serious violations in an undifferentiated manner. Accordingly, when a Web site that makes no or inadequate provisions for accessibility or a large-scale site that provides a huge number of contents is evaluated, a large number of violations may be displayed in an undifferentiated manner, making it difficult to identify problems in a manner that reflects actual conditions or to correct problems efficiently.

SUMMARY OF THE INVENTION

Therefore, the present invention has been made in consideration of these technical problems. An aspect of the present invention is to provide an arrangement such as an evaluation program that enables problems to be identified over an evaluation of contents in a manner that reflects actual conditions.

An aspect of the present invention is to provide a content evaluating program for implementing the function of making a primary evaluation of the contents on the basis of one evaluation criterion; the function of making a primary evaluation of the contents on the basis of another evaluation criterion; and the function of making a secondary evaluation of the contents on the basis of a plurality of the primary evaluations.

An aspect of the present invention is to provide contents evaluated by a content evaluating program.

Also, an aspect of the present invention is to provide a content producing program using the content evaluating program.

An aspect of the present invention is to provide a content evaluating method including the steps of: making a primary evaluation of contents on the basis of one evaluation criterion; making a primary evaluation of the contents on the basis of another evaluation criterion; and making a secondary evaluation of the contents on the basis of a plurality of the primary evaluations. An advantage of the present invention is that contents can be corrected efficiently.

BRIEF DESCRIPTION OF THE DRAWINGS

For a more complete understanding of the present invention and the advantages thereof, reference is now made to the following description taken in conjunction with the accompanying drawings, in which:

FIG. 1 generally shows a Web network system;

FIG. 2 is a functional block diagram illustrating functions of an evaluating computer 3e;

FIG. 3 is a block diagram illustrating an exemplary hardware configuration of a computer according to an embodiment;

FIG. 4 is a flowchart illustrating a basic evaluation process performed by the evaluating computer 3e;

FIG. 5 schematically illustrating an operation of an importance level detecting unit of the evaluating computer according to an embodiment;

FIG. 6 illustrates a method for determining the levels of importance of link/form elements in a Web page W;

FIG. 7 schematically illustrates an operation of a recognizability detecting unit of the evaluating computer according to an embodiment;

FIG. 8 schematically shows an operation of a synthetic evaluation unit of the evaluating computer according to an embodiment;

FIG. 9 schematically shows an operation of a display unit of the evaluating computer according to an embodiment;

FIG. 10 schematically shows an operation of a recognizability detecting unit of the evaluating computer according to an embodiment;

FIG. 11 schematically shows operations performed by a user U on a Web site;

FIG. 12 shows the relationships between linked Web pages;

FIG. 13 shows an outline flowchart of a method for determining the recognizability;

FIG. 14 is a flowchart showing a process performed in a reaching time calculating unit;

FIG. 15 schematically shows an embodiment of a structured document and an outline of an embodiment of generation of a node reaching time table;

FIG. 16 is a functional block diagram of a content generating system;

FIG. 17 shows functional blocks of an assisting unit in detail;

FIG. 18 shows a data structure of a set used for reaching time to display position mapping and the corresponding display on a screen, using the DHTML document shown in FIG. 15;

FIG. 19 is an outlined flowchart of a Web page generation assisting method;

FIG. 20 shows an embodiment in which a menu for selecting or determining a display format is graphically displayed;

FIG. 21 shows an embodiment of a graphical display of times required to reaching given morpheme words;

FIG. 22 is a flowchart of an exemplary process for editing a structured document in the Web page generation assisting method;

FIG. 23 shows an embodiment of a graphical user interface displayed on the screen of a display unit by the content generating system performing the content generating method shown in FIG. 22;

FIG. 24 shows a screen display displayed when an author selects link generation for making edits;

FIG. 25 shows an embodiment of a graphic display on which reaching times of a Web page on which links to appropriate body text contents are provided is graphically displayed;

FIG. 26 shows an embodiment of another mode of displaying reaching times which can be used in assisting Web page generation;

FIG. 27 shows an embodiment in which the edit processing described above is modularized as an authoring tool of a Web page generating system for a content generating system;

FIG. 28 shows an embodiment that can provide a Web application;

FIG. 29 shows an embodiment of a graphical user interface displayed on the display unit of an author terminal when the content generating system provides a Web service thorough the network;

FIG. 30 shows an embodiment in which service log analyzing means is included in the Web page generation assisting system;

FIG. 31 schematically shows an exemplary hardware configuration of a computer implementing a data editing apparatus;

FIG. 32 shows a functional configuration of a data editing apparatus according to the present embodiment;

FIG. 33 shows an example of data stored in a symptom model storage according to the present embodiment;

FIG. 34 shows a configuration of an image processing unit according to the present embodiment;

FIG. 35 is a flowchart illustrating a process performed on an original image by an image quality determining unit;

FIG. 36 is a flowchart illustrating a process performed on a simulation image by the image quality determining unit;

FIG. 37 shows an example of thinning and calculation of the number of connections;

FIG. 38 shows a configuration of a result presenting unit according to the present embodiment;

FIG. 39 is a flowchart illustrating a flow of data editing with the present embodiment;

FIG. 40 shows another exemplary configuration of the data editing apparatus according to the present embodiment;

FIG. 41 shows an exemplary configuration of an HTML analyzing unit of the data editing apparatus having the configuration shown in FIG. 40;

FIG. 42 shows a configuration of a result presenting unit of the data editing apparatus having the configuration shown in FIG. 40;

FIG. 43 is a flowchart illustrating a flow of a preliminary process in data editing in the data editing apparatus having the configuration shown in FIG. 40;

FIG. 44 is a flowchart illustrating a flow of data editing made on an HTML document to be processed in the data editing apparatus having the configuration shown in FIG. 40;

FIG. 45 shows a variation of the configuration of the image processing unit;

FIG. 46 shows a variation of the configuration of the result presenting unit; and FIG. 47 shows another variation of the configuration of the result presenting unit.

DESCRIPTION OF SYMBOLS 11c, 12c, 13c . . . Client computer
2s . . . Server computer
3e . . . Evaluating computer (evaluating system)
N . . . Network
31a . . . Important level detecting unit (first primary evaluation unit)
31b . . . Recognizability detecting unit (second primary evaluation unit)
32 . . . Synthetic evaluation unit (secondary evaluation unit)

DETAILED DESCRIPTION OF THE INVENTION

The present invention provides methods, systems and apparatus for evaluation program that enables problems to be identified over an evaluation of contents in a manner that reflects actual conditions. In an example embodiment, the present invention provides—a content evaluating program for implementing the function of making a primary evaluation of the contents on the basis of one evaluation criterion; the function of making a primary evaluation of the contents on the basis of another evaluation criterion; and the function of making a secondary evaluation of the contents on the basis of a plurality of the primary evaluations.

The present invention also provides: contents evaluated by a content evaluating program; a content producing program using the content evaluating program; and a content evaluating method. An example embodiment of a content evaluating method includes the steps of: making a primary evaluation of contents on the basis of one evaluation criterion; making a primary evaluation of the contents on the basis of another evaluation criterion; and making a secondary evaluation of the contents on the basis of a plurality of the primary evaluations. An advantage of the present invention is that contents can be corrected efficiently.

Thus, the present invention provides an arrangement such as an evaluation program that enables problems to be identified over an evaluation of contents in a manner that reflects actual conditions. The present invention can be viewed as a content evaluating program for implementing the function of making a primary evaluation of the contents on the basis of one evaluation criterion; the function of making a primary evaluation of the contents on the basis of another evaluation criterion; and the function of making a secondary evaluation of the contents on the basis of a plurality of the primary evaluations. The present invention can be also viewed as contents evaluated by the content evaluating program. Also, the present invention can be viewed as a content producing program using the content evaluating program. The present invention can be also viewed as a computer-readable recording medium having the evaluation program recorded thereon. The present invention can be also viewed as a content evaluating method including the steps of: making a primary evaluation of contents on the basis of one evaluation criterion; making a primary evaluation of the contents on the basis of another evaluation criterion; and making a secondary evaluation of the contents on the basis of a plurality of the primary evaluations. The present invention can be also viewed as a content evaluating system including: a first primary evaluation unit for making a primary evaluation of contents on the basis of one evaluation criterion; a second primary evaluation unit for making a primary evaluation of the contents on the basis of another evaluation criterion; and a secondary evaluation unit for making a secondary evaluation of the contents on the basis of a plurality of the primary evaluations. An advantage of the present invention is that contents can be corrected efficiently.

While the present invention will be described below with respect to embodiments of the present invention and examples thereof, the embodiments and examples are not intended to limit the present invention according to the claims and not all of the combinations of technical fields described in the embodiments and examples are an absolute necessity for the present invention.

FIG. 1 is a diagram generally showing a Web network system to which the present invention can be applied. The Web network system includes the Internet 10 and multiple computers, each of which is connected to the Internet. The computers include client computers (hereinafter simply referred to as "clients") 11c, 12c, and 13c, a server computer (hereinafter simply referred to as the "server") 2s, and a computer (evaluating system) 3e for evaluating web-usability.

When users U1 to U3 perform Web browsing, the Web network system operates as follows. Each of Web browsers 110c, 120c, and 130c of the clients 11c, 12c, and 13c request an HTML document specified with an appropriate URL from the server 2s. Server software 20 on the server 2s delivers the specified HTML documents to the clients 11c, 12c, and 13c. Each of the clients 11c, 12c, and 13c receives the appropriate HTML document and each of the web browsers 110c, 120c, and 130c interprets the HTML document and displays them on a display.

In such a Web network system, information can be disclosed to many people. In order to provide information more people, it is necessary to store HTML document in a suitable format on the server 2s. For example, if user U1 is a vision-impaired listening user, a read-aloud function is included in the web browser 110c on the client 11c (or read-aloud software is installed in the client 11c separately from the web browser 110c) and the HTML document is read aloud to communicate it to user U1. In such a case, it is desirable that the HTML document be configured in such a manner that important information is read aloud earlier. Also, if user U2 is a weak-sighted user having a narrow visual range, user U2 can recognize a document only in a narrow range on the display of the client 12c. In such a case, it is desirable that the HTML document be configured in such a manner that important information is included in a narrow range within the field of fixation. Furthermore, if user 3 is an elderly person who is not good at manipulating pointing devices such as a mouse, it may be difficult for user 3 to scroll the screen or use pull-down menus. In such a case, it is desirable that the HTML document be configured in such a manner that important information can be reached without screen scrolling or pull-down menu operations, or important information can be reached with fewer operations.

That is, in order to communicate information to as many people as possible, it is necessary to evaluate whether an HTML document is easily accessible to various users and to modify the HTML if required. An HTML document stored on the server 2s may be evaluated or an HTML document may be evaluated before being uploaded to the server 2s, or during or after the preparation.

The present embodiment will be described with respect to an example in which computer 3e evaluates an HTML document stored on the server 2s and modify the HTML document as required. However, the present invention is not limited to such an embodiment. For example, computer 3e may evaluate an HTML document that was prepared on computer 3e or another computer (not shown) but has not yet been uploaded to the server 2s. Alternatively, each client 11c-13c may send a given URL (the destination of an HTML document stored on the server 2c) in response to an operation by a user U1-U3 to computer 3e to cause computer 3e to evaluate the HTML document stored on the server 2s and to deliver the result to each client 11c-13c.

FIG. 2 is a block diagram illustrating an exemplary hardware configuration of a computer 10 according to the present embodiment. The computer 10 includes a CPU section including a CPU 100, a RAM 120, and a graphic controller 146 interconnected through a host controller 110, an input-output section including a communication interface 144, a hard disk drive 124, and a CD-ROM drive 126, which are connected to the host controller 110 through an input-output controller 140, and a legacy input-output section including a ROM 122, a flexible-disk drive 128, an input-output chip 142, which are connected to the input-output controller 140.

The host controller 110 connects the RAM 120 with the CPU 100 and the graphic controller 146, which access the RAM 120 at higher transfer rates. The CPU 100 operates according to programs stored in the ROM 122 and the RAM 120 to control components of the computer. The graphic controller 146 obtains image data generated by the CPU 100 on a frame buffer provided in the RAM 120 and causes it to be displayed on a display device 148. Alternatively, the graphic controller 146 may contain therein a frame buffer for storing image data generated by the CPU 100 and the like.

The input-output controller 140 connects the host controller 110 with the communication interface 144, the hard disk drive 124, and the CD-ROM drive 126, which are relatively fast input/output devices. The communication interface 144 communicates with other devices through a network. The hard disk drive 124 stores programs and data used by the computer. The CD-ROM drive 126 reads a program or data from a CD-ROM 130 and provides it to the input-output chip 142 through the RAM 120.

Connected to the input-output controller 140 are relatively slow input/output devices such as the ROM 122, the flexible disk drive 128, and the input-output chip 142. The ROM 122 stores a boot program executed by the CPU 100 during boot-up and programs dependent on the hardware of the computer. The flexible-disk drive 128 reads a program or data from a flexible disk 132 and provides it to the input-output chip 142 through the RAM 120. The input-output chip 142 connects a flexible disk 132, and various input/output devices through ports such as a parallel port, serial port, keyboard port, and mouse port, for example.

A program to be provided to the computer is stored on a recording medium such as a flexible disk 132, a CD-ROM 130, a DVD-ROM, or an IC card and provided through a network by a user. The program is read from the recording medium and installed in the computer through the input-output chip 142 or read from another computer on the network and installed in the computer through the communication interface 144, and executed on the computer.

The program installed in each computer cause the computer to perform functions of its own. That web browsers 101c, 102c, and 103c are installed in clients 11c, 12c and 13c, respectively. Server software 20 is installed and HTML documents 21 are stored on the server 2s. A web evaluating software (evaluating program) 30 and Web page generating software 31 are installed in the computer 3e.

FIG. 3 is a functional program illustrating functions of an evaluating computer 3e. The computer 3e includes an importance level detecting unit 31a for detecting the level of importance of Web contents, a recognizability detecting unit 31b for detecting the recognizability of Web contents, a synthetic evaluation unit 32 for making a synthetic evaluation of the Web contents on the basis of the level of importance and the recognizability, and a display unit for presenting the results of the detection and determination to an evaluating user E. The functions of these components are exerted by hardware component of the computer described with reference to FIG. 2 together with the Web evaluating software 30 to be installed in the computer 3e.

FIG. 4 is a flowchart illustrating a basic operation for evaluation performed in the evaluating computer 3e. The importance level detecting unit 31a first detects the level of importance i(1) to i(n) of components (link/form elements, such as hyperlinks, forms, image maps, etc.) w(1) to w(n) of a Web page W. It continues this operation until the importance levels i(1) to i(n) of all components w(1) to w(n) in the Web page W are detected (S2). Then, the recognizability detecting unit 31b detects the recognizabilities a(1) to a(m) in the Web page W (S3). It continues this operation until all the recognizabilities a(1) to a(m) in the Web page W are detected (S4). Then, the synthetic evaluation unit 32 considers the importance level I and the recognizability A of the Web page W to evaluate the Web page W (S5). Finally, the display unit 33 presents the evaluation result to the evaluating user (S6). The order of the detection of the importance levels i (S1 and S2) and the detection of the recognizabilities a (S3 and S4) may be reversed.

The process of evaluation will be described below in detail.

First Embodiment

Evaluation for Voice Users

FIG. 5 schematically illustrates an operation (see S1 and S2 in FIG. 4) performed by the importance level detecting unit 31a of the evaluating computer 3e according to the first example. A Web page W to be evaluated includes a number of link/form elements w(1) to w(n). The link/form elements w(1) to w(n) have different levels of importance. The importance level detecting unit 31a determines the importance levels i(1) to i(n) of the link/form elements w(1) to w(n) and visually indicates link/form elements of lower importance dimmer and link/form elements of higher importance darker on a visualized importance level page I of the Web page W. For example a link/form elements w(i) in the Web page W has been found to be of high importance and the corresponding portion i(i) is displayed darker on a visualized importance level page I.

FIG. 6 illustrates a method performed by the importance level detecting unit 31a for determining the importance levels of link/form elements w(1) to w(n) in a Web page W. In detecting the importance level of a link/form elements w, the importance level detecting unit 31a takes the following items into consideration. First, the number of the pages and the quality of the Web page linked by a link/form elements. The quality of a linked Web page which are not linked from another link/form elements, a linked Web page which is a hub or authority and a linked Web page in which annotation information indicating that it is important is written by the author of the Web page are evaluated highly. Second, the number of forms at the site linked by a link/form elements and the quality of those forms. The quality of a form required for Web shopping is evaluated highly.

FIG. 7 schematically illustrates an operation (see S3 and S4 in FIG. 4) performed by the recognizability detecting unit 31b of the evaluating computer 3e according to the present embodiment. A Web page W to be evaluated includes a number of structured documents w(1) to w(m). The order in which the structured documents w(1) to w(m) are read by the browser of the client 11c is predetermined. The recognizability detecting unit 31b determine the times a(1) to a(m) at which read-aloud of the structured documents w(1) to w(m) will start and visually indicates structured documents that a listening user U1 can recognize (listen) earlier dimmer and indicates structured documents that take more time for the user to recognize (listen) darker on a visualized recognizability page A of the Web page W. For example, a structured document w(i) in the Web page W has been found to take more time for the listening user U1 to recognize and the corresponding potion a(i) on a visualized recognizability page A is displayed darker. The method for the recognizability detecting unit 31b to determine the recognizabilities of structured documents w(1) to w(m) in the Web page W will be described later (*1).

FIG. 8 schematically illustrates an operation (see S5 in FIG. 4) of the synthetic evaluation unit 32 of the evaluating computer 3e according to the present embodiment. The synthetic evaluation unit 32 considers the importance level I and recognizability A of a Web page W to evaluate the Web page W and indicates it as a visualized evaluation page E of the Web page W. In particular, the synthetic evaluation unit 32 compares the importance levels i(i) of link/form elements w(i) in the Web page W and the recognizabilities a(i) of the corresponding structured documents w(i) with each other to evaluate the link/form elements as an evaluation e(i) such that e(i)=i(i) ×a(i), for example, and represents the evaluation e(i) by shade of color. As a result, an important link/form elements whose structured document is not easily recognizable (a portion with a serious problem) is displayed darker, whereas a not so important link/form elements whose structured document is easily recognizable (a portion with an insignificant problem) is displayed lighter. For example, because a link/form elements w(i) is important but its corresponding structured document w(i) is not easily recognizable to listening user U1, the evaluation e(i) of that portion is low ant the portion is displayed darker.

FIG. 9 schematically illustrates an operation (see S6 in FIG. 4) performed by the display unit 33 of the evaluating computer 3e according to the present embodiment. The display unit 33 displays the screen shown in FIG. 9 on the display device 48 of the evaluating computer 3e. The screen includes a number of panels in frames. A first frame 148(1) contains a Web page W to be evaluated. A visualized evaluation page E for the Web page W is displayed in a second frame 148(2), next to the first frame 148(1). Files of the Web page are hierarchically displayed in a third frame 148(3). A comment C is displayed in a fourth frame 148(4) that points out a problem portion of the Web page W. A fifth frame 148(5) contains the evaluation of the entire Web page. Besides these items, a visualized importance level page I for the Web page W and a visualize recognizability page A, for example, may also displayed on the display device 148 of the computer 3e. Also, portions of the Web page W, the visualized important level page I, the visualized recognizability page A, and the visualized evaluation page E maybe displayed in a manner that they can be changed selectively.

The comment displayed in the fourth frame 148(4) may simply point out a problem portion or may also include advice for resolving the problem. In the present embodiment, a more important comment (a comment that points out a more serious problem) is marked with "!" to call attention of the evaluating user E. The evaluation of the entire Web page displayed in the fifth frame 148(5) may be one of A (good), B (acceptable) and C (bad), for example, according to the ratio of the dark portion to the entire visualized evaluation page E. A radar chart with three axes indicating the importance level I, recognizability A, and evaluation E may also be included.

Second Embodiment

Evaluations for Weak-Sighted Users and Elderly Users

While evaluation has been made for voice users in the first embodiment, evaluations for weak-sighted users and elderly users may be made in a similar manner. Evaluations for weak-sited users and elderly users will be described below, with the focus on differences from the first embodiment.

FIG. 10 schematically shows an operation (see S3 and S4 in FIG. 4) performed by the recognizability detecting unit 31b of the computer 3e according to the present embodiment. The Web page to be evaluated is not easily recognizable as a whole to a weak-sighted user. A weak-sighted user can relatively clearly recognize the fixation point but not clearly the surrounding regions. Also, it may be difficult for an elderly user to manipulate a mouse to display a pull-down menu. The recognizability detecting unit 31b indicates portions that are easily recognizable to a weak-sighted or elderly user are displayed dimmer and portions that are not easily recognizable a weak-sighted or elderly user are displayed darker on a visualized recognizability page A for the Web page W, according to the attribute of the user. The recognizability detecting unit 31 can analyze the structure of the HTML documents on the Web page to detect whether the page contains a pull-down menu. The method performed by the recognizability detecting unit 31 for determining the recognizability of a Web page W to a weak-sighted user will be described later (*2). Other procedures and operations are the same as in the first embodiment, the description of which will be omitted.

While evaluation for listening users U1 has been described in the first embodiment and evaluation for weak-sighted users U2 and elderly users U3 has been described in the second embodiment, these embodiments can be combined to evaluate a Web page suitable for all users U1 to U3.

Third Embodiment

Both of the first and second embodiments evaluate a Web page W. A third embodiment evaluates operations performed by a user U on a Web site (scenario performance) in addition to the evaluation of the Web page.

FIG. 11 schematically illustrates operations (scenario performance) by a user U on a Web site. For example, when a user does shopping on a Web site, the user navigates through pages, such as a Web page W(1) for selecting a commodity, a page W(2) for user authentication, and a page W(3) for specifying the commodity delivery address, and then reaches a page W(k) for finally confirming the shopping. In this embodiment, a series of user operations is evaluated.

In particular, first, the importance level detecting unit 31a raises the level of importance of link/form elements essential to the scenario S. Second, the importance level detecting unit 31a evaluates the level of importance I(S) of the scenario S. Third, the recognizability detecting unit 31b evaluates the recognizability A(S) of the scenario S. Fourth, the synthetic evaluation unit 32 makes a synthetic evaluation E(S) of the scenario S. Fifth, the display unit 33 displays the importance level I(S), recognizability A(S), and synthetic evaluation E(S) of the scenario S, a bottleneck Web page, a comment about link/form elements, and other information.

Fourth Embodiment

When the importance level detecting unit 31a performs the detection of the importance level i of each link/form elements w, it takes the number of Web pages at a linked form w into consideration, as shown in FIG. 6 of the first embodiment. By using this, the synthetic evaluation unit 32 can evaluate the number of easily recognizable Web pages among lower-level Web pages on the basis of the recognizability a of each link/form elements w and the number of the lower-level Web pages linked from the link/form elements. Furthermore, the synthetic evaluation unit 32 can evaluate the number of easily recognizable Web pages, in consideration of the recognizability of a link/form elements from which a link to be evaluated is provided.

For example, suppose that a Web page W(1) is linked only from a link/form elements w(1-1) of a higher-level Web page W(1-1) and the link/form elements w(1) of the Web page W(1) links to a large number of Web pages W, as shown in FIG. 12. Also, suppose that the recognizability of the link/form elements w(1-1) is low whereas the recognizability of the link/form elements w(1) is high. If the synthetic evaluation unit 32 does not take the link/form elements w(1-1) of the higher-level Web page W(1-1) into consideration, the synthetic evaluation unit 32 determines that the large number of lower-level Web pages W are easily recognizable. On the other hand, if the synthetic evaluation unit 32 takes the link/form elements w(1-1) of the higher-level Web page W(1-1) into consideration, the synthetic evaluation unit 32 determines that the large number of lower-level Web pages W are hard to recognize.

Fifth Embodiment

In the fourth embodiment, the number of easily recognizable Web pages is evaluated. The synthetic evaluation unit 32 can also evaluate the number of easily recognizable Web pages/the number of all Web pages.

While the first to fifth embodiments have been described by taking Web contents as an example of contents to be evaluated, the present invention is not so limited. The present invention can be applied to any contents operated by a user, such as a series of operation panels of an automatic teller machine, a series of panels for the development of a software program, a series of panels of a car navigation system, or panels of an electric appliance (setting panels of a television set, VTR, or hard disk recorder), as well.

(*1) A method, for determining the recognizabilities of structured document w(1) to w(m) in a Web page W will be described below, including variations thereof. FIG. 13 shows an outline flowchart of a method for determining the recognizability. At step S10, a Web page W to be presented to a voice user is read out. At step S12, the read structured document are input into the reaching time calculating means (recognizability detecting unit 31b), where the reaching time required for reaching a given node is calculated from a node in the structured document obtained based on a tag or an identifier, or the links to the nodes. The reaching time calculating means uses data such as a normal read-aloud speed used by particular voice synthesizing software or a standard speech speed as well as the number of words encountered until the node is reached to calculate the time required for producing the voice synthesis of the obtained node. The reaching time obtained is stored temporarily in appropriate storage (the recognizability detecting unit 31b).

At step S14, a display format corresponding to the reaching time calculated for the obtained node is determined in response to a command from an evaluating user E. For example, a pseudo-code "get color [ ]" which allows the user E to input a color code for specifying a color may be provided as an input command, and the evaluating user E may specify "#0000000" (black) as the color. Other example of input command maybe commands that specify a gray-scale level, shading, brightness, text expressions, and the like. Typical display formats may be registered beforehand. The method then proceeds to step S16 where nodes, the reaching time for each of the nodes, and the structured documents are read by converting means (the recognizability detecting unit 31b) and the nodes are mapped to the positions on the screen at which the nodes are to be displayed, which are specified in the node, the reaching time and the structured document, to generate a time display mapping table, which is then stored in appropriate storage. The time display mapping table is used for assigning display format to node display areas in a Web page on the display screen for display.

Then, at step S18, browsing means is used to display the Web page in which the reaching times are reflected, thereby visually indicating the times required for reaching each node to an author of the Web page to allow him/her to visually identify user's accessibility for voice browsing.

FIG. 14 is an outline flowchart of a process performed by the reaching time calculating means. The reaching time calculating means cause the structured document of interest to be read into parser means at step S20. At step 22, a DOM (Document Object Model) tree structure is obtained from the read structured document, and the DOM tree structure obtained is stored in appropriate storage. Examples of DOM tree structures that can be used include those compliant with the specifications for various types of browser software such as Netscape Navigator (trademark) and Internet Explorer (trademark) as well as those compliant with specifications provided by W3C.

The DOM tree structure data stored is then read into read-aloud node string generating means (the reaching time calculating means) and intra-page link analyzing means (the reaching time calculating means) at step S24. At step S26, the read-aloud node string generating means sorts the nodes in the DOM tree structure in an appropriate order to generate a read-aloud node string to be input in voice synthesizing software and stores it in appropriate storage. At step S28, tags specifying intra-page links are analyzed and the contribution of the intra-page links to the reaching time are calculated in consideration of the effect of junks and skips of links, for example, and stored inappropriate storage. At step S30, the stored read-aloud node string and the contribution of the intra-page links are read from the storage and at the same time the read-aloud speed normally used in the voice synthesizing software and an experimentally obtained speech speed are read from the storage for example. At step S32, the time required for reaching each of the nodes in the given read-aloud node string is calculated. At step S34, the obtained nodes and the times required for reaching the nodes are associated with each other and stored in a storage as a node reaching table, for example.

FIG. 15 schematically shows an outline of generating node reaching time table. The assumption in the following description is that the structured document in FIG. 15 is a DHTML document. The parser means 12 reads and parses the DHTML documents to generate a DOM tree structure 14. The reaching time calculating means calculates the time required for reaching each of the nodes obtained in the DOM tree structure 14 by using a normal read-aloud speed read from an appropriate memory such as RAM or ROM. The node reaching times t1 to t5 are registered in association with the nodes in the DOM tree structure 14 and a node reaching time table 18 is generated and stored in appropriate storage.

FIG. 16 schematically shows a functional block diagram of a content generating system 20 (evaluating computer 3e). As shown in FIG. 16, the content generating system 20 includes a database 22 which mainly stores structured documents written in HTML, DHTML, XML, and SGML, an information processing unit 24 which executes Web page generation according to the present invention, and a display unit 26 including a screen for presenting a generated Web page and the time required to reach morpheme words in voice browsing to the author of the Web page. According to the present invention, the information processing unit may be configured as a computer including a storage, a central processing unit (CPU), and an input/output interface.

The database 22 further stores image data and audio data used for generating content to be provided as a Web page, in addition to the structured documents. A content is sent to a user through a Web server, which is not shown, over a network, for example the Internet, in response to a request from the user. Various types of links such as JSP, Servlet, Applet and CGI, can be embedded in a structured document to provide WYSIWYG functionality to the user. It is assumed in this description that the content generating system 20 shown in FIG. 16 is a dedicated processing apparatus that is provided separately from the Web server and mainly assists in generating or editing a Web page. However, the content generating system 20 may be included in a Web server 28 as a function of the Web server 28.

The information processing unit 24 shown in FIG. 16 further includes a storage 30 including a suitable memory and hard disk, a source document editor 32, a WYSIWYG editor 34, an assisting unit 36, and a browsing unit 38. The storage 30 temporarily stores a structured document from the database 22 and also stores the result of processing performed by each functional block temporarily or as long as necessary.

The source document editor 32 is configured as a software block that can generate and edit structured documents, such as HTML, DHTML, XML, and SGML document. The WYSIWYG editor 34 can use various types of links contained in a structured document to link image data, audio data, and other documents to generate and provide contents in a format required by a user.

The browsing unit 38 reads a structured document stored temporarily in the storage 30 and display a content generated by referring to the WYSIWYG editor 34 on the screen of the display unit 26. The author interactively creates and edits a content while visually recognizing the content displayed on the screen.

The assisting unit 36 has an assisting function that visually provides voice user's accessibility to a content to the author of the content. The assisting unit 36 reads a structured document from the storage 30, analyzes it to obtain the nodes in a DOM tree structure, and estimates the time that will elapse before a node is read aloud through synthetic voice by voice synthesizing software installed on a user terminal. If the assisting unit 36 can use the same voice synthesizing software running on the user terminal, the assisting unit 36 can estimate the time more precisely.

Furthermore, the assisting unit 36 uses nodes and the reaching time calculated for each node, and display positions on the screen to perform mapping to generate a time display mapping table and stores it in the storage 30, as will be described later.

FIG. 17 is a diagram showing functional blocks of the assisting unit 36 in detail. As shown in FIG. 17, the assisting unit 36 include reaching time calculating means 40, a conversion determining means 42, and converting means 44. The reaching time calculating means 40 includes parser means 46, read-aloud node string generating means 48, intra-page link analyzing means 50, and calculating means 52. The reaching time calculating means 40 first reads a structured document from the storage 30 and causes the parse means 46 to parse the document, obtains the nodes in the structured document, generates a DOM tree structure as hierarchical structure of the nodes, and stores it in appropriate storage 30. The read-aloud node string generating means 48 reads the generated DOM tree structure, extracts the nodes, sorts the node strings according to a given criterion to generate a read-aloud node string, and stores it in appropriate storage 30. The intra-page link analyzing means 50 identifies the intra-page link structure in the structured document, calculates the time required to reach a link that contributes to the read-aloud node string, and stores it in the storage 30.

The calculating means 52 reads the generated read-aloud node string and the contribution of the link from the storage 30 and also reads a normal read-aloud speed used by the voice synthesizing software from, for example, a memory or storage 30, and calculates the time that will elapse between the start of voice synthesis of a node and the completion of the voice synthesis, that is, the reaching time. The reaching time calculated for each node is stored in the storage 30 along with the corresponding node. Thus, the reaching times and nodes are stored as the node reaching time table described above.

The conversion determining means 42 determines a display mode and a display format used in graphically displaying the reaching time of each node. In the present invention, a distinctive mode in which a reaching time is displayed on a screen is referred to as a display mode and visual features such as gradation and a display color associated with a reaching time in a given display mode are referred as a display format. The conversion determining means 42 receives commands such as a display mode specifying command, a display format specifying command, and a change command for changing a reaching time (change reaching time command) input by an author and causes the reaching time calculating means 40 and the converting means 44 to perform a process according to the command.

The conversion determining means 42 may include a display format—reaching time association data. The display format—reaching time association data may take the form of a table, in which reaching times below a predetermine value are indicated at a transparency of 100% and longer reaching times are indicated at decreasing transparencies, or the lightness of the display color may be gradually decreased. FIG. 17 shows an embodiment of the display format—reaching time association data as a graph of reaching time versus transparency.

The converting means 44 obtains the display position of the last node to be displayed from the display position of the starting node in a structured document that starts with an identifier, for example the <Body> tag a screen area for displaying in a selected display mode. At the same time, the converting means 44 receives a command for specifying a display format from the conversion determining unit 42 and refers to the time display mapping table to obtain a gradation so that a corresponding node can be displayed with a gradation determined by the node reaching time. At this stage, the node reaching time table created and stored beforehand is read and a node identifier associated with the node is used as a key to perform node—reaching time—display position mapping to generate a time display mapping table.

Then, the converting means 44 insert required tags in the structured document to generate an edited structured document and stores it in the storage 30, for example. The edited structured document is transient data used in adding voice browsing functionality to a content while creating the content and used to determine voice user's accessibility with voice synthesis.

The edited structured document into which identifiers associated with display modes are inserted is input into the browsing unit 38. The browsing unit 38 displays the voice browsing accessibility to the Web page in a simulative manner on the screen of the display unit 26 for the author of the Web page that is visual access user. The edited structured document generated according to the present invention may be generated as a structured document containing only tags specifying appropriate display formats from the node—reaching time mapping table described above. In that case, the edited structured document may be superimposed and displayed on the original structured document being processed. According to the present invention, display positions may be represented by positional coordinates on the screen or may be represented by a display cursor.

FIG. 18 is a diagram showing a data structure of a set used for the reaching time—display position mapping described above and its corresponding display on the screen in which the DHTML document shown in FIG. 18 is used. FIG. 18(a) shows an embodiment of a read-aloud node string and FIG. 18(b) schematically shows an embodiment of the screen display according to the present invention. The read-aloud node string contains only a small number of characters as shown in FIG. 18(a) because a relatively simple DOM tree structure is used. It is assumed here that the E-mail address "japanibm@sin-seihin.co.jp" is produced as synthetic voice by voice synthesizing software. A gradation with a transparency of 100% is assigned to this region by the conversion determining means. Shown in FIG. 18(b) are the screen 60 of the display unit 26 and a node 62 displayed on the screen 60.

As shown in FIG. 18(b), a black gradation is provided to the nodes that are voice-synthesized after a predetermined reaching time to hide them. On the other hand, the node whose voice synthesis completes within the predetermined reaching time has no gradation provided and is indicated clearly. The light and shade on the screen correspond to the times required to obtain information externally used by a voice user. Therefore, according to the present invention, at which of the time points displayed as the nodes on the entire screen the voice user can obtain desired synthesized voice can be visually recognized as shown in FIG. 18.

Other configurations maybe used that allows the order in which a content is read aloud to be known more specifically and facilitates determination as to whether which intra-page link affects which element in the case where a page is divided into regions with page indexes. In particular, an embodiment may be used in which the relation between an intra-page link and a content may be displayed on the screen and the portion in the page that is enclosed in the intra-page link is displayed in a distinctive color as "a chunk of meaningful content". In that case, different gradation colors other than black may be used in different "chunk of meaningful content" regions or the boundaries may be indicated by lines.

In addition to colors or color gradations, other visualization techniques, which will be described later, and combination of the techniques may be used. Embodiments of visualization techniques will be described later in detail.

FIG. 19 is a flowchart outlining a Web page generation assisting method according to the present invention. The Web page generation assisting method shown in FIG. 19 reads a structured documents such as a DHTML document from a database and generates a DOM tree structure by the parser means at step S50. At step S52, the generated DOM tree structure is used to display a Web page in HTML on the screen of the display unit.

At step S54, a signal for selecting a display mode or a display format for a reaching time is input by the author of the Web page. For this purpose, the author clicks a "Simulation of correction" menu provided as a tool bar, for example, to display a menu and selects the "Time required to reach body text" option to send a corresponding command to the conversion determining means.

The method of the present invention then proceeds to step S56, where the display mode or display format is determined from the input command and an edited structured documents generated by the conversion means is displayed on the screen to indicate the reaching time. At step S58, when the author checks the displayed reaching time and selects the "Reedit" option, for example, from the menu bar, a reedit command is sent to the conversion determining means, which causes the information processing unit to start are edit process. When receiving the reedit command, the information processing unit starts execution of the reedit process. In a specific embodiment of the reedit process, a source document editor may be activated and the structured document being displayed may be directly edited to insert link to the body content.

Considering that the reaching time is determined mainly by a read-aloud node string, the read-aloud node string and the structured document may be read from storage 30 to the source document editor, a character string, "Do you want to stop the read-aloud and jump to the body content?" which includes a link to the body content may be inserted in the read-aloud node string and a link may be inserted in the corresponding position in the structured document. If there is the above-described intra-page link, the nodes are sorted in such a way that the node corresponding to the linked-to content is placed in a proper position in the order of the nodes in the read-aloud node string.

The edited structured document is displayed on the screen and the reaching time is graphically displayed at step S60 and the process described above is repeated until an input command indicating that the accessibility is satisfactory to the author is received from the author at step S62. The signal in the present invention that indicates that accessibility is satisfactory may be an end edit command (E) or a store command (S), or any other command that has the function equivalent to these commands. At step 64, the edited DHTML document is stored in a database, and thus the Web page with an improved accessibility for audio users can be provided.

FIG. 20 shows the screen on which menus for selecting or determining a display format are displayed in accordance with the operations at steps S52 and S54. As shown in FIG. 19, when the author clicks and enters the "Simulation of correction" menu, the conversion determining means displays a correction menu. If at this point the author selects the "Time required to reach body text" option, a menu from which a display option such as "Gradation of display color" can be selected pops up. If the author selects the "Gradation of display color" option, then "color selection" input menu is displayed. Then a command for determining a display format is sent to the conversion determining means.

FIG. 21 shows an embodiment of the graphical display of the times required to reach given nodes, which is displayed when the author selects the operation at step S56 by using the procedure shown in FIG. 8. In FIG. 21, the time required to each node when a voice browser (voice processing software such as a homepage reader) is used to read aloud a page from its beginning. The times required to reach the nodes are displayed in different gradations in FIG. 21. In the embodiment shown in FIG. 21, black is selected as the display color and deeper black indicates longer reaching time.

FIG. 21 shows accessibility of audio browsing in the case where the "Top news" and "Recent news", which are most important information in FIG. 21, are displayed in the center of the page because the page does not contain a "direct link to the body text". Because the body content is at the rear in the read-aloud node string, the body content is displayed in the deepest black to indicate the accessibility is inadequate. As show in FIG. 21, which of the portions displayed on the screen is difficult to access can be visually identified with the graphics display of the present invention.

FIG. 22 shows a flowchart of an exemplary process for editing a structured document in a Web page generation assisting method of the present invention, shown at step S58. The embodiment shown in FIG. 22 illustrates an editing process for improving the accessibility for audio users without needing major change to the Web page by an author or administrator. In the process in the content generating method of the present invention shown in FIG. 22, the information processing unit first reads and displays a structured document such as a DHTML document at step S70. Then, at step S72 the "Simulation of correction" menu provided on the screen of the display unit is selected and the "Reduce time required to reach body text" option is selected. In the field of "Reduce time required to reach body text" in step S72, for example the pseudo-code command "edit speech node series [ ]" for editing a read-aloud node series or the command "edit source document [ ]" for editing a structured document may be registered beforehand to allow the author of the Web page to directly make desired edits to the read-aloud node strings or DHTML.

At step S74, the process provides a reaching time display on the screen and waits for the selection or input by the author of the edit operations provided beforehand. The provided operations provided beforehand at step S74 may include operations described with respect to FIG. 20, an operation for inserting a link at the top of a Web page in order to synthesize a morpheme word that provides a link to the desired body content, and an operation for creating a page index. Any other edit operations may be used that can reduce the time required to reach a body content.

For example, such edit operations may include an operation for searching, extracting, and displaying on the screen a node in which a link to image data without an ALT attribute for describing for voice users a content that voice users cannot recognize is given, or a node in which an unnecessary ALT attribute is added to an spacer image, or a node in which an ALT attribute can mislead or confuse voice users.

The content generating methods then proceeds to step S76, where a source document editor is activated and, in response to an input from the author, performs an edit operation in accordance with the input to generate an edited structured document, and store it in appropriate storage at step S78. At step S80, the edited structured document is displayed on the screen through the browsing unit, and then the process returns to step SS62 to allow the author to reedit the Web page, based on determination as to whether or not the edit result is reflected in the Web page, or whether or not the page provides adequate accessibility.

FIG. 23 shows an embodiment of a graphical user interface displayed on the screen of the display unit by the content generating system performing the content generating method described with respect to FIG. 22. No edit for improving accessibility has been made to the Web page in FIG. 23 and reaching times are in the order of the read-aloud node strings. Accordingly, morpheme words that enable linking to the body content are disposed in an area in black, which indicates long reaching times, for example in the area indicated by the outlined symbol EC.

In this content generating method, a massage is displayed, saying, "This page has no link at the top of the page. So it takes about 220 seconds to access the body content. The two methods are available for correcting this: 1. Insert a link in the body. 2. Crete a page index (table of contents).", for example.

FIG. 24 shows a screen display which are displayed when the author selects option 1 in order to make edit. In FIG. 24, the author wants to insert a link to the body content. In that case, the content generating system according to a certain embodiment refers to a time display mapping table associated with the structure document being edited and automatically selects a number of appropriate link positions. Then, the display field of the corresponding rear node in the selected link positions is presented to the author with a changed color and highlight. In the embodiment shown in FIG. 24, the information processing unit analyzes the time display mapping table to provide candidate positions for displaying the body content and outlines the filed of the rear node.

At the same time, the information processing unit displays a message, "Click on appropriate one of the candidate starting positions of the body content, if any. If there is no appropriate position in the candidates, click on any appropriate body content link position in the page.", and then is controlled to place in a wait state for an input such as a click by the author. Then, a prompt, for example, "Enter link-to data or a URL address to link to." is displayed and a filed for entering link-to data or a URL address pops up. When the author clicks on a position where a given node is displayed on the display screen shown in FIG. 24, the information processing unit obtains the node associated with that position on the screen, then inserts a sentence that specifies a link to the body text in the position immediately before the position of the description in the structured document of the obtained node, for example "Skip the remaining explanation and see the body content" in the read-aloud node strings, and at the same time, inserts a link command and link-to data or a URL address that enables the link immediately before the corresponding node of the structured document. With the process described above, a link can be inserted in an appropriate reaching time and can prevent omission of description of the address to link to.

The author can drag and drop the body content to a desired position to specify the position where the body content is to be displayed and insert a link to the corresponding body content. Furthermore, the author may cause voice synthesizing software to be installed in the information processing unit and may cause it to read aloud a node string in order to make sure that the edit made above is actually reflected in the synthesized speech.

FIG. 25 shows an embodiment of a graphics display of Web page reaching times in which links to appropriate body contents are provided. As shown in FIG. 25, the accessibility of the Top news and Recent news regions are displayed with a lighter color gradation. Thus, it can be seen that the accessibility to those regions has been improved by the edit made according to the present invention. As shown in FIGS. 23 to 25, the author can interactively create contents in such a manner that setting of an inappropriate ALT attribute is avoided and the accessibility to an important body content is improved while checking the accessibility on a screen.

FIG. 26 shows an embodiment of another display mode of reaching time that can be used in the Web page generating method. In the display mode shown in FIG. 26, node data, image data, or URL addresses to be displayed for each node are extracted and their associated reaching times and extracted screen displays are arranged in chronological order. In the display mode shown in FIG. 26, the vertical axis represents time and the branches of the tree represent intra-page links. Thus, the reaching time is represented as the height of the tree and the nodes are indicted along the width of the tree.

The reaching times shown in portion (a) of FIG. 26 are the times required to reach the nodes in an in edited structured document, for example, in which information is arranged in one row because no "link to body content" is contained. Portion (b) of FIG. 26 shows the reaching times in a structured document in which a link to the body content is provided and inserted according to the present invention. As shown in portion (b) of FIG. 26, user' accessibilities to the Top news and Recent news including links can be displayed with actual times and voice user's accessibilities to information containing a branch can be checked more visually.

In another embodiment of visualization of reaching times using a graphical user interface, a visualized display of "unreachable regions" that a voice user cannot reach is also necessary. The unreachable regions may be displayed with a gradation for the region which the voice user reached or in a distinctive color. Furthermore, a separate area may be provided for the unreachable regions instead of displaying them on the time tree described above with respect to FIG. 26. For example, an disjoint box 64 may be provided that chronologically indicates that regions are obviously unreachable, according to the present invention. According to the present invention, unreachable nodes may be displayed within the disjoint box 64. Portion (b) of FIG. 26 shows the disjoint box 64 disposed at the lower right corner of portion (b) of FIG. 26, in which an unreachable node "Update notice" is displayed.

FIG. 27 shows an embodiment in which the edit processing described above is modularized as an authoring tool of a Web page generating system for a content generating system (evaluating computer 3e). In most systems for generating contents, a number of modes are provided in an authoring tool. In the embodiment shown in FIG. 27, a "Design" mode, which is a WYSIWIG editor, a "Source" mode for editing HTML source documents, and a "Preview" mode in which no edits can be made are provided. They can be implemented as functional modules of the information processing unit shown in FIG. 26. In the embodiment shown in FIG. 27, a "Blind" mode can be implemented as one of the modes in the information processing unit. In the embodiment shown in FIG. 27, the "Design" and "Source" modes are used to create a page and the "Blind" mode can be activated as a wizard for performing the process described above in the same way that a preview is used to check visual access user's accessibility to the page being created during creation. In the embodiment shown in FIG. 27, voice user's accessibility can be improved in the flow of operations for creating a content.

In another embodiment of the content generating system, an information processing unit for performing edit processing may be implemented by a Web server 28 as a Web application rather than a wizard. FIG. 28 shows an embodiment which can provide a Web application employing the present invention. In FIG. 28, the content generating system is included as a module of a Web server 70. The server 70 is connected to an author terminal 74 through a network 72. The server 70 has established a transaction with an author terminal 74 through the network 72 using the browsing unit and is performing operations for improving voice user's accessibility as requested. The author terminal 74 manages or maintains a Web page or homepage created and managed by the author. The assumption here is that an administrator or an author wants to enable voice browsing of a Web page or homepage managed by him/her.

FIG. 29 shows an embodiment of a graphical user interface displayed on the display of the author terminal when the content generating system provides a Web service thorough the network. As shown in FIG. 29, an original content is displayed in the left-hand part of the screen and the accessibilities generated from an edited structured document are displayed on the right-hand part of the screen. Furthermore, the reaching times by the voice user are displayed for entry-level and advanced users in the upper part of he screen in FIG. 29. Processing is in effect the same for both entry-level and advanced users. However, the interval between words in synthesized speech can be lengthened, or detailed explanation can be inserted along with a link command, or other modifications can be made.

As with the embodiments shown in FIGS. 23 and 24, a message is displayed on the screen indicating that an inappropriate "blank" ALT attribute that should be corrected is included. Furthermore, an active field, "Change settings", is provided in the embodiment shown in FIG. 29 so that the screen also serves as an edit screen, rather than opening a wizard for editing, in consideration of the traffic load placed when providing the Web service.

Operations for providing the Web service shown in FIG. 29 will be described below. The assumption here is that the author wants to evaluate or correct the voice accessibility to the Web page or homepage created by the author. First, the author enters and submits the URL address of the Web page or home page to be evaluated in a Web page form provided according to the present invention. When receiving the request, the server 70 accesses the URL address, obtains a structured document, and computes the accessibility. The result is rendered to generate graphical display data according to the present invention and the data is sent to the author terminal 74. The original content and the edited structured document are placed side by side as shown in FIG. 29 so that they can be compared with each other.

The Web page generation assisting system may be configured by implementing the information processing unit as a server and incorporating means for recording a read-aloud node strings (display positions in the page—node identifiers) and time as a service log in a voice browser. FIG. 30 shows an embodiment in which service log analyzing means is incorporated in the Web page generation assisting system of the present invention. The embodiment shown in FIG. 30 includes a server 70 for providing Web pages, a Network 72 such as the Internet connected with the server 70, and multiple user terminals 74 connected onto the network 72.

The server 70 stores and manages structured documents such as DHTML documents in a database 76 and provides a content in response to a request from a user terminal 74. In the embodiment described with respect to FIG. 30, the server 70 further includes an information processing unit 80 as described with reference to FIGS. 16 and 17, and an access log analyzing module 78. The access log analyzing module 78 reads data stored in an access log, provides the access log to an assisting unit included in the information processing unit 80, and visualizes morpheme words and the times required to access them so that actual access by users can be known.

In another embodiment, a number of results of a user test are analyzed (by averaging them for example) and the results are visualized in a manner that they can be seen in one view. This can be used also as a tool for checking actual usability during a test process rather than during authoring.

Visualization of one page has been described. According to the present invention, similar analysis can be carried out on multiples pages to display the accessibilities to the multiple pages, for example multiple Web pages used in the online shopping process from login to purchase to checkout. In this case, visualization may be embodied by the following methods, for example:

1. If colors (gradations) are to be used, the multiple pages are placed on a space and visualized with gradations.

2. If the pages are to be placed in a space, a tree is extended while matching the time axes of the multiple pages with each other.

3. If time map is to be used, the reaching times in one page are calculated by taking the reaching times in the other pages into account and the map into which the pages are integrated is created.

While reaching time is used as a factor that determines the usability of a Web page, other factors that indicate "the level of inconvenience" may also be included and visualized. Example of such other factors include the appropriateness of ALT attributes such as dictionary of inappropriate keywords, or the number of characters, or the distance between tag structure and a spatial layout such as nested layout tables. Unlike reaching time, these measures are not gradually increasing values. Therefore, embodiments are effective in which a fisheye view, for example, is used to enlarge a problem portion, in addition to colors, a time map, and a spatial layout.

Providing interactivity to the visualization can allow the administrator or author to perform more detailed check. In the visualization described with respect to FIG. 24, the reaching time from the top of a page (the starting position of the BODY tag) is calculated and visualized statically. An embodiment may be used in which the reaching time from a pointed position on the display to another position to which a pointing device such as a mouse is moved are calculated in real time by following the pointing device (or in response to a click), referring to a time display mapping table and using a pop-up display, and the calculated reaching time is visualized dynamically.

Furthermore, the content generating method can be implemented in the information processing unit together with existing software such as WebSphere Portal Server (WPS)® that allows the author to create a page by combining any contents. This allows the link "Move to the next portlet" to be provided at the top of the set of the contents that are referred to as portlet. In this embodiment, the time required to reach the next portlet can be checked simply by moving the cursor to the portlet with pointer means to calculate the time required to reach the linked position.

By incorporating the visualizing function in a Web page authoring tool, the usability of voice browsing can be readily investigated during a usual Web page authoring process without adding another software program. Furthermore, the present invention integrates and provides various appearances and functions of many authoring tools into a concept called "View". The present invention can be configured as a module of the "View" function. According to the present invention, therefore, one content (such as an HTML or JSP content) can be edited in terms of appearance (WYSIWYG editor) or fine adjusted on the tag level (source document editor), or actual operations can be checked (Web browser). By providing a graphical user interface function according to the present invention as a function of the View, voice usability can be improved in an authoring process.

While the present invention has been described with respect to the specific embodiments shown in the drawings, the present invention is not limited to the specific embodiments described. Furthermore, the present system and functional units does not necessarily need to be implemented as the functional configuration shown in the drawings; instead, they can be configured as functional means implemented by causing a computer to execute a program. Moreover, the program of the present invention may be written in any program language such as C, C++, and Java®. The computer-executable program can be stored in a storage medium such as ROM, EEPROM, a flash memory, CD-ROM, DVD, flexible disk, or hard disk and delivered. The method for determining the recognizability of structured documents w(1) tow(m) in a Web page W and variations thereof have been described.

(*2) A method for determining recognizability of a Web page W for weak-sighted users and variations thereof will be described below. An HTML document (Web page W) to be processed is rendered to actually generate an image, and image processing equivalent to a certain symptom (such as degradation of focus control capability such as nearsightedness or farsightedness, or color anomaly) is applied to the image to simulate how a screen would look to vision-impaired users or poor-sighted users such as elderly users. Then, the method analyzes what kind of correction can improve the appearance of an image and assists a Web page creator in creating a Web page. The term "Web page creator" is not limited to the creator who created an original Web page to be processed. It includes a person in charge of managing the accessibility of a Web site and a person in charge of checking and correcting the accessibility of the Web site. A "symptom" in vision is not limited to a single symptom; it maybe a combination of symptoms.

While an aspect of the method is to improve the visibility of a raster image on a Web page obtained by rendering a HTML document, the method mainly addresses the readability of characters on a Web page. Whether a character on a Web page is readable is determined on the basis of a difference between the color of a character (foreground color) and the background color whether the shape of the character is preserved on a Web page after image processing (simulation). That is, it is determined that the readability of a character for users having a symptom simulated by the image processing is poor if the difference between the color of the character and the background color is small or if the shape of the character is not preserved on the Web page after image processing.

FIG. 31 schematically shows an exemplary hardware configuration of a computer which implements a data editing apparatus (evaluating computer 3e).

The computer shown in FIG. 31 includes a CPU (Central Processing Unit) 101, which is computing means, a main memory 103 connected to the CPU 101 through an M/B (motherboard) chipset 102 and a CPU bus, a video card 104 also connected to the CPU 101 through the M/B chipset 102 and an AGP (Accelerated Graphics Port), a display device 110 connected to the video card 104, a hard disk 105 and a network interface 106 connected to the M/B chipset 102 through a PCI (Peripheral Component Interconnect) bus, and floppy disk drive 108 and a keyboard/mouse 109 connected to the M/B chipset 102 through a low-speed bus such as an ISA (Industry Standard Architecture) bus from the PCI bus.

FIG. 32 shows a functional configuration of a data editing apparatus implemented by a computer shown in FIG. 31 according to an embodiment.

Referring to FIG. 32, the data editing apparatus according to the present embodiment includes a symptom model storage 10 which stores symptom models, a rendering unit 20 which generates an image from an HTML document to be processed, an image processing unit 30 which performs image processing, a result presenting unit 40 which presents the result of image processing, and a document correcting unit 50 which corrects an HTML document to be processed.

The symptom model storage 10 in the configuration shown in FIG. 32 may be implemented by a storage device such as main memory 103 and the hard disk 105 shown in FIG. 31. The rendering unit 20, the image processing unit 30 and the document correcting unit 50 is a software block implemented on the CPU 101 under the control of a program. The result presenting unit 40 may be implemented by the CPU 101 controlled by the program, and the video card 104 and display device 110 for displaying images. The program that controls the CPU 101 to implement these functions can be stored on a magnetic disk, an optical disk, a semiconductor memory, or other recording medium and delivered, or can be provided and delivered through a network.

The symptom model storage 10 stores the following two kinds of information for each of the models (symptom models) that are set for visual characteristics of vision-impaired people or poor-sighted people such as elderly people, that is, symptoms such as "degradation of focus control capability (nearsightedness or farsightedness)" and "color anomaly": (a) an image degrading method and its parameters for simulating visual degradation by using an image, and (b) a method for correcting HTML documents if the visibility of an image obtained from the simulation is poor.

FIG. 33 shows an example of data stored in the symptom model storage 10.

In the example shown in FIG. 33, the names of symptoms, phenomena indicating the symptoms, image processing (simulation) methods and correction methods for the symptoms are stored. For example, for the symptom of degradation of focus control capability which appears in nearsighted or farsighted, the following information is stored: the name "Degradation of focus control capability (nearsightedness/farsightedness)", the phenomenon "Image formed on the retina is blurred", the image processing method "Convolute the cylindrical function representing the blur" (the parameter in the processing is the radius of the cylinder), and the three correction methods for improving the visibility of the screen for users having the symptom, "Enlarge characters", "Replace ornament font with normal one", and "Enlarge line-spacing".

The rendering unit 20 renders an HTML document to be processed as an image. The generated image is stored in a working area on the main memory 103 or the video memory of the video card 104 shown in FIG. 31, for example. During rendering, HTML elements are associated with their positions (coordinates) on the image and the HTML elements and positions are stored in storage means such as the main memory 103 shown in FIG. 31. The functions of the rendering unit 20 can be implemented by the rendering engine of a Web browser and other conventional technologies.

The image processing unit 30 obtains the "image processing method" for a symptom in the symptom model storage 10 that matches a symptom and its degree indicated by a Web page creator and applies image degrading processing to the image (original image) generated by the rendering unit 20 to generate an image that simulates visual degradation (simulation image). The generated simulation image is stored in storage means such as the working storage area on the main memory 103 or the video memory of the video card 104, or the hard disk 105, for example, shown in FIG. 31. The image processing unit 30 applies image analysis to the original image and simulation image stored in the memory, compares the results of the analysis, and provides the result of the comparison to the result presenting unit 40. Details of functions of the image processing unit 30 will be described later.

The result presenting unit 40 identifies an HTML element that has a problem in visibility of an image rendered from an HTML document, on the basis of the result of comparison between the original image and simulation image by the image processing unit 30 and information (hereinafter referred to as coordinates-element association information) associating HTML elements with their positions (coordinates) on the image generated by the rendering unit 20. The result presenting unit 40 also obtains "correction methods" associated with the symptom from the symptom model storage 10. It then lists the correction methods for all or some of problematic HTML elements along with their positions and displays them on the display device 110 shown in FIG. 31, for example, to present them to the creator of the Web page. The Web page creator can select and specify one or more methods from among the listed correction methods. The information (the position and correction methods of the problematic HTML element) is provided to the document correcting unit 50 as well. Functions of the result presenting unit 40 will be detailed later.

The document correcting unit 50 applies the correction method(s) specified by the Web creator or the system to the problematic HTML element identified by the result presenting unit 40 to correct the HTML document being processed.

The HTML document corrected by the document correcting unit 50 is recursively sent to the rendering unit 20 and thus a processing loop is formed by the operations performed by the rendering unit 20, the image processing unit 30, the result presenting unit 40, and the document correcting unit 50. The processing loop can be repeated to gradually improve the HTML document.

The image processing unit 30 and the result presenting unit 40 will be described below in further detail.

FIG. 34 shows a configuration of the image processing unit 30.

Referring to FIG. 34, the image processing unit 30 includes a image quality changing unit 31 for simulating the vision of vision-impaired or elderly users and an image quality determining unit 32 which determines the image quality of a simulation image and identifies poorly visible portions.

The image quality changing unit 31 obtains from the symptom model storage 10 an image processing method and parameter associated with a symptom and its degree specified by a Web page creator with a command input. It then applies image processing based on the image processing method to an original image generated by the rendering unit 20 to generate a simulation image.

The symptom to be addressed and its degree can be specified by the Web creator inputting a predetermined command with an input device such as the keyboard/mouse shown in FIG. 31. A user interface screen can be displayed on the display device 110 in which the list of symptom names stored in the symptom model storage 10 is displayed to allow the Web page creator to select a symptom and input a parameter specifying the degree of the symptom (for example, a visual ability which can be converted to the radius of a cylinder in a typical Web page environment in the case of the "Degradation of focus control capability" and the type of color anomaly that can be converted to a confusion line diagram in the case of the "Color anomaly", as shown in FIG. 33), thereby facilitating the input by the Web page creator. Furthermore, in a data editing device dedicated to a special application, symptoms and their parameters may be preset and image processing automatically determined may be applied to an original image rendered from an HTML document.

The image quality determining unit 32 analyzes the original image generated by the rendering unit 20 and the simulation image generated by the image quality changing unit 31 to obtain features of each of the images and compares the features with each other. It also evaluates the difference between the color of an element (foreground color) and the color of the surrounding area (background color) in the simulation image. With these operations, a portion that is poorly visible to a user having the symptom provided as a condition to be used in processing by the image quality changing unit 31 is identified. Operation of the image quality determining unit 32 will be described below in further detail with reference to a flowchart.

FIG. 35 is a flowchart illustrating a process performed on an original image by the image quality determining unit 32.

As shown in FIG. 35, the image quality determining unit 32 first generate a histogram of colors appearing in an input original image (step 501). It then focus on each color appearing in the image and generates a binary image having that color as the foreground color and another color as the background color. Then, it performs processing for detecting connected components (step 502). Because text in an HTML document is represented in one color, a character or a portion of a character can be obtained as a connected component by this operation. This operation may be applied to all colors that appear in the image or upper-level colors in the appearance histogram.

In a variation of the connected component detecting processing, another connected component detecting operation may be performed on a connected component that occupies a large area in an image by using that connected component as the background and a connected component surrounded by the connected component in another color as the foreground. A character (for example a character on an icon) within an image in an HTML document may be represented in more than one color with a gradation. In such a case, this variation allows the character or a portion of the character to be obtained as a connected component by applying such a processing if the background is displayed in one color.

A well-known conventional-art processing in image processing may be used as the connected component detecting processing.

Then, the image quality determining unit 32 removes from among the connected components obtained at step 502, the connected components that are unlikely to be characters (step 503) from the area or the aspect ratio. This is post-processing for removing elements (HTML elements) other than characters from the image to be processed which is performed because mainly the visibility of characters are addressed in the present embodiment. Furthermore, multiple characters can be extracted as a large single connected component because of an underline indicating a link in a Web page. Therefore, the image quality determining unit 32 determines whether a line exists under a connected component or detects such a line based on the aspect ratio of a connected component and removes a detected underline, and then obtains connected components representing characters. Depending on the intended purpose of use of a data editing device, it may be necessary to correct poorly visible elements other than characters. In such a case, this step may be omitted.

Then, the image quality determining unit 32 applies thinning processing to each of the connected components obtained (step 504). It then extracts feature points from the thinned connected components (step 505). Examples of feature points include points the number of connections of which is 0, 1, 3, or 4. The number of connections of a point is the number of runs passing through the point when the outline of a connected component is followed.

FIG. 37 shows an example of the thinning and calculation of the number of connections.

FIG. 37(a) shows a binary image of an original image. "1s" in FIG. 37(a) represent foreground pixels and "0s" represent background pixels; FIG. 37(b) shows the result of thinning of the foreground pixels in the original image in FIG. 37(a); and FIG. 37(c) shows the result of calculation of the number of connections of each foreground pixels in the binary image in FIG. 37(b). The numbers in FIG. 37(c) represents the number of connections, the number signs (#) indicates the pixels with 2 connections, and the dots (.) indicates the background pixels. As shown, the points having 0, 1, 3, or 4 connections represent features indicating how the connected component is connected. The number of connections of the pixel at the top left of the connected component is 2, which represents the top position of the connected component and is a useful feature. Thus, the points indicated with numbers in FIG. 37(c) can be extracted as feature points.

Well-known conventional-art methods in image processing may be used as the thing and feature point extracting processing.

Finally, the image quality determining unit 32 stores the position, shape, and feature points of each connected component obtained in the process from step 501 to step 503 in storage means, for example the main memory 103 shown in FIG. 31 (step 506).

FIG. 36 is a flowchart illustrating a process performed on a simulation image by the image quality determining unit 32.

As shown in FIG. 36, the image quality determining unit 32 first cuts from the simulation image a partial image that occupies the corresponding positions based on the information indicating the positions in each connected component in the original image that was stored in the storage means at step 506 in FIG. 35 (step 601). For example, the smallest rectangular containing a given connected component can be cut. If the simulation image includes blurring, a connected component occupies a larger area than in the original image, therefore the area to be cut is adjusted according to the degree of the blurring based on a parameter.

Then, the image quality determining unit 32 checks the difference the color of pixels that are likely to be foreground pixel and the color of pixels that are likely to be background pixels on the basis of the shape of the connected component in the original image that was stored in the storage means at step 506 in FIG. 35 (step 602). If the difference in between the pixels in adjacent elements or areas is smaller than a certain level, it can be determined that the visibility of the portion is poor. If the symptom in vision simulated in the simulation image is color anomaly, difference between the colors along the confusion line is hard to recognize. Therefore, even if there is a difference between the colors on the confusion line, it can be determined that the visibility of the portion is poor.

The difference in color will be described below. A color can be represented in various ways such as by its lightness, saturation, and hue or by RGB (Red, Green, Blue: light's three primary colors). For example, consider a case where colors are represented by the L*a*b color system. The L*a*b* color system represents a color by three values, L*, a*, and b*, where L* represents the lightness, and a* and b* represent the chromaticness, which is the combination of the hue and the saturation.

If the color of pixels that are likely to be foreground pixels and the color of pixels that are likely to be background pixels are denoted by (L1, a1, b1) and (L2, a2, b2), respectively, the color difference $\Delta E$ and the lightness difference $\Delta L$ between the two colors can be represented as $$\Delta E = ((L1-L2)2+(a1-a2)2+(b1-b2)2)^{1/2} \text{ and}$$

$$\Delta L = L1-L2.$$

Appropriate reference values are set for these and, if $$\Delta E < 100.0 \text{ and } |\Delta L| < 30.0$$

the color difference is small and two colors are indistinctive and therefore it can be determined that the visibility of the portion is poor.

Further information is disclosed in "Techniques for Accessibility Evaluation And Repair Tools" as W3C Working draft, Apr. 26, 2000(Internet URL: http://www.w3.org/TR/AERT#color-contrast).

If it is determined at step 602 that the difference between the foreground color and the background color is greater than a certain level, then the image quality determining unit 32 binarizes the partial image by setting an appropriate threshold (step 603). The threshold can be set mechanically or by using a color appearance histogram, or any other well-known conventional-art method. For example, if the threshold is to be set mechanically, one of the pixels that are likely to be foreground pixels is selected and its color is determined and one of pixels that are likely to be background pixels is selected and its color is determined. Calculation is performed on each of all other pixels to determine which of the colors the color of the pixel is closer to and the color of the pixel is matched to the closer color. Thus, the partial image can be binarized. The closeness between colors can be determined by using the color difference in the L*a*b* space. Alternatively, simply the distance in the RGB space may be used. If a color appearance histogram is used, when a color histogram is generated from all pixels in a partial image to be processed, two peaks (corresponding to the foreground and background) often appear. If the image is blurred, the peaks will be gentle. If the partial image is not blurred, the peaks will be steep (concentrate to a specified color). The trough between the two peaks can be found and used as the threshold to divide the color space into two to binarize the image.

Then, the image quality determining unit 32 performs connected component detecting on the binary image (step 604), performs thinning on the connected components obtained (step 605), and then extracts feature points from the thinned image (step 606).

Finally, the image quality determining unit 32 compares the information on the feature points of the connected components in the original image stored in the given storage means at step 506 in FIG. 35 with the information on the feature points of the corresponding connected components in the simulation image extracted at step 606 (step 607). If the positions and contents of the feature points are preserved in the simulation image, it is determined that the visibility of the image is acceptable even though the simulation image has the simulated vision symptom. On the other hand, if the positions and contents of the feature points are not preserved in the simulation image, it is determined that the visibility of the original image for a user having a visual symptom simulated in the simulation image is poor. Depending on the result of thinning, feature points may not be the same positions in the simulation image as those in the original image. Therefore, a threshold may be preset and, if the difference between the position of each feature point in the simulation image and the position of the corresponding feature points in the original image is less than the threshold, it may determined that the positions of the feature points are preserved.

The result presenting unit 40 will be described below.

FIG. 38 shows a configuration of the result determining unit 40.

Referring to FIG. 38, the result presenting unit 40 includes an element-to-be-corrected identifying unit 41 which identifies HTML elements to be corrected, a correction method searching unit 42 which searches for a correction method for correcting HTML elements identified by the element-to-be-corrected identifying unit 41, and a display control unit 43 which presents an HTML element correction method detected by the correction method searching unit 42 to the creator of a Web page.

The element-to-be-corrected identifying unit 41 is portion-to-be-corrected identifying means for identifying portions to be corrected in an HTML document. It obtains the position of a connected component that was determined to be poorly visible by the image quality determining unit 32 of the image processing unit 30, and identifies HTML elements to be corrected, on the basis of the coordinates-element association information obtained by the rendering unit 20 and stored in the storage means beforehand.

The correction method searching unit 42 searches through the symptom model storage 10 to retrieve correction methods associated with the vision symptom used in the simulation by the image quality changing unit 31. The correction method searching unit 42 provides obtained information on the correction methods and information on the HTML elements to which the method should be applied to the display control unit 43. It also provides the same information to the document correcting unit 50.

The display control unit 43 lists the HTML elements and the correction method received from the correction method searching unit 42, generates a user interface screen with input means such as check boxes, and displays it on the display unit 110 shown in FIG. 31, for example, to present it to the Web page creator. The Web page creator can specify a correction method to be applied to the HTML document by performing an appropriate input operation on the user interface screen. In an example of a method for displaying the user interface screen, the Web page creator clicks on one of the problematic HTML elements highlighted in reverse video on the Web page screen (original screen) generated from the HTML document to be processed to display the correction methods associated with that HTML element. Information on the correction method selected by the Web page creator from among the correction methods listed under the display control of the display control unit 43 is sent to the document correcting unit 50.

A flow of a general Web page data editing process will be described below.

FIG. 39 is a flowchart illustrating a flow of data editing process. As shown in FIG. 39, all or a portion of an HTML document to be edited is first read into the data editing apparatus of the present embodiment and rendered by the rendering unit 20 to generate an original raster image (step 901). As described above, the rendering unit 20 obtains the association between coordinates on the generated original image and the HTML elements in the Web page and stores it in the storage means. The generated original image is displayed on the display unit 110 shown in FIG. 1, for example. Then, the data editing apparatus waits for instruction to correct the image from the Web page creator.

In response to an image correction instruction input by the Web page creator, the image quality changing unit 31 of the image processing unit 30 performs image processing associated with a symptom specified by the instruction on the original image generated at step 901 to generate a simulation image (step 902). Then, the image quality determining unit 32 performs image analysis of the original image and the simulation image and compares the results of the analysis to detect portions that are poorly visible to a user having the symptom simulated in the simulation image (step 903)

Then, the element-to-be-corrected identifying unit 41 of the result presenting unit 40 uses the coordinates of the portions detected at step 903 to identify problematic HTML elements (which degrade the visibility of the Web page) as elements to be corrected (step 904). The correction method searching unit 42 and the display control unit 43 then present correction methods for the HTML document to the Web page creator (step 905).

When the Web page creator selects a desired correction method from among the presented correction methods and input an instruction, the document correcting unit 50 corrects the HTML document according to the correction method instruction (steps 906 and 907). The process then returns to step 901, and the data editing process is repeated on the raster image of the corrected HTML document as an original image. The visibility of the Web page of the HTML document can be gradually improved by repeating the process described above. If the Web page creator determines at step 906 that the HTML document does not require additional corrections, the creator inputs an end command to end the data editing process.

There are various symptoms of eye-sight characteristics of vision-impaired and elderly people and multiple symptoms may appear in combination in one person. A case in which more than one symptom is addressed according to the present embodiment will be-described below.

If a page is to be designed for users having multiple symptoms, image processing in which the multiple symptoms are combined is applied. In that case, the "image processing method" for the symptom model is the combination of image processing methods for the symptoms. The "correction methods" for the symptom model is a combination of correction methods for the combined symptoms.

Alternatively, multiple symptoms may be addressed concurrently in one correcting process, rather than combining pieces of information concerning the multiple symptoms. In that case, the information processing unit 30 performs as many image quality degrading processes as the number of the symptoms to be addressed and makes comparison between features in images resulting from the image quality degrading processes. When listing correction methods, the result presenting unit 40 should present information indicating which correction methods should be used for which symptoms.

An HTML document is rendered to actually generate an image and image processing for simulating the eye-sight characteristics of vision-impaired or elderly people is performed as described above. Then, the original image and the simulation image are analyzed and compared to determine how an image would look to a user having the eye-sight characteristics simulated in the simulation image and determine poorly visible portions in the image. In addition, appropriated correction methods associated with the eye-sight characteristics are presented. Thus, specific suggestions as to how to correct an image to improve the visibility of the image for vision-impaired users can be provided to effectively assist a creator in creating a Web page.

A configuration of the data editing apparatus according to another embodiment will be described below. In this embodiment, determination as to whether a Web page is visible is made mainly on the basis of the appearance of characters on the Web page. Text in an HTML document is transformed into an image (converted into a bit map) by using type font information provided in a browser and the image is displayed. The image processing described above is applied beforehand to each of the characters constituting each of font sets that are likely to be used in a Web page so that poorly visible portions can be identified without rendering the entire HTML document. This can reduce the number of steps required for the process and thus speeds up the process, as compared with rendering the entire HTML document.

FIG. 40 shows another configuration of the data editing apparatus of the present embodiment. The data editing apparatus shown in FIG. 40 includes a symptom model storage 10 storing symptom models, a rendering unit 20 which generates an image from an HTML document to be processed, an image processing unit 30 which performs image processing, a result presenting unit 40 which presents the result of image processing, a document correcting unit 50 which corrects an HTML document to be processed, a font database 60 which stores font sets, a font evaluation result database 70 which stores the results of evaluation of each character in the font sets, and an HTML analyzing unit 80 which analyses an HTML document to be processed and selects image processing method to be used.

The symptom model storage 10, the rendering unit 20, the image processing unit 30, the result presenting unit 40, and the document correcting unit 50 in the configuration shown in FIG. 40 are the same as those shown in FIG. 32, therefore they are labeled with the same reference numerals and the description of these units will be omitted.

The font database 60 and the font evaluation result database 70 may be implemented by a storage device such as the main memory 103 and the hard disk 105, for example, shown in FIG. 31. The HTML analyzing unit 80 is a software block implemented by the CPU 101 shown in FIG. 31, for example.

The font database 60 stores typical font sets that are likely to be used in Web pages. In this data editing apparatus, rendering is performed on all characters constituting the typical font sets, processing by the image processing unit 30 is applied to them, and the visibility of each character associated with the symptoms stored in the symptom model storage 10 is determined before applying data editing to a given HTML document according to the present embodiment. Various font sets can be used in Web pages and it is unrealistic to address all of them. Therefore, only typical font sets such as Mincho and Gothic fonts that are frequently used are stored in the font database 60 and evaluated.

The font evaluation result database 70 stores the result of evaluation of each character of the typical font sets through evaluation processing by the image processing unit 30. In response to a query from a constituent character evaluating unit 83 of the HTML analyzing unit 80, which will be described later, the font evaluation result database 70 returns the result of evaluation of whether the visibility of a character of a font set that appears in an HTML document is poorly visible to a user having a specified symptom. For a query about a font that resemble a typical font set in shape, the result of evaluation of the typical font set can be substituted.

The HTML analyzing unit 80 analyzes an HTML document to be processed to check the appearance of text in the HTML document and determines an image processing method to be performed by the data editing apparatus according to the result of the analysis.

FIG. 41 shows a configuration of the HTML analyzing unit 80. Referring to FIG. 41, the HTML analyzing unit 80 includes a constituent element analyzing unit 81 which analyzes HTML elements constituting an HTML document, an HTML portion extracting unit 82,which extracts a portion to which image processing is to be applied from the HTML document, and a constituent character evaluating unit 83 which makes an evaluation using the font evaluation result database 70 built for characters in Web pages.

The constituent element analyzing unit 81 analyzes an HTML document to be processed and checks the types and layout of all HTML elements constituting the HTML document. Then, it determines which of the following should be performed in order to determine the visibility of a Web page generated from the HTML document:

(1) rendering and image processing of the entire HTML document, (2) rendering and image processing of a portion of the HTML document, and (3) no rendering or image processing.

For example, if a background image is used throughout the Web page and the image can interfere with characters, the constituent element analyzing unit 81 determines that rendering and image processing of the entire HTML document should be performed. If there is not a background image that covers the entire HTML document but an image is used in a portion, the constituent element analyzing unit 81 determines that rendering and image processing of that portion should be performed. If the HTML document includes only characters, the constituent element analyzing unit 81 determines that the HTML document requires neither rendering nor image processing.

If the constituent element analyzing unit 81 determines on the basis of the analysis of the HTML document to be processed that the rendering and image processing of the entire HTML document is required, it provides the entire HTML document to the rendering unit 20. The remaining process to the HTML document is similar to the process descried with reference to the flowchart in FIG. 39. That is, an original image is generated by the rendering unit 20, a simulation image is generated by the image processing unit 30, and the simulation image is compared with the original image to detect poorly visible portions. Then problematic HTML elements are identified by the result presenting unit 40 and the HTML document is corrected by the document correcting unit 50 in accordance with an instruction by the Web page creator.

If the constituent element analyzing unit 81 determines that rendering and image processing of portions of the HTML document should be performed, it provides the result of the analysis including information identifying the portions that require rendering and image processing to the HTML portion extracting unit 82 along with the HTML document. It also provides the result of the analysis including information identifying the other portions in the HTML document to the constituent character evaluating unit 83 along with the HTML document. Then, control is passed to the HTML portion extracting unit 82 and the constituent character evaluating unit 83.

If the constituent element analyzing unit 81 determines that the HTML document requires neither rendering nor image processing, it provides the HTML document to the constituent character evaluating unit 83 and passes control to the constituent character evaluating unit 83.

Based on the result of the analysis by the constituent element analyzing unit 81, the HTML portion extracting unit 82 extracts HTML elements in the portion that require rendering and image processing from the HTML document to be processed and provides them to the rendering unit 20. The remaining process to the portion of the HTML document is similar to the process described with reference to the flowchart in FIG. 39.

The constituent character evaluating unit 83 inquires in the font evaluation result database 70 about all characters constituting the HTML document or the character in the portion identified by the constituent element analyzing unit 81 as the portion that does not require rendering or image processing. The constituent character evaluating unit 83 obtains information about the evaluation, based on the font of the character and a symptom, of the visibility of the character that would result if the character were actually rendered, and evaluates the visibility of the character. The result of the evaluation of the character in the HTML element is sent to the result presenting unit 40 as a unit.

FIG. 42 shows a configuration of the result presenting unit 40 of the data editing unit shown in FIG. 40. The result presenting unit 40 shown in FIG. 42 has the same functions of the result presenting unit 40 shown in FIG. 38. A correction method searching unit 42 can input the result of evaluation made by the constituent character evaluating unit 83 using the font evaluation result database 70. If the correction method searching unit 42 has obtained from the result of evaluation from the constituent character evaluating unit 83, the correction method searching unit 42 directly searches the symptom model storage 10 for correction methods on the basis of the result of the evaluation, without an element-to-be-corrected identifying unit 41 identifying HTML elements to be corrected.

FIGS. 43 and 44 are flowcharts illustrating a flow of a data editing process performed in the data editing apparatus having the configuration shown in FIG. 10. In this data editing apparatus, a character in a font set is read from the font database 60, converted into an image, and provided to the image processing unit 30 as shown in FIG. 43 as a preliminary operation, before data edit is made on a certain HTML document (step 1301). Then, based on a image processing method stored in the symptom model storage 10, an image quality degrading process corresponding to a particular symptom is applied to the original image of the character to generate a simulation image (step 1302). Then, in the image processing unit 30, image analysis is performed separately on the original image and the simulation image and the results of the analysis are compared with each other to evaluate whether the character is poorly visible to a user having the simulated symptom (step 1303). The result of evaluation is stored in the font evaluation result database 70 (step 1304).

Once all or portion of the HTML document to be processed is read into the data editing apparatus of the present invention, the HTML document is first analyzed by the HTML analyzing unit 80 (step 1401) as shown in FIG. 44. With this, determination is made as to whether evaluation of the image is performed with rendering and image processing and whether evaluation by the constituent character evaluating unit 83 should be performed, or which method should be used to evaluate which portion in the HTML documents (step 1402). Operations performed after the determination at step 1402 is performed in a portion of the HTML document (HTML element) will be described below. If evaluation based on rendering and image processing or evaluation by the constituent character evaluating unit 83 is to be performed on the entire HTML document as a result of the analysis by the HTML analyzing unit 80, one of the following process is performed on the entire HTML document.

For an HTML element that should be evaluated after rendering and image processing are performed on it, generation of an original image by rendering (step S1403), generation of a simulation image by the image quality changing unit 31 of the image processing unit 30 (step 1404), detection of a portion in the simulation image that is poorly visibly to a user having a simulated symptom (step 1405), and identification of a portion (HTML element) that should be corrected (step 1406) are performed, as in steps 901 to 904 in FIG. 39.

For an HTML element (character) that should be evaluated by the constituent character evaluating unit 83, a portion evaluated as being poorly visible is identified based on the information on the result of evaluation that was stored in the font evaluation result database 70 by the process shown in FIG. 43 beforehand (step 1407).

Then, the correction method searching unit 42 of the result presenting unit 40 searches the symptom model storage 10 for correction methods for the HTML document and the display control unit 43 presents them to the Web page creator (step 1408).

When the Web page creator selects a desired correction method from among the correction methods presented and inputs an instruction, the document correcting unit 50 corrects the HTML document according to the instruction of the correction method (steps 1409 and 1410). Then the process returns to step 1401, the data edit process is repeated.

If the Web page creator determines at step 1409 that no additional correction to the HTML document is required, the Web page creator inputs an end command to end the data edit process.

As has been described above, in the data editing apparatus shown in FIG. 40 font set likely to be used in Web pages are converted into images and the result of the evaluation of the images are held be forehand. Then, if all or portion of a Web page to be processed consists only of characters and therefore differentiation between the foreground and background is not required, results of evaluation held is used to search for correction methods. Thus, data edits can be made without having to render every HTML document in its entirety and thus the data editing can be speeded up.

The data editing apparatus shown in FIG. 32 or 40 generates a simulation image in order to compare it with the original image by the image quality determining unit 32 of the image processing unit 30. The simulation image can be presented to the Web page creator.

FIGS. 45 and 46 show variations of configurations of the image processing unit 30 and the result presenting unit 40, respectively, used in that case. As shown in FIG. 45, the image changing unit 31 of the image processing unit 30 provides a generated simulation image to the image quality determining unit 32 and also to the result presenting unit 40. Then, as shown in FIG. 46, the display control unit 43 of the result presenting unit 40 displays the simulation image received from the image processing unit 30 on the display device 110 shown in FIG. 31, for example, to present it to the Web page creator.

Presenting the simulation image to the Web page creator allows the Web page creator to understand better the Web page's visibility to vision-impaired or elderly users. Furthermore, the Web page creator can view the simulation image together with places to be corrected to obtain information for making proper determination as to how an HTML document should be corrected.

A large number of places to be corrected (number of HTML elements×number of correction methods for each HTML element) may be presented by the result presenting unit 40, depending on the content of a Web page to be processed. In order to efficiently deal with such a page, priorities may be assigned to elements.

FIG. 47 shows a variation of the result presenting unit 40.

As shown in FIG. 47, the result presenting unit 40 includes an element-to-be-corrected identifying unit 41, a correction method searching unit 42, a display control unit 43, and a priority determining unit 44. The priority determining unit 44 prioritizes HTML elements identified as elements to be corrected by the element-to-be-corrected identifying unit 41 on the basis of predetermined criteria and determines the order in which the correction method searching unit 42 searches for correction methods and the order in which the display control unit 43 displays the correction methods.

For example, the priorities may be determined on the basis of the following criteria:

The types of HTML elements to be corrected (for example, <Hi> tags are given higher priorities.)

The positions of elements to be corrected in the Web page (for example, elements in and near the center of the Web page are given higher priorities and marginal elements are given lower priorities.)

The number or area of HTML elements to be corrected (for example, HTML elements having many points to be corrected or a large area to be corrected are given higher priorities.)

Priorities preset for symptoms

These criteria may be used singly or combination. If a number of criteria are used in combination, weights may be assigned to the criteria. Providing these priorities enables display control such as displaying portions to be corrected and correction methods in the order of priority, or ignoring (excluding from a list displayed). HTML elements with priorities lower than a predetermined threshold. Accordingly, if there are a large number of portions to be corrected, they can be efficiently addressed.

A Web page design assisting system has been described that is designed with consideration given to visually impaired or elderly users. This technology can be used Web page browsing. It is impossible to make it mandatory for all Web pages on the Internet to have designs that give consideration to certain eye-sight characteristics. Therefore, the technology of the present embodiments is used to correct a Web page when the Web page is displayed on a terminal device of a user who brose the Web page.

It is not desirable to mechanically correct a Web page during the creation of the Web page without regard to Web page creator's intention. Therefore, in the embodiments described above, the result presenting unit 40 identifies portions to be corrected in the Web page and lists and presents possible correction methods to the Web page creator to allow the creator to select one or more of the correction methods. However, if a user who has a certain eye-sight characteristic uses his or her user terminal to browse Web pages, corrections suitable for the user's eye-sight characteristic can be mechanically made to a Web page displayed on the terminal device because the use of the device is limited to that user. In this case, rather than presenting portions to be corrected and correction methods to the user, an image processing methods and correction method appropriate for the user's eye-sight characteristic are preset, and the image processing unit 30 and the result presenting unit 40 automatically execute the preset methods when a Web page is displayed. With this configuration, users are saved from having to perform complicated operations such as instructing the image processing unit 30 to perform an image processing method or instructing the result providing unit 40 to perform a correction method, every time a Web page is displayed.

While the present embodiments have been described with respect to a system that processes HTML documents, the present embodiments can also be applied to documents in other languages such as XML (Extensible Markup Language) documents, SVG (Scalable Vector Graphics) files, and PDF (Portable Document Format) files that can be displayed as images and browsed on a display device. Furthermore, according to the present embodiments, an image is actually generated and then image processing is used to simulate a desired eye-sight characteristic. Then, portions found to be poorly visible to a user having the simulated eye-sight characteristic are identified as portions to be corrected and the document file that is the image's original data is corrected. However the process from the step of actually processing an image to perform simulation to the step of pointing out portions to be correct can be applied to general image data as well as such document files. A method for determining the recognizability of a Web page W to users having weak eyesight has been described, including its variations. Thus, variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for causing a system to evaluate contents; comprising the steps of:
    performing a primary evaluation of the contents on the basis of a first evaluation criterion to determine what is needed to correct and/or modify said contents;
    performing a primary evaluation of the contents on the basis of a second evaluation criterion to further determine what is needed to correct and/or modify said contents;
    performing a secondary evaluation of the contents on the basis of a plurality of the primary evaluations to still further determine what is needed to correct and/or modify said contents; and
    presenting results of the primary evaluation and/or the secondary evaluation to a user for said user to employ said results to correct and/or modify said contents.

2. The method according to claim 1, wherein the first evaluation criterion is a level of importance of the contents and the second evaluation criterion is the recognizability of the contents.

3. The method according to claim 2, wherein the level of importance comprises the amount and/or quality of the contents; and
    the step of performing the secondary evaluation comprises the step of performing a secondary evaluation on the amount and/or quality of recognizable contents in the contents.

4. The method according to claim 2, wherein the step of performing the secondary evaluation evaluates a ratio of the amount of a recognizable content in the contents of interest to the amount of all the contents.

5. The method according to claim 2, wherein the level of importance includes the amount and/or quality of the contents; and
    the step of performing the secondary evaluation comprises the step of performing the secondary evaluation in consideration of the recognizability on the amount and/or quality of the contents.

6. The method according to claim 2, wherein the contents are Web pages having a hierarchical set of Web pages linked by link/form elements and the recognizability of the Web page reflects the recognizability of the link/form elements associated with an upper-level Web page linked to that Web page.

7. The method according to claim 2, wherein if the primary evaluation shows that a content has a high level of importance and a low recognizability, the secondary evaluation evaluates the content lower than in the case where the first evaluation evaluates the content has a high level of importance and a high recognizability.

8. The method according to claim 1, wherein the content is a Web page including a plurality of link/form elements;
    the Web page is linked to other Web pages through link/form elements;
    the step of performing the primary evaluation comprises the step of performing the primary evaluation of the level of importance of the contents; and
    the level of importance comprises the amount and/or quality of the Web page linked from each link/form elements.

9. The method according to claim 8, wherein the level of importance comprises at least one of the number of Web pages to which each link/form elements links, the number of forms of the Web pages to which the link/form elements links, or the number of characters in the Web page to which the link/form elements links.

10. The method according to claim 8, wherein the level of importance comprises at least one of the number of accesses to Web page linked, the frequency of access to the Web page linked, information indicating whether or not the Web page linked is an entry Web page, information indicating whether the Web page linked has a number of link/form elements information indicating whether or not the Web page linked is also linked from another link/form elements, and information indicating whether the Web page linked is essential to an operation scenario including the Web page linked.

11. The method according to claim 2, wherein the recognizability comprises the time required to access the content during voice browsing.

12. The method according to claim 2, wherein the recognizability comprises a visual characteristic of the content.

13. The method according to claim 2, wherein the recognizability comprises the operability of the content.

14. The method according to claim 1, wherein the content is a Web content; and
the step of performing the primary evaluation uses a display characteristic of the Web content and a language in which the Web content is written to perform the primary evaluation.

15. The method according to claim 1, wherein the content comprises a meta content; and
the step of performing the primary evaluation uses the meta content to perform the primary evaluation.

16. The method according to claim 1, wherein the content is a whole content including a plurality of partial contents;
the step of performing the primary evaluation performs the primary evaluation of each of the plurality of partial contents; and
the step of performing the secondary evaluation performs the secondary evaluation of the whole content on the basis of the primary evaluation.

17. The method according to claim 1, wherein the content is a Web page including a plurality of Web objects;
the step of performing the first evaluation performs the primary evaluation of each of the plurality of Web objects; and
the step of performing the secondary evaluation performs the secondary evaluation of the whole Web page on the basis of the primary evaluation.

18. The method according to claim 1, wherein the content is a Web site including a plurality of Web pages;
the step of performing the primary evaluation performs the first evaluation of each of the plurality of Web pages; and
the step of performing the secondary evaluation performs the secondary evaluation of the whole Web site on the basis of the primary evaluation.

19. The method according to claim 1, wherein the content is a Web site including a plurality of Web pages and further each of the Web pages includes a plurality of Web objects;
the step of performing the primary evaluation performs the first evaluation of each of the plurality of Web objects and each of the plurality of the Web pages; and
the step of performing the secondary evaluation performs the secondary evaluation of the whole Web site on the basis of the first evaluation.

20. The method according to claim 1, wherein the content is a Web site including a plurality of Web pages;
the step of performing the primary evaluation performs the first evaluation of each of the plurality of the Web pages;
the step of performing the secondary evaluation includes the whole Web site on the basis of the primary evaluation; and
the method further comprises the step of comparing the secondary evaluation with the secondary evaluation of another whole Web site.

21. The method according to claim 1, further including the step of presenting the primary evaluation and/or the secondary evaluation to a user.

22. The method according to claim 1, further comprising the step of visually presenting the primary evaluation and/or the secondary evaluation to the user.

23. The method according to claim 1, further comprising the step of presenting points to be improved in the content to the user on the basis of the primary evaluation and/or the secondary evaluation.

24. The method according to claim 23, wherein the points to be improved are presented to the user on the basis of the priorities of the points to be improved.

25. A computer program embodied on a computer readable medium, said program causing a computer to evaluate contents by causing the computer to implement the functions of:
performing a primary evaluation of the contents on the basis of one evaluation criterion;
performing a primary evaluation of the contents on the basis of another evaluation criterion;
performing a secondary evaluation of the contents on the basis of a plurality of the primary evaluations; and
presenting results of the primary evaluation and/or the secondary evaluation to a user for said user to employ said results to correct and/or modify said contents.

26. A system for evaluating contents, comprising:
a first primary evaluating unit for performing a primary evaluation of the contents on the basis of one evaluation criterion to determine what is needed to correct and/or modify said contents;
a second primary evaluation unit for performing a primary evaluation of the contents on the basis of another evaluation criterion to further determine what is needed to correct and/or modify said contents;
a secondary evaluation unit for performing the secondary evaluation of the contents on the basis of a plurality of the primary evaluations to still further determine what is needed to correct and/or modify said contents; and
a result presenting unit for presenting results of the primary evaluation and/or the secondary evaluation to the user for said user to employ said results to correct and/or modify said contents.

27. An article of manufacture comprising a computer usable medium having computer readable program code means embodied therein for causing a system to evaluate contents, the computer readable program code means in said article of manufacture comprising computer readable program code for causing a computer to effect the steps of claim 1.

28. A program storage device readable by machine, tangibly embodying a program of instructions executable by the machine to perform method steps for causing a system to evaluate contents, said method steps comprising the steps of claim 1.

29. A computer program product comprising a computer usable medium having computer readable program code means embodied therein for causing functions for evaluating contents, the computer readable program code means in said computer program product comprising computer readable program code for causing a computer to effect the functions of claim 26.

30. The method according to claim 8, wherein:

the level of importance comprises at least one of the number of accesses to Web page linked, the frequency of access to the Web page linked, information indicating whether or not the Web page linked is an entry Web page, information indicating whether the Web page linked has a number of link/form elements information indicating whether or not the Web page linked is also linked from another link/form elements, and information indicating whether the Web page linked is essential to an operation scenario including the Web page linked;

the first evaluation criterion is the level of importance of the contents and the second evaluation criterion is the recognizability of the contents;

the recognizability comprises at least one of the time required to access the content during voice browsing;

a visual characteristic of the content;

the operability of the content;

the content is a Web content; and the step of performing the primary evaluation uses a display characteristic of the Web content and a language in which the Web content is written to perform the primary evaluation; and the content is a whole content including a plurality of partial contents, and the step of performing the primary evaluation performs the primary evaluation of each of the plurality of partial contents; and the step of performing the secondary evaluation performs the secondary evaluation of the whole content on the basis of the primary evaluation.

\* \* \* \* \*